US009731321B2

(12) United States Patent
Hawkett et al.

(10) Patent No.: US 9,731,321 B2
(45) Date of Patent: *Aug. 15, 2017

(54) POLYMERISATION PROCESS AND POLYMER PRODUCT

(75) Inventors: Brian Stanley Hawkett, Mona Vale (AU); Christopher Henry Such, Mount Eliza (AU); Duc Ngoc Nguyen, Wiley Park (AU); Jason Michael Farrugia, Laverton South (AU); Olga Maree Mackinnon, Blackburn South (AU)

(73) Assignee: The University of Sydney, Sydney (AU)

( * ) Notice: Subject to any disclaimer, the term of this patent is extended or adjusted under 35 U.S.C. 154(b) by 2065 days.

This patent is subject to a terminal disclaimer.

(21) Appl. No.: 11/664,592

(22) PCT Filed: Oct. 4, 2005

(86) PCT No.: PCT/AU2005/001512

§ 371 (c)(1),
(2), (4) Date: Apr. 4, 2008

(87) PCT Pub. No.: WO2006/037161

PCT Pub. Date: Apr. 13, 2006

(65) Prior Publication Data

US 2008/0268250 A1    Oct. 30, 2008

(30) Foreign Application Priority Data

Oct. 4, 2004  (AU) ............................... 2004905729
Jun. 24, 2005 (AU) ............................... 2005903366

(51) Int. Cl.
*B05D 7/00*    (2006.01)
*C08F 2/18*    (2006.01)
(Continued)

(52) U.S. Cl.
CPC .................. *B05D 7/00* (2013.01); *C08F 2/18* (2013.01); *C08F 2/44* (2013.01); *C08F 292/00* (2013.01);
(Continued)

(58) Field of Classification Search
CPC ....................................................... B05D 7/00
(Continued)

(56) References Cited

U.S. PATENT DOCUMENTS

2003/0199653 A1  10/2003  McCormick, III et al.
2004/0032038 A1   2/2004  Ali et al.
2006/0199900 A1   9/2006  Matsumoto et al.

FOREIGN PATENT DOCUMENTS

CA        2341387        3/2000
JP     2004-018557       1/2004
(Continued)

OTHER PUBLICATIONS

El-Aasser, Mohamed S, "Miniemulsions: Overview of Research and Applications", Abstracts of Papers, 224th ACS National Meeting, 2002, 18-22, Boston, MA United States.
Pyun Jeffrey et al, Synthesis of Nanocomposite Organic/Inorganic Hybrid Materials Using Controlled/ "Living" Radical Polymerisation, Chem.Mater. 2001, 3436-3448, 13.
(Continued)

*Primary Examiner* — Tabatha Penny
(74) *Attorney, Agent, or Firm* — Arent Fox LLP

(57) ABSTRACT

A method of polymerizing monomer to form polymer at the surface of particulate material, said method comprising: providing a dispersion of said particulate material in a continuous liquid phase, said dispersion comprising a RAFT agent as a stabilizer for said particulate material, and said continuous liquid phase comprising one or more ethylenically unsaturated monomers; and polymerizing said one or more ethylenically unsaturated monomers under the control of said RAFT agent to thereby form polymer at the surface of said particulate material.

10 Claims, 4 Drawing Sheets

(51) Int. Cl.

| | | |
|---|---|---|
| *C08F 2/44* | (2006.01) | |
| *C08F 292/00* | (2006.01) | |
| *C08F 293/00* | (2006.01) | |
| *C09D 5/02* | (2006.01) | |
| *C09D 5/03* | (2006.01) | |
| *C09D 153/00* | (2006.01) | |
| *C09J 153/00* | (2006.01) | |
| *C08F 212/08* | (2006.01) | |

(52) U.S. Cl.
CPC .......... *C08F 293/005* (2013.01); *C09D 5/028* (2013.01); *C09D 5/03* (2013.01); *C09D 153/00* (2013.01); *C09J 153/00* (2013.01); *C08F 212/08* (2013.01); *C08F 2438/03* (2013.01); *Y10T 428/2998* (2015.01)

(58) Field of Classification Search
USPC ........................................................ 427/212
See application file for complete search history.

(56) References Cited

FOREIGN PATENT DOCUMENTS

| | | | |
|---|---|---|---|
| JP | 2004-087470 | 3/2004 | |
| WO | WO 01/77198 | 10/2001 | |
| WO | WO 01/92359 | 12/2001 | |
| WO | 03/055919 A1 | 7/2003 | |
| WO | WO 03/055919 | * 7/2003 | ................ C08F 2/22 |
| WO | WO 2006/024706 A1 | 3/2006 | |

OTHER PUBLICATIONS

J. Loiseau et al., Synthesis and Characterization of Poly(acrylic acid) Produced by RAFT Polymerization. Application as a Very Efficient Dispersant of $CaCO_3$ Kaolin, and $TiO_2$, Macromolecules, vol. 36, No. 9, pp. 3066-3077, 2003 American Chemical Society.
Habib Skaff et al., "Reversible Addition Fragmentation Chain Transfer (RAFT) Polymerization From Unprotected Cadmium Selenide Nanoparticles," Angewandte Chemie, 2004, 116 pp. 5497-5500; 2004 Wiley-VCH Verlag FmbH & Co. KgaA, Weinheim.

* cited by examiner

POLYMERISATION PROCESS AND POLYMER PRODUCT

CROSS-REFERENCE TO RELATED APPLICATION

This application is a National Stage entry of International Application No. PCT/AU2005/001512, filed Oct. 4, 2005, the entire specification claims and drawings of which are incorporated herewith by reference.

FIELD OF THE INVENTION

The present invention relates to a method of polymerising monomer to form polymer at the surface of particulate material, to polymer encapsulated particulate material and to products comprising the polymer encapsulated particulate material. The polymer encapsulated particulate material is particularly suited for use in coating formulations, and it will therefore be convenient to describe the invention with an emphasis toward this application. However, it is to be understood that the polymer encapsulated particulate material may be used in various applications.

BACKGROUND OF THE INVENTION

Deposition of polymer at the surface of particulate materials can afford polymer/particulate material composites that may be used in various applications. For example, polymer may be deposited to coat and encapsulate the particulate material. In this case, the polymer coating could be used to protect the particulate material from an external environment, to effect the controlled release of the particulate material to an external environment, and/or to alter the surface characteristics that the particulate material presents to an external environment. As a case in point, polymer encapsulated pesticide, herbicide or pharmaceutical particulate materials may be used to provide controlled release products. Alternatively, polymer encapsulated pigment particulate material might be used to enhance certain characteristics of paint formulations.

For the efficiency and reliability of products comprising such polymer/particulate material composites, it is generally desirable that polymer is deposited at the surface of the particulate material in a relatively controlled, even and reproducible manner. Where the particulate material is encapsulated in and dispersed throughout a bulk polymeric matrix, it will also be generally desirable that the particulate material is uniformly dispersed throughout that matrix.

To date, a common approach to encapsulate particulate materials with polymer has involved dispersing the particulate material into a liquid medium comprising a preformed polymer. The liquid medium may be formed by dissolving the polymer in a solvent, or by simply melting the polymer. Alternatively, the particulate material might be dispersed in monomer which is then polymerised to form the polymer. However, the ability to successfully apply such methodologies is often highly polymer and/or particulate material dependent. Furthermore, dispersing agents (i.e. agents with surface activity such as surfactants) often need to be used to facilitate the dispersion of the particulate material in the coating medium. The use of conventional dispersing agents in this manner can be detrimental to the final products in which the polymer/particulate material composites are employed. In particular, conventional dispersing agents are prone to migrate and localise and thereby undesirably alter the wetting characteristics of the product.

A further problem associated with conventional techniques for depositing polymer to coat and encapsulate particulate materials is that they typically afford little if no control over being able to reproducibly coat the particulate material with a relatively uniform layer of polymer at a variety of thicknesses.

As an alternative to coating particles with preformed polymer, attempts have been made to use conventional free radical polymerisation processes to form polymer at the surface of particulate material. However, such attempts have been generally unsuccessful. In particular, processes employing conventional free radical polymerisation techniques to polymerise monomer at the surface of particulate materials are generally not very controllable and have a tendency to produce pimples of, or uneven, polymer at the surface of the particles rather than a uniform polymer coating.

Numerous other methods for depositing polymer at the surface of particulate materials have been reported. However, such methods have generally offered little in the way of improved control over the polymer deposition and/or are commercially non-viable.

Accordingly, there remains a need for a commercially viable method for depositing polymer in a controllable manner at the surface of particulate materials. Such a method will preferably be robust, efficient and capable of being applied to a broad range of polymers and particle types and sizes.

SUMMARY OF THE INVENTION

The present invention provides a method of polymerising monomer to form polymer at the surface of particulate material, said method comprising:
providing a dispersion of said particulate material in a continuous liquid phase, said dispersion comprising a RAFT agent as a stabiliser for said particulate material, and said continuous liquid phase comprising one or more ethylenically unsaturated monomers; and
polymerising said one or more ethylenically unsaturated monomers under the control of said RAFT agent to thereby form polymer at the surface of said particulate material.

In essence, the method of the invention provides a unique interfacial polymerisation technique that enables polymer to be formed at the surface of particulate materials in a substantially controllable and reproducible manner. The method enables a diverse array of polymers to be formed at the surface of an equally diverse array of particulate materials. Provided that the particulate material can be dispersed in the continuous liquid phase, the particles can be of any shape or size.

Through the control afforded by the method, polymer may be formed at the surface of the particulate material in a substantially even fashion and can be provided at tailored thicknesses. Such control advantageously enables the particulate material to be encapsulated by a desired thickness of polymer to provide for a dispersion of polymer encapsulated particulate material in a liquid. Alternatively, where such polymerisation is allowed to continue and sufficient polymer mass is formed, polymer which encapsulates the particulate material may coalesce to provide for a polymer mass having the particulate material dispersed substantially uniformly therethrough. In this case, it may be that the continuous liquid phase consists essentially of the monomer to be polymerised.

In one aspect the present invention provides polymer encapsulated particulate material that is 100 microns or less in size, said particulate material being encapsulated in a substantially uniform and continuous coating of a polymer which has at least in part been formed under the control of a RAFT agent.

The present invention also provides polymer encapsulated particulate material that is 100 microns or less in size, wherein the encapsulating polymer has at least in part been formed under the control of a RAFT agent, and wherein the particulate material is substantially uniformly dispersed throughout the encapsulating polymer.

Further aspects of the invention appear below in the detailed description of the invention.

BRIEF DESCRIPTION OF THE DRAWINGS

Preferred embodiments of the invention will now be illustrated by way of Example only with reference to the accompanying drawings in which.

DETAILED DESCRIPTION OF THE INVENTION

Figure 1:
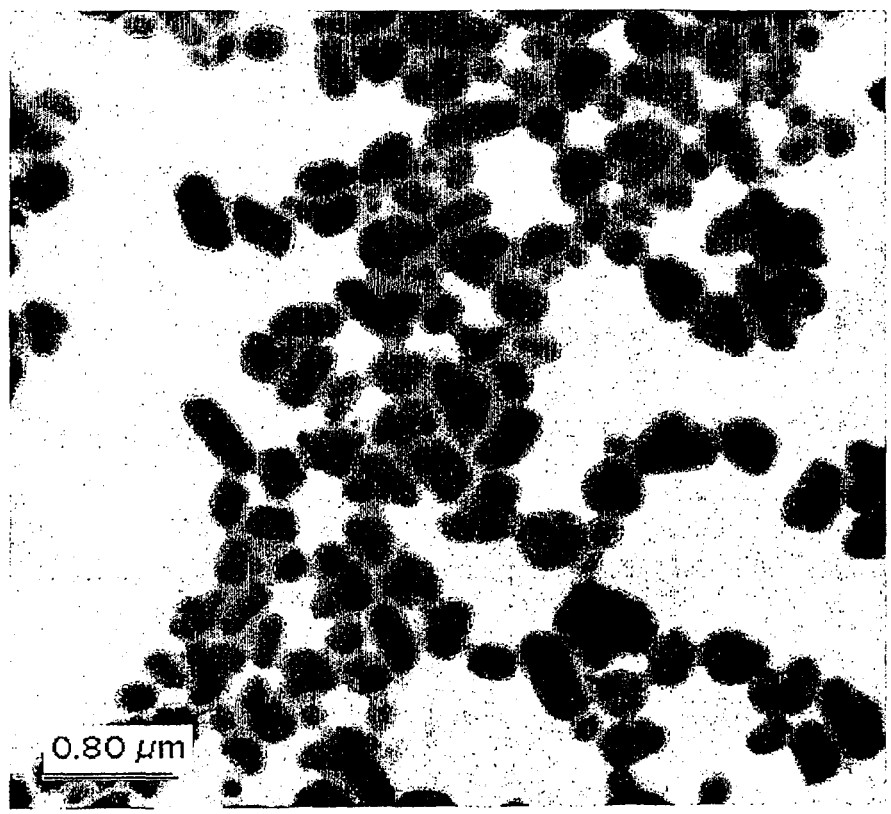
FIG. 1 illustrates polymer encapsulated $TiO_2$ pigment prepared in accordance with the invention.

In accordance with certain aspects of the invention, the RAFT agent functions as a stabiliser for the dispersed particulate material. By functioning as "a stabiliser", the RAFT agent serves to prevent, or at least minimise, coalescence or aggregation of the dispersed particulate material. As a stabiliser, the RAFT agent may prevent, or at least minimise, coalescence or aggregation of the particulate material through well known pathways such as steric and/or electrostatic repulsion. To provide the ability to function as a stabiliser, the RAFT agent comprises a moiety that can provide for the requisite steric and/or electrostatic repulsion.

A feature of certain aspects of the invention is that the one or more ethylenically unsaturated monomers are polymerised under the control of the RAFT agent. By being polymerised "under the control" of the RAFT agent is meant that the monomers are polymerised via a Reversible Addition-Fragmentation chain Transfer (RAFT) mechanism to form polymer.

RAFT polymerisation of ethylenically unsaturated monomers is described in WO 98/01478, and in effect is a radical polymerisation technique that enables polymers to be prepared having a well defined molecular architecture and low polydispersity. The technique employs a RAFT agent of the general formula (1):

(1)

which has been proposed to react with a propagating radical ($P_n^\bullet$) in accordance with Scheme 1.

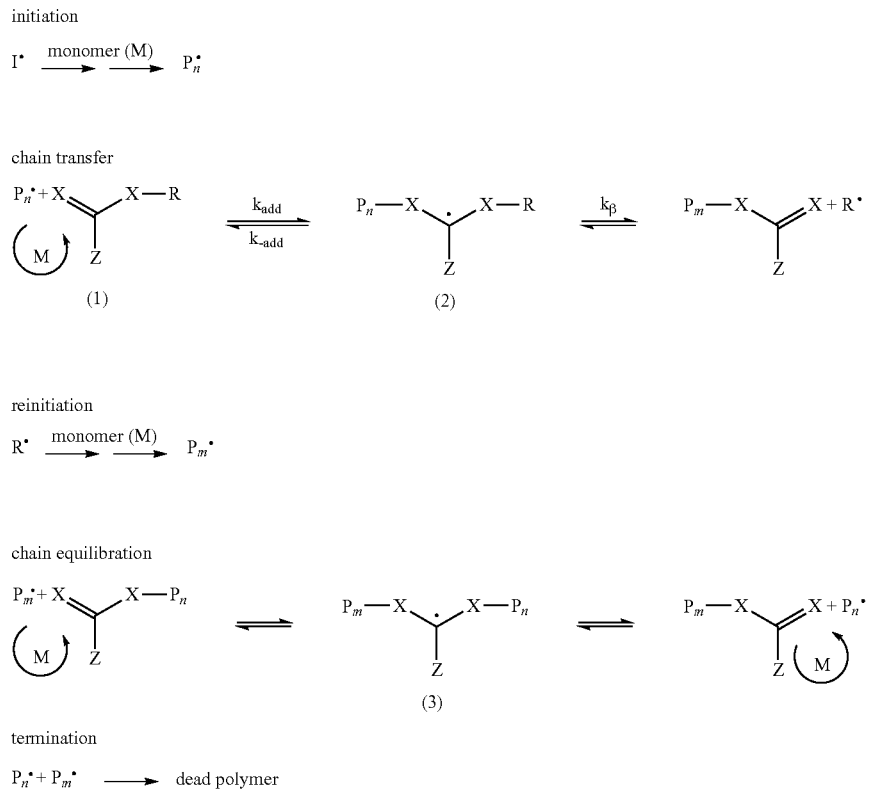

The effectiveness of the RAFT agent (1) is believed to depend on a complex array of rate constants. In particular, the formation of polymer according to scheme 1 is believed to be reliant upon equilibria that require high rate constants for the addition of propagating radicals to agent (1) and the fragmentation of intermediate radicals (2) and (3), relative to the rate constant for propagation.

The rate constants associated with RAFT polymerisation are believed to be influenced by a complex interplay between stability, steric and polarity effects in the substrate, the radicals and the products formed. The polymerisation of specific monomers and combinations of monomers will introduce different factors and structural preferences for the agent (1). The interplay of factors for a particular system have been largely rationalised on the basis of the results obtained. A clear definition of all factors that influence polymerisation for any particular system is yet to be fully understood As used herein, the phrase "RAFT polymer" is intended to denote a polymer that is formed through one or more ethylenically unsaturated monomers being polymerised under the control of a RAFT agent.

In accordance with the method of the invention, monomers are polymerised to form polymer at the surface of the particulate material. By polymer being formed "at the surface" is meant that polymer forms on or immediately adjacent (i.e. in the direction of the continuous liquid phase) the outermost surface of the particulate material. In other words, polymer forms at the interface between the particulate material and the continuous liquid phase such that it can coat the particulate material. Polymer will generally be formed so as to fully coat or encapsulate the particulate material.

As used herein, the phrase "particulate material" is intended to embrace any material that is capable of being dispersed throughout the continuous liquid phase, be it a solid, semi-solid or liquid. By the particulate material being "dispersed" throughout the continuous phase, it in effect forms a discontinuous phase within the continuous liquid phase. Provided that it can be dispersed throughout the continuous liquid phase, the particulate material may take any shape or size. However, it is recognised that particulate materials having a high aspect ratio, for example those having a flat lamellar or needle shape, may prove more difficult to uniformly coat with polymer than particulate material having a low aspect ratio.

The dispersed particulate material may be in the form of primary particles, or in the form of an aggregation of primary particles. The method of the invention has advantageously been found to be particularly effective at forming polymer at the surface of primary particles.

Given that polymer is formed at the surface of the particulate material, it will be appreciated that the particulate material per se should be substantially free of monomer that may be polymerised under the control of the RAFT agent. If the particulate material were to contain monomer, for example as in a liquid particle comprising monomer, polymer is likely to form internally or within the particulate material.

Those skilled in the art will appreciate that as the size of particulate materials decrease, the degree of difficulty in being able to deposit polymer in a controllable manner at the surface of the materials increases. The unique interfacial polymerisation afforded by the method of the invention advantageously enables polymer to be formed in a controlled manner with relative ease at the surface of both small and large particles alike, be they primary particles or aggregates thereof.

Accordingly, the particulate material may be of any type, shape or size provided that it can be dispersed throughout the continuous liquid phase. Preferably, the largest dimension of the particulate material is no greater than 10 microns, more preferably no greater than 2 microns. The method of the invention has been found to be particularly effective at forming polymer at the surface of sub-micron particles, for example less than 0.5 microns, even less than 0.25 microns.

Suitable substances from which the particulate material may be formed include, but are not limited to, pigments in general, inorganic material such as titanium dioxide, zinc oxide, calcium carbonate, iron oxide, silicon dioxide, barium sulfate, carbon black, organic pigments such as phthalocyanine blue, phthalocyanine green, quinacridone and dibromananthrone, magnetic materials such as $\gamma$-iron oxide, waxes, bioactive agents such as pesticides, herbicides, fungicides and pharmaceuticals, water, and combinations thereof.

Preferably, the particulate material is a solid (i.e. in solid form at the temperature which the method of the invention is performed).

It is generally preferred that the particulate material that is to be encapsulated by polymer is substantially inert to the reaction conditions under which the RAFT polymerisation process is conducted.

In further describing the nature of, and the interaction between, the continuous liquid phase and the dispersed particulate material it can be convenient to refer to their relative solubility and/or polarity. For example, in order to provide a continuous liquid phase and a dispersed liquid particulate material, the liquids will typically have sufficiently different polarities to render them substantially immiscible. In other words, one liquid will be sufficiently hydrophilic and the other sufficiently hydrophobic so that they form a polyphasic system. In contrast, to provide a continuous liquid phase and a dispersed solid particulate material the solid need only be insoluble in the liquid phase, with the polarity that the solid particulate material presents to the liquid phase, and vice versa, generally being irrelevant to forming the dispersion.

From the forgoing, those skilled in the art will appreciate that the terms "hydrophilic" and "hydrophobic" used herein are not intended to define absolute qualities of a particular substance but rather to be an indicator of a favourable or unfavourable interactions (i.e. attractive or repulsive interactions). In other words, the terms "hydrophilic" and "hydrophobic" are used herein as primary indicators to define characteristics such as like attracting like and unlike repelling unlike.

As a convenient point of reference only, a person skilled in the art might consider a "hydrophilic" liquid to have a solubility in water of at least 5 g/L at 25° C., and a "hydrophobic" liquid to have a solubility in water of less than 5 g/L at 25° C. In terms of a solid, the terms "hydrophilic" and "hydrophobic" might be considered by a person skilled in the art to be a reference to a solid which could be wetted by (i.e. does not repel) a hydrophilic and hydrophobic liquid, respectively.

In practical terms, the continuous liquid phase in effect functions as a reaction medium in which the one or more ethylenically unsaturated monomers are polymerised to form polymer at the surface of the particulate material. The monomer may be present in the continuous liquid phase as a separate liquid phase, it may be fully soluble in the continuous liquid phase, or the continuous liquid phase may itself consist essentially of the monomer.

Where the continuous liquid phase does not consist essentially of the one or more ethylenically unsaturated monomers, the method of the invention may be conveniently used to prepare a dispersion of polymer encapsulated particles in a liquid. For example, where the continuous liquid phase comprises water and the particulate material is titanium dioxide, the method of the invention may be used to prepare an aqueous dispersion of polymer encapsulated titanium dioxide particles.

The moiety of the RAFT agent that functions to stabilise the particulate material in the continuous liquid phase can also advantageously function to stabilise a liquid dispersed polymer encapsulated particulate material formed by the method of the invention. Accordingly, no additional dispersant to disperse the polymer encapsulated particulate material in the liquid is required.

By being "encapsulated" is meant that the polymer substantially surrounds the entire particulate material. The polymer may, however, exhibit a degree of porosity (i.e. have some holes or voids in it).

In a preferred embodiment the invention provides a method of preparing a dispersion of polymer encapsulated particulate material in a liquid, said method comprising:
providing a dispersion of particulate material in a continuous liquid phase, said dispersion comprising a RAFT agent as a stabiliser for said particulate material, and said continuous liquid phase comprising one or more ethylenically unsaturated monomers; and
polymerising said one or more ethylenically unsaturated monomers under the control of said RAFT agent to form polymer at the surface of said particulate material, thereby providing said dispersion of polymer encapsulated particulate material in a liquid.

Preferably, the continuous liquid phase is water and the method produces an aqueous dispersion of polymer encapsulated particulate material.

In accordance with this preferred embodiment, the particulate material encapsulated by the polymer may be a primary particle or an aggregate thereof. The polymer coating which encapsulates the particles will generally be substantially uniform around the entire particle. Provided the polymer encapsulated particulate material can remain dispersed, encapsulated particles of any size can be prepared using this methodology. The methodology can also be used to prepare the aforementioned polymer encapsulated particulate material that is 100 microns or less in size, wherein the particulate material is encapsulated in a substantially uniform and continuous coating of a polymer. Preferably, such novel polymer encapsulated particulate material is 70 microns or less, more preferably 40 microns or less, most preferably 5 microns or less in size. The size of the polymer encapsulated particulate material may also be in the sub-micron range, for example from 0.01 to 1 micron. For the avoidance of any doubt, reference to the "size" of the polymer encapsulated particulate materials in this case is that of the largest dimension provided by the combination of the polymer coating and the particulate material.

By the particulate material being encapsulated in a "substantially uniform and continuous coating" is meant that the coating does not present in an irregular manner around the particulate material and that the coating is substantially free of holes or voids. To achieve these properties, the thickness of the polymer surrounding the particulate material will generally be relatively constant. However, it may be that the thickness of the encapsulating polymer can vary gradually around the perimeter of the particulate material. For example, the particulate material may not be located at the precise centre of a spherical polymer coating. An assessment of the uniformity and continuity of the coating can generally be made visually, for example by Transmission Electron Microscopy (TEM).

The thickness of the polymer coating which encapsulates the particulate material is preferably at least 2 nanometers, more preferably at least 5 nanometers, most preferably at least 10 nanometers, still more preferably at least 20 nanometers. There is no particular limit as to the thickness of polymer that can encapsulate the particulate material, with the ultimate thickness generally being dictated by the intended application for the encapsulated particles.

Where the continuous liquid phase consists essentially of the one or more ethylenically unsaturated monomers, polymerisation of the monomers can result in the continuous liquid phase ultimately forming a polymeric matrix around all of the dispersed particles to thereby form a polymer mass having the particles dispersed therethrough. By the particles being initially dispersed in essentially monomer, and the monomer being polymerised at the surface of the dispersed particulate material, the method of the invention can in this case advantageously provide a polymer having the particulate material substantially uniformly dispersed therethrough.

In another preferred embodiment the invention provides a method of preparing a polymer having particulate material dispersed therethrough, said method comprising:
providing a dispersion of said particulate material in a continuous liquid phase, said dispersion comprising a RAFT agent as a stabiliser for said particulate material, and said continuous liquid phase consisting essentially of one or more ethylenically unsaturated monomers; and
polymerising said one or more ethylenically unsaturated monomers under the control of said RAFT agent to form polymer at the surface of said particulate material, thereby providing polymer having the particulate material dispersed therethrough.

By the expression "consisting essentially of" one or more ethylenically unsaturated monomers is meant that that the continuous liquid phase may include additional ingredients, but only if the additional ingredients do not materially alter the basic and novel characteristics of the method. By way of example only, a continuous liquid phase consisting essentially of one or more ethylenically unsaturated monomers might be one which is based on at least 90 weight percent monomer, preferably at least 95 weight percent monomer.

Where the continuous liquid phase consists essentially of the one or more ethylenically unsaturated monomers, it may be desirable to terminate polymerisation of the monomer prior to it all being converted into polymer. In this case, such a method could provide a dispersion of polymer encapsulated particulate material in the remaining non-polymerised one or more ethylenically unsaturated monomers.

As a variation on the method of the invention where the continuous liquid phase consists essentially of the one or more ethylenically unsaturated monomers, it may be desirable to disperse this continuous liquid phase, which itself has the particulate material dispersed therethrough, in a further or second continuous liquid phase to provide what might best be described as a double emulsion. For example, the particulate material might be dispersed in a continuous liquid phase which consists essentially of hydrophobic monomer, this continuous liquid phase could then be dispersed in water. Thus in this context, the first mentioned continuous liquid phase (i.e. that which consists essentially of monomer) may be considered continuous relative to particulate material dispersed therethrough, and the second mentioned continuous liquid phase may be considered continuous relative to the first continuous liquid phase dispersed therethrough. By performing the method in this manner, the monomer may be polymerised to form a dispersion of polymer particles which advantageously comprise the particulate material substantially uniformly dispersed therethrough. The size of such polymer particles may be conveniently controlled through variation of the droplet size of the dispersed continuous liquid phase comprising the dispersed particulate material using techniques well known in the art.

Preferably, the second continuous phase is an aqueous phase.

In the "double emulsion" method mentioned above, the RAFT agent functions as a stabiliser for the particulate material to prevent, or at least minimise, coalescence or aggregation of the dispersed particulate material in the continuous liquid phase which consists essentially of monomer. The resulting polymer encapsulated particulate material can therefore be advantageously substantially free of additional dispersant for the particulate material. It will be appreciated by those skilled in the art that a surface active stabiliser will also typically be required to prevent, or at least minimise, coalescence or aggregation of the dispersed aforementioned first continuous liquid phase in the second continuous liquid phase. In this case, it is preferred that the first continuous liquid phase is stabilised in the second continuous liquid phase by a colloid stabiliser. Suitable colloid stabilisers include, but are not limited to, cellulosic colloids such as hydroxy ethyl cellulose or polyvinyl alcohol.

In accordance with the "double emulsion" method described above, the particulate material dispersed throughout the resultant polymer particle may be a primary particle or an aggregate thereof. Advantageously, the particulate material will be substantially uniformly dispersed throughout the polymer particle. Provided the polymer encapsulated particulate material can remain dispersed, encapsulated particles of any size can be prepared using this methodology. The methodology can also be used to prepare the aforementioned polymer encapsulated particulate material that is 100 microns or less in size, wherein the particulate material is dispersed substantially uniformly throughout the polymer. Preferably, such novel polymer encapsulated particulate material is 70 microns or less, more preferably 40 microns or less, most preferably 5 microns or less in size. The size of the polymer encapsulated material may also be in the sub-micron range, for example from 0.01 to 1 micron, preferably from 0.5 to 1 micron. For the avoidance of any doubt, reference to the size of the polymer encapsulated particulate material in this case is that of the largest dimension provided by the combination the polymer and the particulate material dispersed therethrough.

By the RAFT agent facilitating dispersal of the particulate material throughout the continuous monomer phase and therefore the resulting encapsulating polymer, the polymer encapsulated particulate material can be formed substantially free of additional dispersant.

By the particulate material being dispersed "substantially uniformly" throughout the polymer is meant that the particulate material is not localised or agglomerated within the encapsulating polymer. For example, the particulate material should not be concentrated at the centre or perimeter of the encapsulating polymer An assessment of the dispersed state of the particulate material can generally be made visually, for example by Transmission Electron Microscopy (TEM).

By being "substantially free of additional dispersant" is meant that other than the RAFT agent the polymer encapsulated particulate material comprises less than 30 wt. %, preferably less than 10 wt. %, more preferably less than 5 wt. %, most preferably no other dispersant that is used to disperse the particulate material in the continuous liquid phase, relative to the total amount of dispersant present (i.e. inclusive of the RAFT agent which acts as a stabiliser).

Although the particulate material dispersed throughout the continuous liquid phase is stabilised by the RAFT agent, the particulate material may also be stabilised by other stabilisers such as conventional surfactants or any other surface active agent. Those skilled in the art will appreciate the range of surfactants suitable for this purpose. Nevertheless, to avoid certain disadvantages of using conventional surfactants it is preferred that the particulate material is stabilised only by the RAFT agent. In particular, conventional surfactants are not generally capable of being anchored to the resulting polymer/particle composite and are therefore prone to migrate from their stabilisation site. Products formed using polymer/particle composites that comprise conventional surfactant may therefore be adversely effected as a result of the surfactant migrating and localising in pockets. For example, the water repellency of the product may be compromised.

RAFT agent used in accordance with the invention not only functions as a stabiliser but also plays an active role in forming polymer at the surface of the particulate material. By virtue of this polymerisation role, the RAFT agent is inherently covalently bound to the polymer that is formed and is therefore prevented from migrating. Where a conventional surfactant is used in the method of the invention, the stabilising function of the RAFT agent effectively reduces the amount of conventional surfactant required and thereby provides a means to at least minimise the negative effects of using such surfactant.

As used herein, the expressions "polymer/particulate material composite" and "polymer/particle composite" are intended to denote a product formed through the deposition of polymer at the surface of particulate material.

To function as a stabiliser, the RAFT agent used in accordance with the invention will generally be physically associated in some way with the outermost surface of the particulate material. Preferably, the physical association between the RAFT agent and the particulate material will be by way of the RAFT agent being adsorbed onto the outermost surface of the particulate material. By having an ability to be adsorbed onto the outermost surface of the particulate material, it will be appreciated that the RAFT agent will exhibit surface activity, or in other words it will be surface active. An adsorbed RAFT agent can exhibit a degree of lability and is therefore less prone to become enveloped by polymer formed at the surface of the particle. In other words, an adsorbed RAFT agent can have the ability to move freely away from the surface of the particulate material with the polymer that is being formed.

A surface active RAFT agent used in accordance with the invention will have a structure that enables it to (a) be preferentially adsorbed onto the outermost surface of the particulate material rather than be solvated by and in the continuous liquid phase, (b) function as a stabiliser for the particulate material, and (c) control polymerisation of the one or more ethylenically unsaturated monomers. Further details on the structural characteristics of such surface active RAFT agents are discussed below.

RAFT agents suitable for use in the present invention include those of general formula (4):

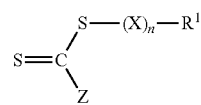

where each X is independently a polymerised residue of an ethylenically unsaturated monomer, n is an integer ranging from 0 to 100, preferably from 0 to 60, most preferably from 0 to 30, R.sup.1 is an organic group optionally substituted with one or more hydrophilic groups and Z is any group that can promote sufficient reactivity of the thiocarbonyl group towards radical addition while not slowing the rate of fragmentation to the extent that there is unacceptable retardation of polymerisation. Preferred $R^1$ groups include $C_1$-$C_6$ alkyl, $C_1$-$C_6$ alkoxy aryl or heteroaryl, each of which is substituted with one or more hydrophilic groups selected from —$CO_2H$, —$CO_2RN$, —$SO_3H$, —$OSO_3H$, —SORN, —$SO_2RN$, —$OP(OH)_2$, —$P(OH)_2$, —$PO(OH)_2$, —OH, —ORN, —($OCH_2$—CHR), —OH, —$CONH_2$, CONHR', CONR'R", —NR'R", —$N^+$R'R"R''', where R is selected from $C_1$-$C_6$ alkyl, w is 1 to 10, R', R" and R''' are independently selected from alkyl and aryl which are optionally substituted with one or more hydrophilic substituents selected from —$CO_2H$, —$SO_3H$, —$OSO_3H$, —OH, —($COCH_2CHR$)$_w$—OH, —$CONH_2$, —SOR and $SO_2R$, and salts thereof, R and w are as defined above. Particularly preferred $R^1$ groups include, but are not limited to, —CH($CH_3$)$CO_2H$, —CH($CO_2H$)$CH_2CO_2H$, —C($CH_3$)$_2CO_2H$. Preferred Z groups include, optionally substituted alkoxy, optionally substituted aryloxy, optionally substituted alkyl, optionally substituted aryl, optionally substituted heterocyclyl, optionally substituted arylalkyl, optionally substituted alkylthio, optionally substituted arylalkylthio, dialkoxy- or diaryloxy-phosphinyl [—P(=O)$OR^2_2$], dialkyl- or diarylphosphinyl [—P(=O)$R^2_2$], optionally substituted acylamino, optionally substituted acylimino, optionally substituted amino, $R^1$—(X)$_n$—S— and a polymer chain formed by any mechanism, for example polyalkylene oxide polymers such as water soluble polyethylene glycol or polypropylene glycol, and alkyl end capped derivatives thereof, where $R^1$, X and n are as defined above and $R^2$ is selected from the group consisting of optionally substituted $C_1$-$C_{18}$ alkyl, optionally substituted $C_2$-$C_{18}$ alkenyl, optionally substituted aryl, optionally substituted heterocyclyl, optionally substituted aralkyl, optionally substituted alkaryl. Particularly preferred Z groups include, but are not limited to, —$CH_2(C_6H_5)$, $C_1$-$C_{20}$ alkyl,

where e is 2 to 4, and —$SR^3$, where $R^3$ is selected from $C_1$ to $C_{20}$ alkyl.

Preferred optional substituents for $R^2$ and Z groups include epoxy, hydroxy, alkoxy, acyl, acyloxy, carboxy (and salts), sulfonic acid (and salts), alkoxy- or aryloxy-carbonyl, isocyanato, cyano, silyl, halo, and dialkylamino.

In selecting both $R^1$ and Z groups for RAFT agents of formula (4), those agents resulting from any combination of particularly preferred $R^1$ and Z groups are also particularly preferred. Where the hydrophilic group is —$N^+$R'R"R''' there will be an associated counter anion.

Other suitable RAFT agents include those of formula (4) in which $R^1$ is an organic group optionally substituted with one or more hydrophobic groups. In this case, Z is preferably an organic group optionally substituted with one or more hydrophilic groups.

As used herein, the terms "aryl" and "heteroaryl" refer to any substituent which includes or consists of one or more aromatic or heteroaromatic ring respectively, and which is attached via a ring atom. The rings may be mono or polycyclic ring systems, although mono or bicyclic 5 or 6 membered rings are preferred. Examples of suitable rings include but are not limited to benzene, biphenyl, terphenyl, quaterphenyl, naphthalene, tetrahydronaphthalene, 1-benzylnaphthalene, anthracene, dihydroanthracene, benzanthracene, dibenzanthracene, phenanthracene, perylene, pyridine, 4-phenylpyridine, 3-phenylpyridine, thiophene, benzothiophene, naphthothiophene, thianthrene, furan, benzofuran, pyrene, isobenzofuran, chromene, xanthene, phenoxathiin, pyrrole, imidazole, pyrazole, pyrazine, pyrimidine, pyridazine, indole, indolizine, isoindole, purine, quinoline, isoquinoline, phthalazine, quinoxaline, quinazoline, pteridine, carbazole, carboline, phenanthridine, acridine, phenanthroline, phenazine, isothiazole, isooxazole, phenoxazine and the like, each of which may be optionally substituted In this specification "optionally substituted" means that a group may or may not be further substituted with one or more groups selected from, but not limited to, alkyl, alkenyl, alkynyl, aryl, halo, haloalkyl, haloalkenyl, haloalkynyl, haloaryl, hydroxy, alkoxy, alkenyloxy, aryloxy, benzyloxy, haloalkoxy, haloalkenyloxy, acetyleno, carboximidyl, haloaryloxy, isocyano, cyano, formyl, carboxyl, nitro, nitroalkyl, nitroalkenyl, nitroalkynyl, nitroaryl, alkylamino, dialkylamino, alkenylamino, alkynylamino, arylamino, diarylamino, benzylamino, imino, alkylimine, alkenylimine, alkynylimino, arylimino, benzylimino, dibenzylamino, acyl, alkenylacyl, alkynylacyl, arylacyl, acylamino, diacylamino, acyloxy, alkylsulphonyloxy, arylsulphenyloxy, heterocyclyl, heterocycloxy, heterocyclamino, haloheterocyclyl, alkylsulphonyl, arylsulphonyl, alkylsolphinyl, arylsulphinyl, carboalkoxy, alkylthio, benzylthio, acylthio, sulphonamido, sulfanyl, sulfo and phosphorus-containing groups, alkoxysilyl, silyl, alkylsilyl, alkylalkoxysilyl, phenoxysilyl, alkylphenoxysilyl, alkoxyphenoxysilyl, arylphenoxysilyl, allophanyl, guanidino, hydantoyl, ureido, and ureylene.

Unless stated otherwise, the terms "halogen" and "halo" used herein refer to I, Br, Cl and F.

In this specification the term "alkyl", used either alone or in compound words such as "alkenyloxyalkyl", "alkylthio", "alkylamino" and "dialkylamino" denotes straight chain, branched or cyclic alkyl, preferably $C_{1-20}$ alkyl or cycloalkyl. Examples of straight chain and branched alkyl include methyl, ethyl, propyl, isopropyl, butyl, isobutyl, sec-butyl, tertbutyl, amyl, isoamyl, sec-amyl, 1,2-dimethylpropyl, 1,1-dimethyl-propyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2,-trimethylpropyl, 1,1,2-trimethylpropyl, heptyl, 5-methoxyhexyl, 1-methylhexyl, 2,2-dimethylpentyl, 3,3-dimethylpentyl, 4,4-dimethylpentyl, 1,2-dimethylpentyl, 1,3-dimethyl-pentyl, 1,4-dimethyl-pentyl, 1,2,3,-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyl-octyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1-2-pentylheptyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like.

As used herein, the term "salt" denotes a species in ionised form, and includes both acid addition and base addition salts. In the context of the present invention, suitable salts are those that do not interfere with the RAFT chemistry.

As used herein, the term "counter anion" denotes a species capable of providing a negative charge to balance the charge of the corresponding cation. Examples of counter anions include, $Cl^-$, $I^-$, $Br^-$, $F^-$, $NO_3^-$, $CN^-$ and $PO_3^-$.

As used herein, the term "alkoxy" denotes straight chain or branched alkoxy, preferably $C_{1-20}$ alkoxy. Examples of alkoxy include methoxy, ethoxy, n-propoxy, isopropoxy and the different butoxy isomers.

As used herein, the term "alkenyl" denotes groups formed from straight chain, branched or cyclic alkenes including ethylenically mono-, di- or poly-unsaturated alkyl or cycloalkyl groups as previously defined, preferably $C_{2-20}$ alkenyl. Examples of alkenyl include vinyl, allyl, 1-methylvinyl, butenyl, iso-butenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3-heptenyl, 1-octenyl, cyclooctenyl, 1-nonenyl, 2-nonenyl, 3-nonenyl, 1-decenyl, 3-decenyl, 1,3-butadienyl, 1-4,pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl and 1,3,5,7-cyclooctatetraenyl.

As used herein, the term "alkynyl" denotes groups formed from straight chain, branched or cyclic alkyne including those structurally similar to the alkyl and cycloalkyl groups as previously defined, preferably $C_{2-20}$ alkynyl. Examples of alkynyl include ethynyl, 2-propynyl and 2- or 3-butynyl.

As used herein, the term "acyl" either alone or in compound words such as "acyloxy", "acylthio", "acylamino" or "diacylamino" denotes carbamoyl, aliphatic acyl group and acyl group containing an aromatic ring, which is referred to as aromatic acyl or a heterocyclic ring which is referred to as heterocyclic acyl, preferably $C_{1-20}$ acyl. Examples of acyl include carbamoyl; straight chain or branched alkanoyl such as formyl, acetyl, propanoyl, butanoyl, 2-methylpropanoyl, pentanoyl, 2,2-dimethylpropanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl; alkoxycarbonyl such as methoxycarbonyl, ethoxycarbonyl, t-butoxycarbonyl, t-pentyloxycarbonyl and heptyloxycarbonyl; cycloalkylcarbonyl such as cyclopropylcarbonyl, cyclobutylcarbonyl, cyclopentylcarbonyl and cyclohexylcarbonyl; alkylsulfonyl such as methylsulfonyl and ethylsulfonyl; alkoxysulfonyl such as methoxysulfonyl and ethoxysulfonyl; aroyl such as benzoyl, toluoyl and naphthoyl; aralkanoyl such as phenylalkanoyl (e.g. phenylacetyl, phenylpropanoyl, phenylbutanoyl, phenylisobutylyl, phenylpentanoyl and phenylhexanoyl) and naphthylalkanoyl (e.g. naphthylacetyl, naphthylpropanoyl and naphthylbutanoyl; aralkenoyl such as phenylalkenoyl (e.g. phenylpropenoyl, phenylbutenoyl, phenylmethacryloyl, phenylpentenoyl and phenylhexenoyl and naphthylalkenoyl (e.g. naphthylpropenoyl, naphthylbutenoyl and naphthylpentenoyl); aralkoxycarbonyl such as phenylalkoxycarbonyl (e.g. benzyloxycarbonyl); aryloxycarbonyl such as phenoxycarbonyl and napthyloxycarbonyl; aryloxyalkanoyl such as phenoxyacetyl and phenoxypropionyl; arylcarbamoyl such as phenylcarbamoyl; arylthiocarbamoyl such as phenylthiocarbamoyl; arylglyoxyloyl such as phenylglyoxyloyl and naphthylglyoxyloyl; arylsulfonyl such as phenylsulfonyl and napthylsulfonyl; heterocycliccarbonyl; heterocyclicalkanoyl such as thienylacetyl, thienylpropanoyl, thienylbutanoyl, thienylpentanoyl, thienylhexanoyl, thiazolylacetyl, thiadiazolylacetyl and tetrazolylacetyl; heterocyclicalkenoyl such as heterocyclicpropenoyl, heterocyclicbutenoyl, heterocyclicpentenoyl and heterocyclichexenoyl; and heterocyclicglyoxyloyl such as thiazolylglyoxyloyl and thienylglyoxyloyl.

As used herein, the terms "heterocyclic", "heterocyclyl" and "heterocycl" used on their own or as part of a term such as "heterocyclicalkenoyl", "heterocycloxy" or "haloheterocyclyl" refer to aromatic, pseudo-aromatic and non-aromatic rings or ring systems which contain one or more heteroatoms selected from N, S, and O and which may be optionally substituted. Preferably the rings or ring systems have 3 to 20 carbon atoms. The rings or ring systems may be selected from those described above in relation to the definition of "heteroaryl".

Most preferred RAFT agents include, but are not limited to, agents represented by the following general formulas 5 to 13:

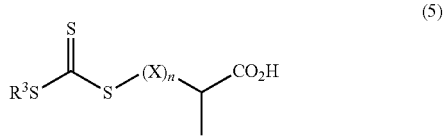

(5)

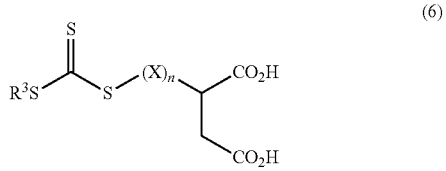

(6)

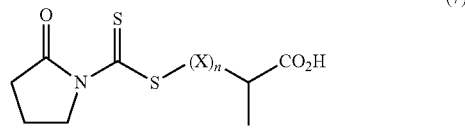

(7)

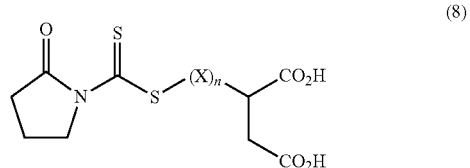

(8)

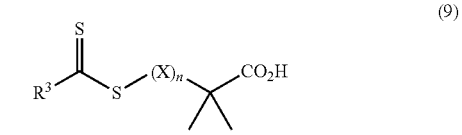

(9)

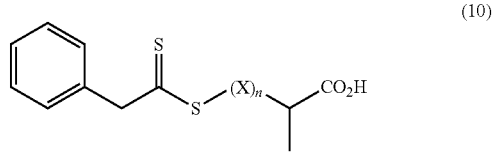

(10)

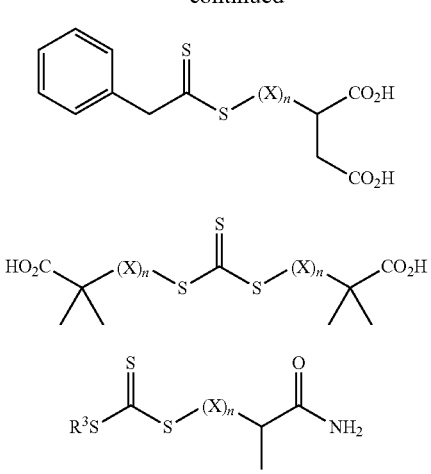

where $R^3$, X and n are as previously defined.

Where a RAFT agent is to be used in accordance with the method of the invention in an aqueous environment (eg. in a continuous aqueous phase), it is preferable that it demonstrates hydrolytic stability. Trithiocarbonyl RAFT agents are particularly preferred for use in such an environment.

The RAFT agents of formula (4) will have structural features that enable them to physically associate with the particulate material. Where the RAFT agent is physically associated with the particulate material by being adsorbed onto its outermost surface, the required surface activity of the RAFT agent may be provided in a number of ways. For example, with reference to formula (4), the RAFT agent may derive its surface activity through one or more of the —Z group, —$(X)_n$— group, and the —$R^1$ group. The surface activity afforded by the Z, $X_n$, and $R^1$ groups will typically result from one or more of these groups themselves comprising group(s), section(s), or region(s) having a combination of hydrophilic and hydrophobic properties.

Accordingly, in describing structural features of RAFT agents of formula (4) that provide for such surface activity, it can be useful to describe, by way of example only, the distribution of hydrophilic and hydrophobic group(s), section(s) or region(s) throughout the structure of the RAFT agent. Those skilled in the art will appreciate that surface activity of a compound may be derived from that compound having a well defined section(s) or region(s) of hydrophilic and hydrophobic character, or a less well defined section(s) or region(s) of hydrophilic and hydrophobic character. Structures of formula (4) having a well defined section(s) or region(s) of hydrophobic and hydrophilic character, for example as part of the —$(X)_n$— group, may be conveniently referred to as having a block copolymer structure, whereas those having a less well defined section(s) or region(s) of hydrophobic and hydrophilic character may be conveniently referred to as having alternating or random copolymer structures, or even a homopolymer structure. Provided that the RAFT agent exhibits surface activity, the present invention is intended to embrace all such structures.

For example, if the —$(X)_n$— group were to provide the RAFT agent of formula (4) with its surface activity, the group may have a well defined block copolymer structure such as AAAAAABBBBBB, an alternating copolymer structure such as ABABABABABAB, a random block copolymer structure such as AABABABBBAAB, or potentially even a homopolymer structure such as CCCCCCCCCCCC, where A represents a hydrophobic repeat unit, B represents a hydrophilic repeat unit, and C represents a repeat unit having sufficient hydrophilic and hydrophobic properties to impart the requisite surface activity to the RAFT agent.

For convenience, those RAFT agents of formula (4) having surface activity derived from a section(s) or region(s) of hydrophilic and hydrophobic character will hereinafter be referred to as amphipathic RAFT agents.

As used herein, the expression "amphipathic RAFT agent(s)" is intended to denote a surface active RAFT agent that has a structure with both hydrophilic and hydrophobic sections or regions. By the term "region(s)" or the expression "section(s) or region(s)" is meant that the amphipathic RAFT agent comprises as part of its molecular structure at least two or three consecutive groups or repeat units having hydrophilic or hydrophobic properties. Generally, the sections or regions will comprise at least two or three repeat units derived from hydrophilic or hydrophobic ethylenically unsaturated monomers.

As a surface active stabiliser, an amphipathic RAFT agent typically comprises both hydrophilic and hydrophobic sections or regions. One of these regions will generally have an affinity (i.e. attraction) toward the particulate material and the other an affinity toward the continuous liquid phase. The region having an affinity toward the continuous liquid phase will generally comprise the stabilising moiety of the amphipathic RAFT agent. Depending on the nature of the particulate material (eg solid or liquid), the region having an affinity toward the particulate material may be adsorbed at the surface of the particulate material (eg solid) or be solvated by and penetrate into the particulate material (eg. liquid). Where a region of the amphipathic RAFT agent is solvated by and penetrates into the particulate material, to ensure that formation of polymer occurs at the surface of the particulate material, the reactive RAFT moiety (i.e. that which plays an active role in the polymerisation reaction) should be associated with the region of the agent which has an affinity with the continuous liquid phase to thereby locate it outside of the particulate material.

Those skilled in the art will appreciate that such amphipathic character may be provided through different combinations of hydrophilic and hydrophobic regions. With reference to formula (4), an amphipathic RAFT agents preferably derive its amphipathic character from either:

1) a combination of a hydrophobic end and a hydrophilic end; wherein the Z group provides hydrophobic properties to one end, and $R^1$ and —$(X)_n$— provide hydrophilic properties to the other end. In this case —$(X)_n$— may be derived from hydrophilic monomer or be a tapered copolymer which gets progressively hydrophilic towards $R^1$; or 2) a combination of a hydrophobic end and a hydrophilic end; wherein the Z group provides hydrophilic properties to one end, and $R^1$ and —$(X)_n$— provide hydrophobic properties to the other end. In this case —$(X)_n$— may be derived from hydrophobic monomer or may be a tapered copolymer which gets progressively hydrophobic towards $R^1$; or 3) a combination of a hydrophobic end and a hydrophilic end; wherein the Z group and —$(X)_n$— provide hydrophobic properties to one end, and $R^1$ provides hydrophilic properties to the other end; or 4) a combination of a hydrophobic end and a hydrophilic end; wherein the Z group provides hydrophobic properties to one end, —$(X)_n$— provides hydrophilic properties to the other end, and $R^1$ is hydrophobic such that the net effect of $—(X)_n—$ and $R^1$ is to provide hydrophilic character to that end; or 5) a combination of hydrophilic ends and a hydrophobic middle section, wherein $Z=—S—(X)_n—R^1$, wherein each $R^1$ may be the same or different and provides hydrophilic properties to each end, and wherein $—(X)_n—$ provides hydrophobic properties to the middle section; or 6) a combination of hydrophobic and hydrophilic properties; wherein the portion of the $—(X)_n—$ group closest to $R^1$ provides the hydrophilic properties and the portion of the $—(X)_n—$ group closest to the thiocarbonylthio group provides the hydrophobic properties. In this case, $—(X)_n—$ of formula (4) may be further represented as $-(A)_m-(B)_o—$ to provide a block copolymer that has the following general formula (14):

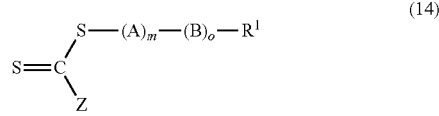
(14)

where each A and B is independently a polymerised residue of an ethylenically unsaturated monomer such that $-(A)_m-$ provides hydrophobic properties and $—(B)_o—$ provides hydrophilic properties, and m and o independently range from 1 to 99, preferably from 1 to 50, more preferably from 1 to 30, most preferably from 1 to 15, in each of the aforementioned ranges m and o will generally be at least 2 or 3, and Z is as described above. Z may also be chosen such that its polarity combines with that of $-(A)_m-$ to enhance the overall hydrophobic character to that end of the RAFT agent. In addition to the hydrophilic character provided by $—(B)_o—$, $R^1$ may also be hydrophilic and enhance the overall hydrophilic character to that end of the RAFT agent, or $R^1$ may be hydrophobic provided that the net effect of $—(B)_o—$ and $R^1$ results in an overall hydrophilic character to that end of the RAFT agent; or 7) a combination of hydrophobic and hydrophilic properties; wherein, $—(X)_n—$ of formula (4) may be further represented as $—(B)_f—[-(A)_m-(B)_o—]_p-(A)_g-$ to provide a copolymer with small block regions that has the following general formula (14a):

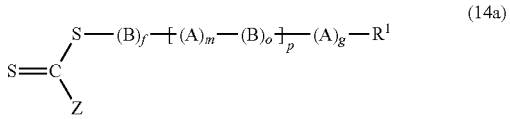
(14a)

where each A and B is independently a polymerised residue of an ethylenically unsaturated monomer such that A provides hydrophobic properties and B provides hydrophilic properties, f and g independently range from 0 to 10, preferably from 0 to 5, m and o independently range from 1 to 10, preferably 1 to 5, each repeat unit p may be the same or different, p ranges from 1 to 10, preferably 1 to 5, more preferably 1 to 3, with the proviso that when p is at least one of f or g is at least 1, and Z and $R^1$ are as defined above; the $—(B)_f—[-(A)_m-(B)_o—]_p-(A)_g-$ group of RAFT agents of formula (14a) preferably provides for a random block copolymer structure; or 8) a combination of hydrophilic ends and a hydrophobic middle section, wherein Z of general formula (14) is $—S-(A)_m-(B)_o—R^1$, where $-(A)_m-$ and $—(B)_o—$ are as defined above. Each $R^1$ may be the same or different and the combination of $—(B)_o—R^1$ provides an overall hydrophilic character to one end, and the combination of the other $—(B)_o—R^1$ provides an overall hydrophilic character to the other end. The hydrophobic portion of this type of amphipathic RAFT agent is derived from $-(A)_m-$; or 9) a variation on general formula (14a) wherein Z is $—S—(B)_f—[-(A)_m-(B)_o—]_p-(A)_g-R^1$, where each A, B, $R^1$, g, f, m, o and p may be the same or different and are as defined in point (7) above.

Surface active character of the RAFT agent can also be provided through structures having less well defined block-like character. For example, the surface active character may be provided by a RAFT agent having alternating hydrophilic and hydrophobic repeat units, or even potentially a repeat unit which has in its own right sufficient hydrophilic and hydrophobic properties to impart surface active properties to the RAFT agent. Accordingly, with reference to formula (4) the RAFT agents in accordance with the invention may also derive surface active character from:

10) a combination of hydrophobic and hydrophilic properties; wherein $—(X)_n—$ may be further represented as $-[-A-B—]_q—$ to provide an alternating copolymer that has the following general formula (14b):

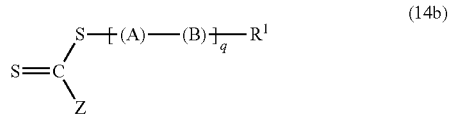
(14b)

where each A and B is independently a polymerised residue of an ethylenically unsaturated hydrophobic and hydrophilic monomer, respectively, and q is an integer ranging from 1 to 50, more preferably 2 to 25, most preferably from 2 to 10. Z and $R^1$ are as defined above. The order of A and B may be reversed such that $—(X)_n—$ is $—[—B-A-]_q-$.

Those skilled in the art will appreciate that surface active character may be imparted to RAFT agents in other ways than the general examples mentioned above in points 1) to 10). For example, the Z group in formula (14b) could be represented as $—S-[-A-B—]_q—R^1$.

The selection of a specific surface active RAFT agent for use in accordance with the invention will to a large extent be dictated by the polarity of both the continuous liquid phase and the particulate material. For example, the surface active character of a RAFT agent used in association with a hydrophilic particulate material dispersed within a hydrophilic continuous liquid phase is likely to be different from that of a RAFT agent used in association with a hydrophobic particulate material dispersed within a hydrophilic continuous liquid phase.

Where the particulate material is a solid or semi-solid, the selection of a specific surface active RAFT agent for use in accordance with the invention might also be dictated by the combined factors of how efficiently the RAFT agent adsorbs at the surface of the particulate material and the amount of polymer that is to be formed at that surface. In particular, where a relatively thick layer of polymer is to be formed at the surface of a solid particulate material, the RAFT agent is preferably selected such that the binding efficiency of the agent to the particulate material enables the agent to move away from that surface with the polymer as it's layer thickness increases. If the binding efficiency between the selected RAFT agent and the particulate material was sufficiently high to prevent such movement, the agent could be progressively enveloped by the polymer as it is formed to thereby reduce, or possibly eliminate, the stabilising function of the agent. Maintaining stabilisation of the polymer/particle composite via the RAFT agent can be particularly important where a dispersion of polymer coated particles is being prepared.

It will be appreciated from the foregoing that a number of variables need to be considered when selecting an RAFT agent for use in accordance with the invention. To further illustrate this point, a number of different approaches to performing the method are described in more detail directly below. In describing the interaction between the continuous liquid phase and the dispersed particulate material, be it solid, semi-solid, or liquid, it can also be convenient to refer to the polarity or the hydrophilicity/hydrophobicity of such entities.

The method in accordance with the invention may be performed using hydrophilic solid particulate material and a hydrophilic continuous liquid phase. In this case, a RAFT agent of formula (4) may be provided with a hydrophobic region that is sufficiently large relative to the hydrophilic region to render the agent substantially insoluble in the hydrophilic continuous liquid phase. In order to perform the method, the hydrophilic particulate material can be dispersed in a mixture of the hydrophilic liquid and one or more solvents in which the amphipathic RAFT agent is soluble. The ratio of the hydrophilic liquid to the one or more solvents is chosen such that the amphipathic RAFT agent is capable of being solvated in the mixture.

After the addition of the amphipathic RAFT agent to the mixture, additional hydrophilic liquid may then be added to cause the amphipathic RAFT agent to precipitate at the surface of the particulate material. In particular, by increasing the hydrophilic nature of the continuous liquid phase the solubility of the amphipathic RAFT agent decreases. As a result of this decrease in solubility, the hydrophobic region of the agent precipitates at the surface of the particulate material and the hydrophilic region of the agent associates with the continuous liquid phase to stabilise the particulate material from coalescing. Upon forming a stabilised dispersion of the particulate material in the continuous liquid phase, monomer may be added and polymerised to form polymer at the surface of the particulate material. The amphipathic RAFT agent may be selected such that its binding efficiency to the surface of the particulate material is relatively low to thereby enable the agent to move away from the surface of the particle with the polymer as it is formed.

A variation on the method described directly above might be where the amphipathic RAFT agent is substantially soluble in the hydrophilic continuous liquid phase, and where it comprises a non-ionisable hydrophilic region and a hydrophobic region that in itself comprises a small proportion of polymerised hydrophilic ionisable monomer. In order to perform the method, the amphipathic RAFT agent and the particulate material are introduced to the continuous liquid phase at a pH which facilitates the formation of an ionic charge at the surface of the particulate material and an opposite ionic charge at the hydrophobic region of the amphipathic RAFT agent. In this case, the small proportion of polymerised ionisable monomer in the hydrophobic region of the amphipathic RAFT agent can be sufficient to render the pH suitable to develop such a charge at the surface of the particulate material and at the hydrophobic region of the amphipathic RAFT agent.

Upon formation of the oppositely charged species, the amphipathic RAFT agent can adsorb at the surface of the particulate material such that the hydrophobic region thereof binds to the surface of the particulate material through an ionic mechanism, while the hydrophilic region thereof associates with the continuous liquid phase to stabilise the particulate material from coalescing. Depending upon the degree of ionic bonding that occurs between the amphipathic RAFT agent and the particulate material, it may be in this case that the amphipathic RAFT agent will not be free to move away from the surface of the particulate material with the polymer as it is formed. Under these circumstances, it will generally be preferred that the amount of polymer formed at the surface of the particulate material does not envelope the amphipathic RAFT agent such that it can no longer function as a stabiliser.

Alternatively, to enable a thicker deposit of polymer at the surface of the particulate material the amphipathic character of the amphipathic RAFT agent may be suitably adjusted to reduce the ionic binding efficiency, or a combination of two or more cooperative amphipathic RAFT agents may be used. An example of using two different amphipathic RAFT agents in such a cooperative manner is discussed directly below.

As a variation of the method, two different amphipathic RAFT agents may be used in accordance with the method of the invention. In this case, both of the amphipathic RAFT agents may be soluble in the hydrophilic continuous liquid phase, with one of the agents comprising a hydrophobic region and a non-ionisable hydrophilic region, and the other agent comprising a hydrophobic region and a hydrophilic region which in itself comprises a proportion of polymerised hydrophilic ionisable monomer. In order to perform the method, the amphipathic RAFT agents may be introduced to the hydrophilic liquid phase with the hydrophilic particulate material at a pH that promotes ionic binding of the hydrophilic region of the second mentioned amphipathic RAFT agent to the surface of the particulate material in a similar manner to that described above.

However, in this case the hydrophilic region of the second mentioned amphipathic RAFT agent adsorbs to the surface of the particulate material, and due to the hydrophilic nature of the continuous liquid phase the hydrophobic region of this amphipathic RAFT agent is believed to spread out over the particles surface to in effect render the surface of the particles with hydrophobic character. Stabilisation of the particulate material in the continuous liquid phase can then be attained as a result of the hydrophobic region of the first mentioned amphipathic RAFT agent adsorbing to the now hydrophobic surface of the particulate material and the non-ionisable hydrophilic region thereof associating with the hydrophilic continuous liquid phase.

Upon forming a stable dispersion of the particulate material in the continuous liquid phase, monomer may be introduced to form polymer at the surface of the material. In this case, monomer may be polymerised under the control of both the amphipathic RAFT agents to form the polymer. Where there is a relatively high bonding efficiency between the particulate material and the second mentioned amphipathic RAFT agent, this agent may be enveloped by the polymer as it is formed. However, as the first mentioned amphipathic RAFT agent is not adsorbed directly on the surface of the particulate material, it will be generally more free to move away from the surface of the particulate material with the polymer as it is formed. By this arrangement, the non-ionisable hydrophilic region of the first mentioned amphipathic RAFT agent can continue to function as a stabiliser for the particulate material as a thick layer of polymer is formed at the surface thereof.

If it is found that the dispersed encapsulated particles become destabilised as the thickness of the polymeric coating grows, stabilisation can often be maintained by incorporating an amount of ionisable monomer in the feed of hydrophobic monomer. Thus, although an original moiety comprising a stabilising charge becomes buried in the coating and rendered ineffective, the surface charge on the coated particles can be maintained by the later addition of ionisable monomer. Preferably an amount of from 1% to 5% of the ionisable monomer in the hydrophobic monomer feed would be used for this purpose. Suitable ionisable monomers would include but are not limited to acrylic acid, methacrylic acid and sodium styrene sulphonate.

By the term "ionisable", used in connection with ethylenically unsaturated monomers or a group or region of a RAFT agent formed from such monomers, is meant that the monomer, group or region has a functional group which can be ionised to form a cationic or anionic group. Such functional groups will generally be capable of being ionised under acidic or basic conditions through loss or acceptance of a proton. Generally, the ionisable functional groups are acid groups or basic groups. For example, a carboxylic acid functional group may form a carboxylate anion under basic conditions, and an amine functional group may form a quaternary ammonium cation under acidic conditions. The functional groups may also be capable of being ionised through an ion exchange process.

By the term "non-ionisable", used in connection with ethylenically unsaturated monomers or a group or region of a RAFT agent formed from such monomers, is meant that the monomer, group or region does not have ionisable functional groups. In particular, such monomers, groups or regions do not have acid groups or basic groups which can loose or accept a proton under acidic or basic conditions.

The method of the invention may also be used to form polymer at the surface of hydrophobic solid particulate material dispersed in a hydrophilic continuous liquid phase. The RAFT agent in this case may comprise a hydrophilic region and a hydrophobic region, with the hydrophobic region having a binding affinity toward the hydrophobic surface of the particulate material and the hydrophilic region associating with the continuous liquid phase to stabilise the particulate material from coalescing. Such an amphipathic RAFT agent may be substantially soluble or insoluble in the continuous liquid phase, and the method may be performed in a similar manner to that outlined above.

The method of the invention may also be used to form polymer at the surface of hydrophilic particulate material dispersed in a hydrophobic continuous liquid phase. The RAFT agent in this case may comprise a hydrophilic region and a hydrophobic region, with the hydrophilic region having a binding affinity toward the surface of the particulate material and the hydrophobic region associating with the continuous liquid phase to stabilise the particulate material from coalescing. Upon forming a stable dispersion of the particulate material in the continuous liquid phase monomer may be introduced to form the polymer at the surface of the particulate material.

In describing the interaction between a surface active RAFT agent and each of the continuous liquid phase and the dispersed particulate material, it will be appreciated that as the structure of a RAFT agent transitions from deriving its surface active properties from for example a block copolymer structure through to a random or alternating copolymer structure, or even a homopolymer structure, the role of the aforementioned more discrete hydrophilic and/or hydrophobic sections or regions of the agent become less well defined. For example, in a RAFT agent of formula (14b) the hydrophobic and hydrophilic moieties A and B, respectively, do not provide for discrete hydrophobic and hydrophilic regions, but nevertheless overall impart surface activity to the RAFT agent such that it can function as a stabiliser for the particulate material and gain control over polymerisation of the one or more ethylenically unsaturated monomers. In this case, the manner in which such RAFT agents interact with each of the continuous liquid phase and the particulate material to function as a stabiliser is not entirely clear.

Where the method of the invention is performed using surface active RAFT agents having a less well defined block copolymer structure, the agents will typically be selected such that the overall hydrophilicity (or hydrophobicty) of the RAFT agent is appropriate to the hydrophilicity (or hydrophobicty) of the surface of the particle to be coated. For example, a greater proportion of hydrophobic monomer might be used in the preparation of a RAFT agent to be used in accordance with the invention to form polymer at the surface of a hydrophobic particulate material than a hydrophilic particulate material.

In the general techniques outlined above for forming polymer at the surface of solid particulate materials, where the continuous liquid phase consists essentially of the one or more ethylenically unsaturated monomers the polymerisation may take place as soon as the particulate material is dispersed throughout the monomer. It will be appreciated that the general principles expounded in such techniques may be employed when performing the invention using semisolid or liquid particulate materials.

Depending upon the nature of the particulate material, the continuous liquid phase and the RAFT agent, it may be that prior to the formation of polymer at the surface of the particulate material, a surface active RAFT agent, although acting as a stabiliser, may exhibit a degree of lability. By a surface active RAFT agent exhibiting a degree of "lability" is meant that the agent can exist in an equilibrium between being solvated in the continuous liquid phase and being associated at the surface of the particulate material. For convenience, a RAFT agent that is not associated with the particulate material will hereinafter be referred to as "free" RAFT agent.

The presence of free RAFT agent in the continuous liquid phase can result in the formation of micelles and facilitate the formation of polymer which is not at the surface of the particulate material (i.e. independent polymer particles). Accordingly, surface active RAFT agents used in accordance with the invention are preferably selected to prevent, or at least minimise, independent polymer particle formation. It will be appreciated that provided a labile RAFT agent gains control of polymerisation at the surface of the particulate material, this polymerisation process itself will inevitably render the agent non-labile.

It has been found that RAFT agents having a less well defined block character, such as those described in points 7) and 10) above, upon becoming adsorbed onto the surface of the particulate material, are less prone to desorption and forming micelles in the continuous liquid phase. In other words, surface active RAFT agents having a less well defined block-like structure tend to be less labile than their "blocky" counterparts. The use of RAFT agents having a less well defined block structure has been found to be particularly useful in preparing dispersions of polymer encapsulated particulate materials with a high solids content (i.e. greater than about 50 weight percent).

Where the method of the invention is performed using a continuous liquid phase which does not consist essentially of the one or more ethylenically unsaturated monomers that is to be polymerised to form the polymer, it is preferred that the monomer is introduced to the continuous liquid phase after the particulate material and any surface active RAFT agent interact so as to provide for a stable dispersion. By adopting this approach, the likelihood of any surface active RAFT agent also acting as a stabiliser for monomer droplets in the continuous liquid phase is reduced. It is also preferred that the monomer which is introduced to the continuous liquid phase is done in a manner that avoids the formation of monomer droplets. In other words, it is preferred that the polymerisation is conducted under "starved feed" conditions. Such conditions also reduce the likelihood of stabilised monomer droplets being formed in the continuous liquid phase, which in turn also reduces the possibility of forming polymer that is independent of the particulate material.

Where it is desirable to minimise the possibility of forming polymer that is independent of the particulate material, the polymerisation may be conducted to a point where substantially all labile RAFT agent present has been rendered non-labile. At this point, the "lightly" polymer encapsulated particles may be separated from any independent polymer particles that may have formed or any residual free RAFT agent by a separation method such as centrifugation. The "lightly" polymer encapsulated particles could then be redispersed in a continuous liquid phase with monomer and the polymerisation continued to form a thicker polymer coating on the particulate material.

In accordance with the method of the invention, ethylenically unsaturated monomers are polymerised under the control of the RAFT agent to form polymer at the surface of the particulate material. The polymerisation will usually require initiation from a source of free radicals. The source of initiating radicals can be provided by any suitable method of generating free radicals, such as the thermally induced homolytic scission of suitable compound(s) (thermal initiators such as peroxides, peroxyesters, or azo compounds), the spontaneous generation from monomers (e.g. styrene), redox initiating systems, photochemical initiating systems or high energy radiation such as electron beam, X- or gamma-radiation. The initiating system is chosen such that under the reaction conditions there is no substantial adverse interaction of the initiator or the initiating radicals with the amphipathic RAFT agent.

Thermal initiators are chosen to have an appropriate half life at the temperature of polymerisation. These initiators can include one or more of the following compounds:
  2,2'-azobis(isobutyronitrile), 2,2'-azobis(2-cyanobutane), dimethyl 2,2'-azobis(isobutyrate), 4,4'-azobis(4-cyanovaleric acid), 1,1'-azobis(cyclohexanecarbonitrile), 2-(t-butylazo)-2-cyanopropane, 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine) dihydrochloride, 2,2'-azobis(2-amidinopropane) dihydrochloride, 2,2'-azobis(N,N'-dimethyleneisobutyramidine), 2,2'-azobis{2-methyl-N-[1,1-bis(hydroxymethyl)-2-hydroxyethyl] propionamide}, 2,2'-azobis{2-methyl-N-[1,1-bis(hydroxymethyl)-2-ethyl]propionamide}, 2,2'-azobis[2-methyl-N-(2-hydroxyethyl)propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyneodecanoate, t-butylperoxy isobutyrate, t-amyl peroxypivalate, t-butyl peroxypivalate, diisopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite.

This list is not exhaustive.

Photochemical initiator systems are chosen to have the requisite solubility in the reaction medium and have an appropriate quantum yield for radical production under the conditions of the polymerisation. Examples include benzoin derivatives, benzophenone, acyl phosphine oxides, and photo-redox systems.

Redox initiator systems are chosen to have the requisite solubility in the reaction medium and have an appropriate rate of radical production under the conditions of the polymerisation; these initiating systems can include, but are not limited to, combinations of the following oxidants and reductants:
  oxidants: potassium peroxydisulfate, hydrogen peroxide, t-butyl hydroperoxide.
  reductants: iron (II), titanium (Ill), potassium thiosulfite, potassium bisulfite.

Other suitable initiating systems are described in recent texts. See, for example, Moad and Solomon "the Chemistry of Free Radical Polymerisation", Pergamon, London, 1995, pp 53-95.

Suitable initiators which have an appreciable solubility in a hydrophilic reaction medium such as water include, but are not limited to, 4,4-azobis(cyanovaleric acid), 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine), 2,2'-azobis(N,N'-dimethyleneisobutyramidine) dihydrochloride, 2,2'-azobis(2-amidinopropane) dihydrochloride, 2,2'-azobis{2-methyl-N-[1,1-bis(hydroxymethyl)-2-ethyl]propionamide}, 2,2'-azobis[2-methyl-N-(2-hydroxyethyl) propionamide], 2,2'-azobis(isobutyramide) dihydrate, and derivatives thereof.

Suitable initiators which have an appreciable solubility in a hydrophobic reaction medium may vary depending on the polarity of the reaction medium, but typically would include oil soluble initiators such as azo compounds exemplified by the well known material 2,2'-azobisisobutyronitrile. Other readily available initiators are acyl peroxides such as acetyl and benzoyl peroxide as well as alkyl peroxides such as cumyl and t-butyl peroxides. Hydroperoxides such as t-butyl and cumyl hydroperoxides may also be used.

The continuous liquid phase in a given polymerization process may also contain other additives, for example additives to regulate pH.

In relation to the polymerisation process which occurs during the course of the method of the invention, it is important that polymer is formed at the surface of the particulate material and that this polymerisation proceeds under the control of the RAFT agent. Without wishing to be limited by theory, it is believed that the polymerisation process that operates during the method begins through the formation of a propagating monomer radical which diffuses through the continuous liquid phase and positions itself at the surface of the particulate material. As the RAFT agents are also positioned at the surface of the particulate material they can readily gain control over the polymerisation such that polymerisation of the monomers proceed under a RAFT mediated free radical process. To facilitate this process, it is preferred that the number of RAFT species present at the surface of the particulate material is greater than the sum of initiating radicals that reach that surface throughout the course of the polymerisation reaction. In general, the total number of initiating radicals that position themself at the surface of the particulate material should be less than the total number of RAFT agents present in the continuous liquid phase. Preferably, the total number of initiating radicals is less than 50 percent, more preferably less than 20 percent, of the total number of RAFT agents present in the continuous liquid phase.

In connection with facilitating the polymerisation of monomers under the control of the RAFT agents to form polymer at the surface of the particulate material, it is preferred that at any given point during the polymerisation process the amount of free RAFT agent present in the continuous liquid phase is relatively low compared with that which is adsorbed on the surface of the dispersed particulate material. Preferably, there is less than 50 wt %, more preferably less than 20 wt %, most preferably less than 10 wt % of "free" RAFT agent present in the continuous liquid phase at any point in time during the polymerisation process.

It is preferable that polymerisation of the monomers is maintained under the control of the RAFT agent throughout the entire polymerisation. However, provided that polymer at the surface of the particulate material is at least in part formed under the control of a RAFT agent, monomer may also be polymerised by other free radical pathways. Having said this, it will be appreciated that as the amount of monomer polymerised under the control of the RAFT agent decreases, the propensity for irregular growth and the formation of polymer in one reaction site only increases. The amount of monomer that may be polymerised by other free radical pathways in a given reaction sequence will to a large extent depend upon the intended application for the polymer encapsulated particulate material.

Evidence as to whether a polymerisation reaction in accordance with the method of the invention has proceeded, at least in part, under the control of a RAFT agent may be obtained by a simple visual assessment (for example by Transmission Electron Microscopy) of the polymer coating of the polymer encapsulated particulate material. Significant loss of "RAFT control" will be characterised by an irregular non-uniform polymer coating, whereas polymerisation under the control of the RAFT agent provides a regular uniform polymer coating.

Evidence of "RAFT control" may also be readily obtained by sampling the polymer/particulate material composite during the polymerisation reaction and analysing the resulting polymer by a suitable technique such as Gel Permeation Chromatography (GPC). Ideally, where "RAFT control" has been established, the polymer will have a lower polydispersity compared with a polymer prepared by a convention free radical mediated pathway. The other feature of "RAFT control" shown by GPC data is that molecular weight of the polymer should grow linearly with conversion. This is believed to be an important feature in performing the method of the invention. The polymer formed in accordance with the invention will generally show a linear growth of molecular weight with conversion even though the polydispersity of the polymer may broaden during the course of the polymerisation process.

The composition and architecture of the polymer formed at the surface of the particulate material may be tailored through the selection and controlled addition of monomer. A wide range of ethylenically unsaturated monomers may be used in accordance with the method. Suitable monomers are those which can be polymerised by a free radical process.

The monomers should also be capable of being polymerised with other monomers. The factors which determine copolymerisability of various monomers are well documented in the art. For example, see: Greenlee, R. Z., in Polymer Handbook 3$^{rd}$ Edition (Brandup, J., and Immergut. E. H. Eds) Wiley: New York, 1989 p II/53. Such monomers include those with the general formula (15):

where U and W are independently selected from the group consisting of —$CO_2H$, —$CO_2R^2$, —$COR^2$, —$CSR^2$, —$CSOR^2$, —$COSR^2$, —$CONH_2$, —$CONHR^2$, —$CONR^2_2$, hydrogen, halogen and optionally substituted $C_1$-$C_4$ alkyl wherein the substituents are independently selected from the group consisting of hydroxy, —$CO_2H$, —$CO_2R^1$, —$COR^2$, —$CSR^2$, —$CSOR^2$, —$COSR^2$, —CN, —$CONH_2$, —$CONHR^2$, —$CONR^2_2$, —$OR^2$, —$SR^2$, —$O_2CR^2$, —$SCOR^2$, and —$OCSR^2$; and V is selected from the group consisting of hydrogen, $R^2$, —$CO_2H$, —$CO_2R^2$, —$COR^2$, —$CSR^2$, —$CSOR^2$, —$COSR^2$, —$CONH_2$, —$CONHR^2$, —$CONR^2_2$, —$OR^2$, —$SR^2$, —$O_2CR^2$, —$SCOR^2$, and —$OCSR^2$;

where $R^2$ is selected from the group consisting of optionally substituted $C_1$-$C_{18}$ alkyl, optionally substituted $C_2$-$C_{18}$ alkenyl, optionally substituted aryl, optionally substituted heteroaryl, optionally substituted carbocyclyl, optionally substituted heterocyclyl, optionally substituted aralkyl, optionally substituted heteroarylalkyl, optionally substituted alkaryl, optionally substituted alkylheteroaryl and polymer chains wherein the substituents are independently selected from the group consisting of alkyleneoxidyl (epoxy), hydroxy, alkoxy, acyl, acyloxy, formyl, alkylcarbonyl, carboxy, sulfonic acid, alkoxy- or aryloxy-carbonyl, isocyanato, cyano, silyl, halo, amino, including salts and derivatives thereof. Preferred polymer chains include, but are not limited to, polyalkylene oxide, polyarylene ether and polyalkylene ether.

Examples of monomers include, but are not limited to, maleic anhydride, N-alkylmaleimide, N-arylmaleimide, dialkyl fumarate and cyclopolymerisable monomers, acrylate and methacrylate esters, acrylic and methacrylic acid, styrene, acrylamide, methacrylamide, and methacrylonitrile, mixtures of these monomers, and mixtures of these monomers with other monomers. As one skilled in the art would recognise, the choice of comonomers is determined by their steric and electronic properties. The factors which determine copolymerisability of various monomers are well documented in the art. For example, see: Greenlee, R Z. in Polymer Handbook 3$^{rd}$ Edition (Brandup, J., and Immergut, E. H Eds.) Wiley: New York. 1989 pII/53.

Specific examples of useful ethylenically unsaturated monomers include the following: methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-nbutylmethacrylamide, N-methylolmethacrylamide, N-ethylolmethacrylamide, N-tertbutylacrylamide, N-n-butylacrylamide, N-methylolacrylamide, N-ethylolacrylamide, vinyl benzoic acid (all isomers), diethylamino styrene (all isomers), alpha-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropylacrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, ethylene and chloroprene. This list is not exhaustive.

To facilitate the formation of polymer at the surface of the solid particulate material, the one or more ethylenically unsaturated monomers are preferably selected such that when they polymerise they form polymer that is substantially insoluble in the continuous liquid phase.

Those skilled in the art will appreciate that monomers that are selected to form the encapsulating polymer will strongly influence its glass transition temperature (Tg). The "Tg" is a narrow range of temperature over which an amorphous polymer (or the amorphous regions in a partially crystalline polymer) changes from a relatively hard and brittle state to a relatively viscous or rubbery state. The Tg of the encapsulating polymer can conveniently be tailored to suit the intended application for the polymer encapsulated particulate material. For example, monomers that are polymerised to form the encapsulating polymer may be selected to provide a Tg that enables an aqueous dispersion of the polymer encapsulated particulate material (as in a paint formulation) to coalesce and form a film.

Tg values referred to herein are calculated, and those relating to a copolymer are calculated in accordance with the Fox equation $(1/Tg=W_n/Tg_{(n)})$. Unless otherwise stated, where an encapsulating polymer comprises a mixture of polymers or copolymers having different Tg's, the Tg of the overall polymer composition is calculated as a weighted average value. For example, a polymer mixture comprising a copolymer (50 wt. %) with a calculated Fox Tg of −10° C. and a copolymer (50 wt. %) with a calculated Fox Tg of 50° C., will provide an overall Tg of 20° C.

Those skilled in the art will be capable of selecting monomers to afford an encapsulating polymer with the appropriate Tg for the intended application of the polymer encapsulated particulate material.

Where the polymer/particulate material composites that may be prepared in accordance with the invention are to be used in contact with solvents in which the encapsulating polymer may be soluble, or for other commercially relevant reasons, it may be desirable to introduce a degree of crosslinking into the polymer. The crosslinked polymer structure may be derived by any known means, but it is preferable that it is derived through the use of polymerised ethylenically unsaturated monomers. Those skilled in the art will appreciate that crosslinked polymer structures may be derived in a number of ways through the use of polymerised ethylenically unsaturated monomers. For example, multi-ethylenically unsaturated monomers can afford a crosslinked polymer structure through polymerisation of at least two unsaturated groups to provide a crosslink. In this case, the crosslinked structure is typically derived during polymerisation and provided through a free radical reaction mechanism.

Alternatively, the crosslinked polymer structure may be derived from ethylenically unsaturated monomers which also contain a reactive functional group that is not susceptible to taking part in free radical reactions (i.e. "functionalised" unsaturated monomers). In this case, the monomers are incorporated into the polymer backbone through polymerisation of the unsaturated group, and the resulting pendant functional group provides means through which crosslinking may occur. By utilising monomers that provide complementary pairs of reactive functional groups (i.e. groups that will react with each other), the pairs of reactive functional groups can react through non radical reaction mechanisms to provide crosslinks. Formation of such crosslinks will generally occur during polymerisation of the monomers.

A variation on using complementary pairs of reactive functional groups is where the monomers are provided with non-complementary reactive functional groups. In this case, the functional groups will not react with each other but instead provide sites which can subsequently be reacted with a crosslinking agent to form the crosslinks. It will be appreciated that such crosslinking agents will be used in an amount to react with substantially all of the non-complementary reactive functional groups. Formation of the crosslinks under these circumstances will generally be induced after polymerisation of the monomers.

A combination of these methods of forming a crosslinked polymer structure may be used.

The terms "multi-ethylenically unsaturated monomers" and "functionalised unsaturated monomers" mentioned above can conveniently and collectively also be referred to herein as "crosslinking ethylenically unsaturated monomers" or "crosslinking monomers". By the general expression "crosslinking ethylenically unsaturated monomers" or "crosslinking monomers" is meant an ethylenically unsaturated monomer through which a crosslink is or will be derived. Accordingly, a multi-ethylenically unsaturated monomer will typically afford a crosslink during polymerisation, whereas a functionalised unsaturated monomer can provide means through which a crosslink can be derived either during or after polymerisation. It will be appreciated that not all unsaturated monomers that contain a functional group will be used in accordance with the invention for the purpose of functioning as a crosslinking monomer. For example, acrylic acid should not be considered as a crosslinking monomer unless it is used to provide a site through which a crosslink is to be derived.

Examples of suitable multi-ethylenically unsaturated monomers that may be selected to provide the crosslinked polymer structure include, but are not limited to, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalte, divinyl benzene, methylol (meth)acrylamide, triallylamine, oleyl maleate, glyceryl propoxy triacrylate, allyl methacrylate, methacrylic anhydride and methylenebis (meth) acrylamide.

Examples of suitable ethylenically unsaturated monomers which contain a reactive functional group that is not susceptible to taking part in free radical reactions include, but are not limited to, acetoacetoxyethyl methacrylate, glycidyl methacrylate, N-methylolacrylamide, (isobutoxymethyl) acrylamide, hydroxyethyl acrylate, t-butylcarbodiimidoethyl methacrylate, acrylic acid, γ-methacryloxypropyltriisopropoxysilane, 2-isocyanoethyl methacrylate and diacetone acrylamide.

Examples of suitable pairs of monomers mentioned directly above that provide complementary reactive functional groups include N-methylolacrylamide and itself, (isobutoxymethyl)acrylamide and itself, γ-methacryloxypropyltriisopropoxysilane and itself, 2-isocyanoethyl methacrylate and hydroxyethyl acrylate, and t-butylcarbodiimidoethyl methacrylate and acrylic acid.

Examples of suitable crosslinking agents that can react with the reactive functional groups of one or more of the functionalised unsaturated monomers mentioned above include, but are not limited to, amines such as hexamethylene diamine, ammonia, methyl amine, ethyl amine, Jeffamines™ and diethylene triamine, melamine, trimethylolpropane tris(2-methyl-1-aziridine propionate) and adipic bishydrazide. Examples of pairs of crosslinking agents and functionalised unsaturated monomers that provide complementary reactive groups include hexamethylene diamine and acetoacetoxyethyl methacrylate, amines such as hexamethylene diamine, ammonia, methyl amine, ethyl amine, Jeffamines™ and diethylene triamine and glycidyl methacrylate, melamine and hydroxyethyl acrylate, trimethylolpropane tris(2-methyl-1-aziridine propionate) and acrylic acid, adipic bishydrazide and diacetone acrylamide.

General techniques used in performing conventional emulsion, mini-emulsion and suspension polymerisations can advantageously be employed in performing the method of the invention. However, when selecting suitable reagents for employing such techniques it should be appreciated that the method of the invention is in effect an interfacial polymerisation process in which polymer is formed at the surface of particulate material that is dispersed throughout a continuous liquid phase.

The method of the invention may be operated in batch, semi-continuous or continuous modes. Where the continuous liquid phase consists essentially of the one or more ethylenically unsaturated monomers that are polymerised to form the polymer, the method is preferably operated in batch mode, and where the continuous liquid phase does not consist essentially of the one or more ethylenically unsaturated monomers that are polymerised to form the polymer, the method is preferably operated in semi-continuous or continuous modes.

Semi-continuous and continuous modes of operation offer superior control of polymer architecture together with control over the polymer polydispersity. According to these modes of operation, monomer may be added gradually or in stages thereby enabling different monomers and other additives to be introduced during the course of the polymerisation reaction. As the solid content of the dispersion increases, the resulting polymer/particulate material composite may not be adequately stabilised. In this case, further RAFT agent may be also added to the reaction with the monomer in order to replenish the surface of the particle with stabilising moieties.

By "semi-continuous" is meant that the method is conducted batch wise and monomer is added gradually or in stages throughout the polymerisation. By "continuous" is meant that the method is performed in a loop type reactor whereby all reagents are continuously added gradually or in stages throughout the polymerisation and product is continuously removed from the reaction system. Preferably, the method is performed in a semi-continuous mode.

A preferred method of carrying out a semi-continuous mode of polymerisation comprises adding a selected particulate material and RAFT agent to a suitable continuous liquid phase in a reaction vessel to provide for a stable dispersion of the particulate material throughout the continuous liquid phase. A thermal initiator may also be added, along with any other reagents if required, for example buffers to regulate pH. Typically, all reagents used are essentially free from dissolved oxygen and the reaction solution is purged with an inert gas, such as nitrogen, prior to initiating the polymerisation. The dispersion temperature is then increased so that the initiator undergoes thermally induced homolytic scission. Monomer may then be added and polymerisation can proceed under the control of the RAFT agent. The addition of monomer at this stage may be maintained at a rate to avoid reservoir monomer droplets from forming, and can be continued at such a rate until sufficient monomer has been polymerised under the control of the RAFT agent to render it, if it was not already, essentially non-labile from the surface of the particulate material. Further monomer, which may be the same or different, can then be added at a greater rate either continually or in stages until the desired degree of polymerisation has occurred. For example, the polymerisation may be continued to provide for a dispersion of polymer/particulate material composite particles having a desired solids content.

A specific example of employing the method of the invention in this manner might be in the coating of titanium dioxide particles with polymer. In this case, the hydrophilic titanium dioxide particulate material could be dispersed in a hydrophilic continuous liquid phase such as water using an appropriate RAFT agent. Upon forming a stable dispersion, hydrophobic monomers such as butyl acrylate and methyl methacrylate may be introduced to the dispersion to form polymer at the surface of the titanium dioxide particles. The polymer may be formed to coat and encapsulate the titanium dioxide particles and further continued to afford a latex having a desired solids content. The resulting latex would therefore comprise an aqueous dispersion of polymer encapsulated titanium dioxide particles which could advantageously be used directly in paint formulations as an opacified binder.

Where the continuous liquid phase used in accordance with the method of the invention consists essentially of the one or more ethylenically unsaturated monomers that are polymerised to form the polymer, the method will typically be performed as a batch process and in effect may be considered as a bulk polymerisation process. Where such a continuous liquid phase is dispersed in a further continuous liquid phase as hereinbefore described, the method may in effect be seen as a miniemulsion or suspension polymerisation process. In these cases, RAFT agent will generally not be introduced to the continuous liquid phase during the course of the polymerisation, and it is therefore preferable that sufficient RAFT agent is used to stabilise the particulate material in the continuous liquid phase prior to initiation of the polymerisation reaction.

One approach to performing the method of the invention in bulk mode will typically involve adding the particulate material, the RAFT agent and a thermal initiator to one or more ethylenically unsaturated monomers in a reaction vessel. Other reagents may also be added if required. Typically, all reagents used are essentially free from dissolved oxygen and the reaction solution is purged with an inert gas, such as nitrogen, prior to initiating polymerisation. Having adequately dispersed the particulate material throughout the one or more ethylenically unsaturated monomers using means well known to those skilled in the art, the dispersion temperature may then be increased so that the initiator undergoes thermally induced homolytic scission. Given that the continuous liquid phase in this case consists essentially of monomer, a propagating monomer radical is immediately formed. The propagating monomer radical can then diffuse to the surface of the particulate material and enable the RAFT agent stabilising the particles to gain control over the polymerisation. The polymerisation continues until substantially all of the monomer has been consumed to thereby provide a polymer matrix having the solid particulate material substantially uniformly dispersed therethrough.

The approach outlined directly above has particular advantages when it is desired to encapsulate high concentrations of nanoparticles within a polymer matrix. Using conventional techniques, the amount of dispersant required to stabilise the nanoparticles in the monomer phase would be expected to radically alter the properties of the matrix polymer even if the dispersant did maintain a stable dispersion during polymerisation of the monomer. Given that the RAFT agent used in accordance with the invention can act as a stabiliser for the particulate material and also take part in the polymerisation process to ultimately form part of the encapsulating polymer, problems associated with the presence of a "foreign" dispersant in the polymer matrix can advantageously be avoided.

Performing the method in the aforementioned bulk mode could be readily adapted by one skilled in the art such that the continuous liquid phase is dispersed in a further continuous liquid phase to prepare polymer particles having the particulate material substantially uniformly dispersed therethrough.

Those skilled in the art will appreciate that numerous parameters may be varied when performing the method of the invention in either continuous, semi-continuous or bulk modes.

There is no particular limitation as to the nature of the continuous liquid phase that may be used in accordance with the method provided that the particulate material may be dispersed in it and that it does not adversely affect the formation of polymer at the surface of the particulate material. For convenience, a continuous liquid phase that consists essentially of the one or more ethylenically unsaturated monomers that is polymerised to form the polymer will hereinafter be referred to as a "reactive" continuous liquid phase. Conversely, a continuous liquid phase which does not consist essentially of the one or more ethylenically unsaturated monomers that are polymerised to form the polymer will hereinafter be referred to as a "non-reactive" continuous liquid phase. The continuous liquid phase may have hydrophilic or hydrophobic character.

Suitable non-reactive continuous liquid phases include, but are not limited to, water, toluene, white spirit and other well known optionally substituted aromatic or optionally substituted aliphatic organic liquids.

Suitable monomers that may be used in providing a reactive continuous liquid phase include, but are not limited to, the foregoing list of ethylenically unsaturated monomers. Examples of ethylenically unsaturated monomers that might be considered by a person skilled in the art to be hydrophilic include, but are not limited to, acrylic acid, methacrylic acid, hydroxyethyl methacrylate, hydroxypropyl methacrylate, acrylamide and methacrylamide, hydroxyethyl acrylate, N-methylacrylamide or dimethylaminoethyl methacrylate. Examples of ethylenically unsaturated monomers that might be considered by a person skilled in the art to be hydrophobic include, but are not limited to, vinyl acetate, methyl methacrylate, methyl acrylate, styrene, alpha-methylstyrene, butyl acrylate, butyl methacrylate, amyl methacrylate, hexyl methacrylate, lauryl methacrylate, stearyl methacrylate, ethylhexyl methacrylate, crotyl methacrylate, cinnamyl methacrylate, oleyl methacrylate, ricinoleyl methacrylate, vinyl butyrate, vinyl tert-butyrate, vinyl stearate or vinyl laurate.

The method of the invention advantageously provides means to tailor the composition of the polymer that is formed at the surface of the particulate material. In particular, the method provides means to polymerise specific or specialised monomers in strategic locations throughout the polymer. Such control over the polymerisation can be particularly useful in preparing polymer encapsulated particulate materials that are to be used in coating compositions such as paints.

Features of the invention which relate to the resulting polymer composition that is formed at the surface of the particulate material are discussed below with specific reference to an aqueous dispersion of polymer encapsulated pigment particles that are suitable for use as a pigmented binder in waterborne paint formulations. However, it is to be understood that the general principles outlined below may be applied in other applications, such as in fillers, adhesives, primers and sealants, in which a polymer/particulate material composite formed in accordance with the method may be used.

The modification of the polymer composition may be achieved by the selective polymerisation of specific or specialised monomers. For example, highly hydrophobic monomers such as 2,2,2-trifluoroethyl methacrylate (TFEM) may be polymerised at a stage during the method to provide a highly hydrophobic surface region of the polymer. Introducing TFEM to a polymer composition in this manner can promote stain resistance to a paint film when such particles are incorporated into a paint formulation. Alternatively, more polar monomers such as acrylamide, dimethyl amino ethyl methacrylate or ureido monomers may be polymerised to provide a highly hydrophilic surface region of the polymer. In this case, where the continuous liquid phase is hydrophilic, the hydrophilic portion of an amphipathic RAFT agent to be used in the polymerisation may also comprise such monomers and thereby present a highly hydrophilic polymer surface. Incorporation of such polar monomers at the surface of the polymer composition can assist in their adhesion to difficult surfaces when used in coating applications. In particular, as part of the hydrophilic end of an amphipathic RAFT agent, the location of these monomers at the surface of the polymer enables their properties as adhesion promoters to be maximised due to their ability to freely interact with a substrate during film formation. Typically, such specific or specialised monomers are polymerised at relatively low levels, preferably at less than 10 wt % of the total monomer content, more preferably less than 5 wt % of the total monomer content, that is polymerised to form polymer at the surface of the particulate materials.

The mode of polymerisation which operates in accordance with the method of the invention also enables the internal composition of the polymer formed at the surface of the particulate material to be controlled. In particular, the composition of the internal region of the polymer can be varied from that of the surface composition to provide an internal region and an outer shell. In the simplest case, the polymer can be formed whereby a specific monomer is polymerised at one stage of the process and a different monomer is polymerised at a later stage to form a block copolymer. In this way, the particulate material may be encapsulated with a hard polymer with a soft film forming exterior, or a soft elastomeric polymer with a hard non-film forming skin. By the terms "hard" and "isoft" polymer is meant polymers that are formed from monomers where the homopolymer glass transition temperature (Tg) is above and below room temperature (ie. 25° C.), respectively. Suitable hard monomers include, but are not limited to, methyl methacrylate, t-butyl acrylate and methacrylate, and styrene. Suitable soft monomers include, but are not limited to, esters of acrylic acid such as ethyl, butyl and 2-ethyl hexyl acrylates.

The method of the invention might also provide an alternative route to preparing thermofusable powder paint (coating) materials. Thermofusable powder paint materials are generally made by dispersing pigment into polymer using a melt mixing process such as extrusion. The final pigmented polymer mass formed from such a process is then mechanically comminuted to form a final powder coating composition. In use, such thermofusable powder compositions are typically applied to a substrate by electrostatic spray techniques and subsequently fused onto the substrate by baking at high temperatures. Conventional thermofusable powder coatings are typically based on crosslinkable thermofusable materials to provide for coatings which are hard and have high levels of chemical resistance and good adhesion to metal substrates. However, a problem with conventional powder coatings is that the quality of pigment dispersion afforded by extrusion is less than optimal and this generally results in the need for higher levels of pigmentation in order to achieve practical opacity.

The method of the invention provides means to prepare polymer having pigment dispersed substantially uniformly therethrough, the attribute of which makes it particularly suitable for use in preparing thermofusable powder paint compositions. Such compositions can conveniently be prepared in the form of polymer particles which are of a tailored size and have pigment material dispersed substantially uniformly therethrough, thereby allowing lower pigment loadings to be used. In preparing thermofusable powder paint compositions using the method of the invention, the continuous liquid phase will generally consist essentially of the one or more ethylenically unsaturated monomers and this continuous liquid phase will be dispersed in a second continuous liquid phase as hereinbefore described. The monomers will typically be selected such that the resulting polymer is not film forming at room temperature. In particular, the monomers will typically be selected to provide for a polymer that has a glass transition temperature above room temperature (i.e. about 25° C.) and preferably above 50° C. After preparation, the dispersed polymer encapsulated particulate material may be separated from the liquid by know techniques (e.g. filtration, centrifugation, freeze drying etc.) and dried for subsequent use.

The monomers may be selected to provide for a degree of crosslinking in the applied thermofusable powder paint. However, it has been found that thermofusable powder paints in accordance with the invention can advantageously exhibit excellent adhesion to metal substrates without the need to promote crosslinking in the applied coating. Where crosslinking is to be promoted in the applied coating, monomers may be selected which include functional groups that are capable of reacting with complementary reactive groups from other monomers also incorporated within the polymer. Such monomers will typically be chosen such that they react at the temperatures used to bake the thermofusable powder paint after it has been applied to a substrate. Alternatively, the reactive functional monomers can be selected to only react with a suitable crosslinking agent added separately to the final thermofusable powder paint formulation.

The invention may also be applied in biomedical applications, for example in applications which use biocompatible polymer microparticles containing magnetic nanoparticles. Such microparticles can be delivered intravascularly to perform various medically related functions. These applications range from diagnostic functions such as MRI contrast agents and cell targeting and separation to therapeutic technologies such as magnetic drug targeting and targeted hyperthermia for the treatment of cancer. These technologies rely on certain advantageous magnetic characteristics of the polymer composite microparticles. For example, targeted hyperthermia therapy relies on magnetic characteristics being optimised to generate heat when the microparticles are exposed to a high frequency magnetic field.

In view of the delicate nature of such in vivo applications, the need to provide a high level of control over the final microparticle size and the spatial arrangement of the constituent magnetic nanoparticles incorporated within the polymer matrix is very important. In particular, the ability to uniformly distribute a high volume fraction of magnetic nanoparticles into a polymer matrix is highly desirable. The method of the invention has been found to be well suited to preparing polymer microparticles comprising magnetic nanoparticles uniformly distributed therethrough.

The invention also provides a method of preparing a paint, thermofusable powder paint, filler, adhesive, toner, liquid ink, primer, sealant, diagnostic product or therapeutic product comprising preparing a dispersion of polymer encapsulated particulate material and/or a polymer having particulate material dispersed therethrough in accordance with the invention, and combining the dispersion and/or polymer with one or more formulation components.

Those skilled in the art will have an understanding of suitable formulation components that may be included in paints, thermofusable powder paints, fillers, adhesives, toner, liquid ink, primers, sealants, diagnostic products or therapeutic products. Examples of such formulation components include, but are not limited to, thickeners, antifungal agents, UV absorbers, extenders, bioactive reagents, and tinting agents.

The invention further provides a paint, thermofusable powder paint, filler, adhesive, toner, liquid ink, primer, sealant, diagnostic product or therapeutic product comprising a dispersion of polymer encapsulated particles and/or a polymer having particulate material dispersed therethrough prepared in accordance with the invention.

Aqueous dispersions of polymer particles are used extensively in waterborne products such as paints, adhesives, fillers, primers, liquid inks and sealants. Such products also typically comprise other formulation components such as pigments, extenders, film forming aids and other additives, all present at different levels and in different combinations. The use of pigments in such products is important not only in providing "hiding" power to the product but also to enable the products to be provided in a variety of colours.

Pigments have traditionally been incorporated in waterborne products by adding the pigments to a preformed aqueous dispersion of polymer particles and dispersing them with the assistance of dispersing agents. Alternatively, pigments are dispersed with the aid of dispersing agents in an initial stage to form what is termed a millbase, and then this millbase is blended with a preformed aqueous dispersion of polymer particles. The dispersion step requires high agitation speeds in order to impart shear on the pigment particles. This dispersion step can sometimes be problematic because conventional aqueous dispersions of polymer particles are not always stable at the levels of shear exerted during pigment dispersion.

In many applications where such pigmented products are used, agglomeration of pigment particles, in the product per se and also during curing of the product, can adversely effect properties such as the products gloss, scrub/stain resistance, flow, mechanical properties, opacity, colour and/or colour strength. Whilst being particularly desirable, reducing or avoiding detrimental agglomeration of pigment particles in such products has to date been difficult to achieve using conventional technology.

It has now been found that polymer encapsulated particulate material having at least part of the encapsulating polymer formed under the control of a RAFT agent can present a number of advantageous properties. For example, the polymer encapsulated particulate material can function as a binder and a source of particulate material (e.g. in the form of a pigment—a "pigmented binder") in paint, filler, adhesive, primer, toner, liquid ink or sealant formulations. Providing the particulate material in such an "embedded" form has been found to minimise, if not eliminate, problems such as pigment agglomeration in such products. By forming at least part of the encapsulating polymer under the control of a RAFT agent, the particulate material can also be encapsulated in a substantially uniform and continuous coating of polymer, or dispersed substantially uniformly throughout the encapsulating polymer.

For convenience only, the polymer encapsulated particulate material may herein after be referred to as a "pigmented binder". However, it is to be understood that the pigment could readily be substituted for any other suitable particulate material.

The present invention therefore further provides a composition comprising or consisting of discrete particles of polymer encapsulated particulate material, said particulate material being encapsulated in a substantially uniform and continuous coating of a polymer which has at least in part been formed under the control of a RAFT agent.

The present invention also provides a composition comprising or consisting of discrete particles of polymer encapsulated particulate material, said discrete particles having the particulate material substantially uniformly dispersed throughout the encapsulating polymer, wherein the encapsulating polymer has at least in part been formed under the control of a RAFT agent, and wherein the discrete particles are substantially free of additional dispersant for the particulate material.

By being "substantially free of additional dispersant", it will be appreciated from the foregoing that this relates to dispersant other than that which may be afforded by the RAFT agent.

By "discrete particles" is meant that polymer encapsulated particulate material within the composition may be separated into individual particles. However, it will be appreciated that under certain circumstances, for example where the encapsulating polymer has a low Tg, the particles may have a tendency to stick to each other. Nevertheless, the particles should still be discernible as discrete particles.

The composition may be in the form of a flowable powder, a slurry or paste, or in the form of dispersion. In the case of a flowable powder, slurry or paste, the composition is preferably capable of being diluted with liquid to form a dispersion of the discrete particles. Aqueous dispersions of this type are suitable for use as a pigmented binder in for example waterbased paints, fillers, adhesives, primers, liquid inks and sealants.

The compositions of the invention may comprise or consist of pigment particles having a relatively thin (e.g. less than 10 nanometers) encapsulating polymer coating, which may be combined with conventional water based binders to afford paint formulations with a high application solids content. The compositions may also be used as a primary pigmented binder, and even as a sole pigmented binder.

As a "primary" pigmented binder, it is to be understood that the binder will be present in a given formulation in an amount greater than 50 wt %, relative to the total mass of all binder used in that formulation.

In some formulations, it may be desirable to use the pigmented binder in an amount greater than about 60 wt %, more preferably greater than about 80 wt %, most preferably greater than about 95 wt %, still more preferably as the sole pigmented binder (ie 100 wt. %), relative to the total amount of all binder used in that formulation.

At least part of the encapsulating polymer of the polymer encapsulated particulate material in the compositions of the invention is formed under the control of a RAFT agent. Preferably, the RAFT agent is a surface active or amphipathic RAFT agent as hereinbefore described. Such RAFT agents can advantageously function as a stabiliser for the polymer encapsulated particulate material in a liquid dispersion, and/or promote substantially uniform distribution of particulate material throughout the encapsulating polymer.

In the form of liquid dispersion, the composition of polymer encapsulated particulate material is particularly suitable for use as a pigmented binder in paint, filler, adhesive, primer, liquid ink or sealant formulations.

Accordingly, the present invention further provides liquid dispersion of polymer encapsulated particulate material, said particulate material being encapsulated in a substantially uniform and continuous coating of a polymer which has at least in part been formed under the control of a RAFT agent.

In this case, the RAFT agent can advantageously function as a stabiliser for the dispersed polymer encapsulated particulate material. Preferably, the liquid dispersion is an aqueous dispersion.

The present invention also provides a liquid dispersion of polymer encapsulated particulate material, said polymer encapsulated particulate material having the particulate material substantially uniformly dispersed throughout the encapsulating polymer, wherein the encapsulating polymer has at least in part been formed under the control of a RAFT agent, and wherein the polymer encapsulated particulate material is substantially free of additional dispersant for the particulate material.

The present invention further provides a paint, filler, adhesive, primer, liquid ink or sealant formulation comprising a liquid dispersion of polymer encapsulated particulate material, said particulate material being encapsulated in a substantially uniform and continuous coating of a polymer which has at least in part been formed under the control of a RAFT agent.

The present invention also provides a paint, filler, adhesive, primer, liquid ink or sealant formulation comprising a liquid dispersion of polymer encapsulated particulate material having the particulate material substantially uniformly dispersed throughout the encapsulating polymer, wherein the encapsulating polymer has at least in part been formed under the control of a RAFT agent, and wherein the polymer encapsulated particulate material is substantially free of additional dispersant for the particulate material.

Preferably, the liquid dispersions are aqueous dispersions.

The method of the invention can be conveniently used to prepare the compositions comprising polymer encapsulated particulate material.

The compositions of the invention are suitable for use as a pigmented binder in water-based decorative paint formulations. Decorative paints are those that are typically applied to architectural features or the like, and are most often used in households for application of both interior and exterior surfaces. As used herein, the term "decorative paint(s)" is therefore intended to classify paints that do not need to be subjected to high temperatures after their application to afford a polymeric film having the requisite physical and mechanical properties for their intended application. Accordingly, such paints are to be distinguished from those paints, such as industrial coatings, that require high temperatures to enable the applied paint to form a polymeric film having the requisite physical and mechanical properties.

Paint formulations comprising the compositions of the invention can advantageously afford films having improved properties such as improved gloss, gloss retention, opacity, flow, scrub/stain resistance, colour and/or colour strength.

Poor gloss and flow of conventionally pigmented waterborne paints is often associated with the premature flocculation of pigment during film formation. Because both the binder and pigments are present as separate particles, during film formation the pigment particles tend to be crowded into regions between binder particles which in turn restricts their mobility during the film forming process. This crowding effect or aggregation often results in a less uniform distribution of pigment particles within the film and can cause a reduction in gloss properties. In contrast, a pigmented film formed from a binder which is cast from solvent allows the pigment particles to move more freely until much later in the film forming process giving final films with improved gloss and smoother surface appearance.

The compositions comprising or consisting of polymer encapsulated particulate material in accordance with the invention can advantageously be used to prepare waterborne coatings that can provide a surface appearance comparable to their solvent borne counterparts. The improved surface properties of such coatings are believed to result from the problem of pigment aggregation during film formation being minimised, if not eliminated.

Paint film gloss is generally measured using instrument readings of reflectivity taken at different angles from the vertical. Gloss readings measured at a 20° angle describe the "depth of gloss" and are often used to characterise low Pigment Volume Concentration (PVC) or gloss paints. Low PVC paints formulated using compositions of polymer encapsulated particulate material in accordance with the invention have been found to provide 20° gloss readings which are superior to those measured for comparative PVC conventional water-based paints. By way of example only, 20° angle gloss readings of 1.5 times or more than those measured for equivalent PVC conventional water-based paints have been measured. Gloss readings at 60° and 85° of low PVC paints formulated using compositions of the invention are also generally superior to those measured for comparative PVC conventional water-based paints.

On visual examination of dried films formed from PVC paints formulated using compositions of the invention, distinction of image, a measure of the surface smoothness of the film evaluated by examination of a standard image and its reflection in the film, was also found to be superior to that observed for comparative PVC conventional water-based paints.

Without wishing to be limited by theory, it is believed that the improved gloss properties of paint films derived from paints in accordance with the invention stem from the pigment particles being more uniform in distribution throughout the paint film as a result of being embedded in the encapsulating polymer during film formation.

The properties of opacity and hiding power depend on light absorption, light refractance and light reflectance of particles in a coating film. Only pigment and polymer interfaces are believed to contribute to these properties below the Critical Pigment Volume Concentration (CPVC, i.e. the PVC at which there is just sufficient binder to fill the interstices between all the pigment and extender particles). Paint films derived from paints in accordance with the invention have also been found to demonstrate superior light scattering properties. Thus, higher opacity can advantageously be attained using comparatively less pigment.

Without wishing to be limited by theory, the polymer encapsulated particulate material is believed to provide a more uniform distribution of pigment throughout the paint film and thereby allow each pigment particle to give a maximum contribution to the total opacity and hiding power of the film.

Flat (or Matt) waterbased paints are usually formulated at high pigment loadings, often above the CPVC. At such high pigment loadings, properties such as opacity tend to be maximised, with added extender particles and air voids contributing to the hiding power of the film. However, properties such as mechanical strength, gloss and stain resistance tend to be adversely affected due to the porosity of the resultant paint films. Paint films derived from paints in accordance with the invention have also been found to exhibit superior gloss, mechanical strength and stain resistance when formulated with a relatively high PVC (eg 72), compared to a conventional waterbased paint formulated to equivalent parameters of PVC, pigment to binder ratio and solids.

Without wishing to be limited by theory, such improved properties of paint films derived from paints in accordance with the invention are believed to stem from the paint films being less porous compared to a conventional waterbased paint formulated to equivalent parameters of PVC, pigment to binder ratio and solids.

The structural features of the paint films being less porous have also been found to promote the retention of gloss of the paint film during exterior weathering. Reduction in "glossiness" of paint films after exposure to the elements, is due primarily to the effect of increasing pigment concentration near the film surface as the film binder degrades photocatalytically. Paint gloss typically decreases with increased PVC at the surface. Such reduction in gloss is particularly severe as the PVC passes beyond the CPVC. Poor distribution of pigment in the paint film exacerbates this problem. Gloss retention, as a function of exposure time, has been examined herein. Paint films derived from paints in accordance with the invention have been found to exhibit a superior resistance to gloss loss after more than 1,500 hours total exposure time in accelerated weathering experiments (relative to a conventional waterbased paint formulated to equivalent parameters of PVC, pigment to binder ratio and solids), in particular with respect to the depth of gloss visible. It is believed that such an advantageous property will be imparted to paint films derived from paints in accordance with the invention formulated at any PVC.

The compositions of the invention can advantageously comprise or consist of polymer encapsulated particulate material where the particulate material is a coloured pigment, for example pthalocyanine blue pigment. In the form of an aqueous dispersion, such polymer encapsulated coloured pigment particles have been found to exhibit enhanced colouring characteristics compared with aqueous dispersions of polymer particles in which the coloured pigment particles have been dispersed therethrough in a conventional manner. Compositions comprising or consisting of polymer encapsulated coloured pigment particles can also be employed as tinters for conventional paints, fillers, adhesives, primers, liquid inks, toners, and sealants. In this case, the compositions are likely to be in the form of a free flowing powder, a slurry or paste (i.e a concentrate).

Rub off of coloured pigment from the surface of a dried paint film is a problem frequently encountered in the coatings industry. This phenomenon is generally a result of either flooding or floating of pigment in the system, which occurs during the application of coloured waterborne latex based paints. There are many factors that are known to influence flooding and floating, for example the instability of the pigment and emulsion dispersion and/or the incompatibility of the pigment/pigment paste and the emulsion used. Paint films derived from paints in accordance with the invention that are formulated with the polymer encapsulated coloured pigment particles have been found to exhibit little if no rub off. It is believed that such an advantageous property will be imparted to paint films derived from paints in accordance with the invention formulated at any PVC.

When in the form of a free flowing powder, the compositions in accordance with the invention can advantageously be used in thermofusable powder paint and novel "dry" coating formulations.

The compositions comprising or consisting of particulate materials substantially uniformally dispersed throughout the encapsulating polymer have been found particularly suitable for use in thermofusable powder paint formulations. Such compositions can advantageously simplify the ability to provide coloured thermofused coatings. Conventional thermofusable powder paint technology typically provides coloured formulations by extruding mixtures of coloured pigments with the thermofusable resin. However, by this technique uniform distribution of the pigment within the resin can be difficult to achieve and colour variation within a batch and also relative to other batches can be a problem. Thermofusable powder paint formulations in accordance with the invention may be prepared using polymer encapsulated coloured pigment and therefore can avoid the disadvantageous process step of extruding pigment with a thermofusable resin. Thermofusable powder paint formulations in accordance with the invention have been found to provide uniform coloured thermofused coatings.

The compositions comprising or consisting of polymer encapsulated particulate material, wherein the particulate material is encapsulated in a substantially uniform and continuous coating of polymer, are particularly suited for use in "dry" coating compositions. Dry coating compositions have been used in the building and construction industry for many years. Such compositions have generally been in the form of a cement compositions comprising polymeric material to which water is added to render the composition ready for use. However, due to the need to maintain optimal pigment dispersion in coating compositions such as paints, conventional dry coating technology has to date been relatively unsuccessful in being applied to coating compositions such as paints. It has now been found that liquid may be added to a free flowing powder form of the compositions in accordance with the invention to provide a liquid dispersion of the polymer encapsulated particulate material. By being encapsulated in polymer, the particulate material has been found to remain well dispersed not only in the liquid dispersion but also as the liquid dispersion cures to form for example a paint film. Accordingly, such free flowing powder compositions may be conveniently referred to as a reconstitutable composition (for example a reconstitutable paint) to which may be added a liquid such as water to render the composition ready for use. Reconsistutable paints of this type may be conveniently packaged, for example in cardboard boxes, and stored for subsequent use.

Compositions in accordance with the invention that may be diluted to form a dispersion through the addition of liquid such as water, may comprise other formulation components known to those skilled in the art. For example, the compositions may comprise a dispersant to facilitate dispersion of the polymer encapsulated particulate material within the liquid. However, compositions in accordance with the invention can advantageously be used without the addition of a further dispersant as a result of the RAFT agent used into form at least part of the encapsulated polymer also functioning as a stabiliser for the polymer encapsulated particulate material within the liquid. To facilitate dispersion of the polymer encapsulated particulate material within the diluting liquid, it may be preferable that the liquid is alkaline. Accordingly, it may be desirable to include in the composition, or the diluting liquid, a base for this purpose. Suitable bases include, but are not limited to, sodium or potassium hydroxide and ammonia (ammonium hydroxide). Other suitable bases would be known to those skilled in the art.

To provide the compositions of the invention in the form of free flowing powder, it has been found that the compositions should generally have a solids content of about 85 wt. % or more, preferably greater than about 90 wt. %.

The free flowing powder compositions may be conveniently prepared using the method of the present invention.

In this case, the resulting polymer encapsulated particulate material may be isolated using techniques well known in the art. Isolation of the polymer encapsulated particulate material might be by way of filtration, centrifugation and/or freeze-drying. As indicated above, in order to obtain a free flowing powder it will generally not be necessary to remove all liquid (for example water) from the polymer encapsulated particulate material.

The polymer encapsulated particulate material used in the free flowing powder compositions will generally comprise encapsulating polymer that is sufficiently hard so that it can withstand the compressive forces encountered as the polymer/particle composite is isolated and dried. By "hard" in this context it is meant that the Tg of the encapsulating polymer is sufficiently high to prevent or at least minimise uncontrollable clumping or aggregation of the composite particles. Generally, the Tg of the encapsulating polymer will be greater than 0° C., more preferably greater than 110° C., more preferably greater than 15° C.

The polymer matrix of the encapsulating polymer of the polymer encapsulated particulate material in the compositions of the invention may be conveniently tailored as hereinbefore described. For example, the polymeric matrix of the encapsulating polymer may have a gradient and/or a layered structure as in a core/sheath (shell) type structure. As used herein, the term "core" refers to an internal region or section of the encapsulating polymer, and the term "sheath" or "shell" refer to outer regions or sections of the encapsulating polymer. While the core/sheath terminology may imply that the encapsulating polymer is composed of two separate structural polymeric components it is to be understood that the encapsulating polymer may not have this exact structure and that the distinction between the core and the sheath may not be as precise as suggested by this terminology.

It will be appreciated that where the free flowing powder compositions are to be used as a reconstitutable coating or adhesive product, the Tg of the encapsulating polymer will need to be sufficiently low to enable coalescence of the polymer encapsulated particulate material during the film forming or curing process. Generally, the Tg of the encapsulating polymer in this case will be less than about 70° C.

The present invention also provides a method of preparing a paint, filler, adhesive, liquid ink, primer, sealant, diagnostic product or therapeutic product comprising forming a dispersion of polymer encapsulated particulate material by adding a liquid to the compositions in accordance with the invention.

The invention further provides a paint, thermofusable powder paint, filler, adhesive, primer, toner, liquid ink, sealant, diagnostic product or therapeutic product comprising a composition in accordance with the invention.

In considering a suitable RAFT agent for use in accordance with the invention, the group represented by $R^1$ in formula (4) may be selected such that it is either hydrophilic or hydrophobic in character. Due to $R^1$ being somewhat removed from the thiocarbonylthio group, its role in modifying the reactivity of the RAFT agent becomes limited as n increases. However, it is important that the group $-(X)_n-R^1$ of formula (4), and subsets thereof described herein (i.e. in formulas (14), (14a), and (14b)), is a free radical leaving group that is capable of re-initiating polymerisation.

The selection of Z is typically more important with respect to providing the RAFT agent with the ability to gain control over the polymerisation. In selecting a Z group for compounds of formula (4) it is important that such a group does not provide a leaving group that is a better leaving group in comparison with the $-(X)_n-R^1$ (or subset thereof) group of formula (4). By this limitation, monomer insertion preferentially occurs between $-(X)_n-R^1$ (or subset thereof) and its nearest sulfur atom. This will of course not be relevant if the Z group is also an $-(X)_n-R^1$ group.

RAFT agents of formula (4) may be prepared by a number of methods. Preferably they are prepared by polymerising ethylenically unsaturated monomers under the control of a RAFT agent having the following general formula (16):

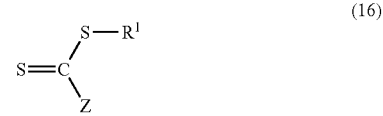

(16)

where Z and $R^1$ are as previously defined.

In preparing surface active RAFT agents of general formula (4) from RAFT agents of general formula (16) it is important to bear in mind that the agent must also stabilise the particulate material in the continuous liquid phase. Compounds of formula (16) may also have some surface activity, however they will generally not be able to stabilise the particulate material in the continuous liquid phase. In order to achieve adequate stabilising properties, in the context of compounds of formula (4), compounds of formula (16) are subsequently reacted with appropriate ethylenically unsaturated monomers. Having said this, when n=0 in connection with formula (4), it is to be understood that such a compound inherently possesses sufficient surface activity and can stabilise the particulate material in the continuous liquid phase. In this case, formula (4) is equivalent to formula (16), and $R^1$ and Z provide adequate hydrophilic and hydrophobic properties, in their own right to afford a suitable surface active RAFT agent.

Ethylenically unsaturated monomers suitable for use in preparing compounds of formula (4) can be any monomers that may be polymerised by a free radical process. Such monomers are typically chosen for their hydrophilic or hydrophobic qualities.

Examples of suitable hydrophilic and hydrophobic ethylenically unsaturated monomers are the same as those hereinbefore described. The monomers may also be selected for their ionisable or non-ionisable qualities. Examples of suitable ionisable ethylenically unsaturated monomers which have acid groups include, but are not limited to, methacrylic acid, acrylic acid, itaconic acid, p-styrene carboxylic acids, p-styrene sulfonic acids, vinyl sulfonic acid, vinyl phosphonic acid, ethacrylic acid, alpha-chloroacrylic acid, crotonic acid, fumaric acid, citraconic acid, mesaconic acid and maleic acid. Examples of suitable ionisable ethylenically unsaturated monomers which have basic groups include, but are not limited to, 2-(dimethyl amino) ethyl and propyl acrylates and methacrylates, and the corresponding 3-(diethylamino) ethyl and propyl acrylates and methacrylates. Examples of suitable non-ionisable hydrophilic ethylenically unsaturated monomers include, but are not limited to, hydroxy ethyl methacrylate, hydroxy propyl methacrylate, and hydroxy ethyl acrylate.

Polymerisation of the ethylenically unsaturated monomer to form compounds of formula (4) may be conducted in either an aqueous solution or an organic solvent, the choice of which is dictated primarily by the nature of the monomers to be polymerised. Polymerisation may also be conducted in the monomer itself.

Polymerisation of the monomers to form the RAFT agents of formula (4) will usually require initiation from a source of radicals. Initiating systems previously described are also suitable for this purpose.

A method for preparing a RAFT agent of formula (4) (or subsets thereof) wherein $R^1$ is hydrophilic might comprise first selecting a suitable RAFT agent. The selected RAFT agent is then combined with a thermal initiator, solvent and hydrophilic monomer within a reaction vessel. Typically all reagents used are essentially free of dissolved oxygen and the reaction solution is purged of any remaining oxygen by way of an inert gas, such as nitrogen, prior to polymerisation. The reaction is subsequently initiated by increasing the temperature of the solution such that thermally induced homolytic scission of the initiator occurs. The polymerisation reaction then proceeds under control of the RAFT agent, thereby providing further hydrophilic character to the hydrophilic end of the RAFT agent through insertion of the hydrophilic monomer. For compounds of formula (4) in which Z is sufficiently hydrophobic, polymerisation of a second monomer may not be required. For compounds of formula (4) where Z is not sufficiently hydrophobic or for compounds of formula (14), upon exhaustion of the hydrophilic monomer, hydrophobic monomer may be added to the solution immediately, or at a later stage if the intermediate product is isolated, and the polymerisation continued under RAFT control to provide the block copolymer of formula (14). Where $R^1$ is intended to provide the hydrophobic properties to the RAFT agent, one skilled in the art will appreciate that the above method could be equally applied to prepare the "reverse" agent.

Generally, RAFT agents of formula (16) will not in their own right possess sufficient properties to function as stabiliser in accordance with the method of the invention. Accordingly, when preparing a RAFT agent of formula (4), such as by a method described directly above, sufficient hydrophilic and/or hydrophobic monomers are generally polymerised onto the RAFT agent to provide it with the requisite properties. At some point in time during the polymerisation of the hydrophilic and/or hydrophobic monomers, the RAFT agent will develop sufficient surface activity. At this stage in the polymerisation the now surface active RAFT agent may be isolated and/or stored for subsequent use. Alternatively, provided that the medium in which the surface active RAFT agent has been prepared is suitable, solid particulate material can simply be introduced to the reaction medium to thereby be stabilised and provide for a dispersion of the particulate material throughout the continuous liquid phase. Additional monomer may then be introduced to the continuous liquid phase in order to perform the method of the invention.

It will be apparent to those skilled in the art that there are numerous ways in which the method of the invention may be performed by first forming a surface active RAFT agent in the continuous liquid phase (ie. in situ). To further illustrate this aspect, one such approach is described in more detail directly below.

The method of the invention might be used in a process for preparing an aqueous dispersion of polymer encapsulated titanium dioxide particles for use a binder material in paint formulations. This process might involve selecting a water soluble RAFT agent of formula (16). The selected RAFT agent may then be combined with a thermal initiator, water as a solvent and hydrophilic monomer within a reaction vessel. Typically all reagents used will be essentially free of dissolved oxygen and the reaction solution is purged of any remaining oxygen by way of an inert gas, such as nitrogen, prior to polymerisation. The reaction may be initiated by increasing the temperature of the solution such that thermally induced homolytic scission of the initiator occurs. The polymerisation reaction then proceeds under control of the RAFT agent, thereby providing further hydrophilic character to the hydrophilic end of the RAFT agent through insertion of the hydrophilic monomer.

Upon exhaustion of the hydrophilic monomer, hydrophobic monomer may then be added to the solution and the polymerisation continued under RAFT control to provide amphipathic character to the RAFT agent in a form similar to that described previously in point 6 relating to general formula (14). Having attained the requisite surface active or amphipathic character of the RAFT agent, particulate titanium dioxide may be introduced to the reaction medium whereby the now amphipathic RAFT agent can function to stabilise the particles and provide for a dispersion of the titanium dioxide throughout the continuous aqueous phase. To ensure that adequate adsorption of the amphipathic RAFT agent to the titanium dioxide particles occurs, a small proportion of ionisable monomer such as acrylic acid may be copolymerised with the hydrophobic monomer used to afford the surface active or amphipathic character to the RAFT agent.

Having provided a stable dispersion of the titanium dioxide particles throughout the continuous aqueous phase, hydrophobic monomer such as butyl acrylate and methyl methacrylate may be introduced to the reaction medium to be further polymerised under control of the RAFT agent and thereby form polymer at the surface of the titanium dioxide particles. The polymerisation may be continued to provide for a desired solids content, with the resulting aqueous dispersion of polymer encapsulated titanium dioxide particles being suitable for use as an opacified binder material in paint formulations.

As an alternative to the method described directly above, a water soluble RAFT agent of formula (16) might be used to prepare a surface active RAFT agent having a less well defined block-like structure. In this case, rather than sequentially polymerising the hydrophilic monomer and then the hydrophobic monomer to provide an amphipathic RAFT agent having a structure of general formula (14), the hydrophobic and hydrophilic monomers may be added simultaneously at a selected ratio to afford surface active amphipathic RAFT agent of general formula (14a) or a surface active RAFT agent of general formula (14b). To afford a structure of the type represented by general formula (14a), the ratio of hydrophobic to hydrophilic monomer will generally favour one of the monomers, for example as in a ratio of 1:2 or 1:3 and vice versa. Where the structure of the RAFT agent is to represent that of general formula (14b), the ratio of hydrophobic to hydrophilic monomer will generally be about 1:1. As indicated above, variation of the ratio of hydrophilic to hydrophobic monomer polymerised in this way can be varied to best suit the surface polarity characteristics of the particulate material. Having formed a RAFT agent with the requisite surface activity, the method may be continued as outlined above.

As mentioned above, suitable RAFT agents for the preparation of RAFT agents of formula (4) have the following general formula (16):

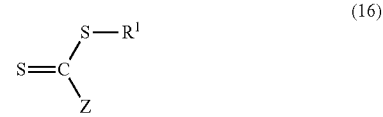

(16)

where $R^1$ and Z are as previously defined.

The effectiveness of a specific compound embraced by formula (16), as a RAFT agent, will depend on its transfer constant, which is determined by the nature of the $R^1$ and Z groups, the monomer and the prevailing reaction conditions. These considerations are discussed above in relation to RAFT agents of formula (4). With respect to the RAFT agents of formula (16), such considerations are essentially the same. In particular, as groups $R^1$ and Z are carried through to the RAFT agent of formula (4), their selection is subject to similar considerations. However, due to closer proximity to the thiocarbonylthio group, the $R^1$ group plays a significant role in the effectiveness of a specific compound as a RAFT agent.

In selecting both $R^1$ and Z groups for RAFT agents of formula (16), those agents resulting from the combination of particularly preferred $R^1$ and Z groups are also particularly preferred.

Most preferred RAFT agents include, but are not limited to, those agents represented by the following general formulas 17 to 25:

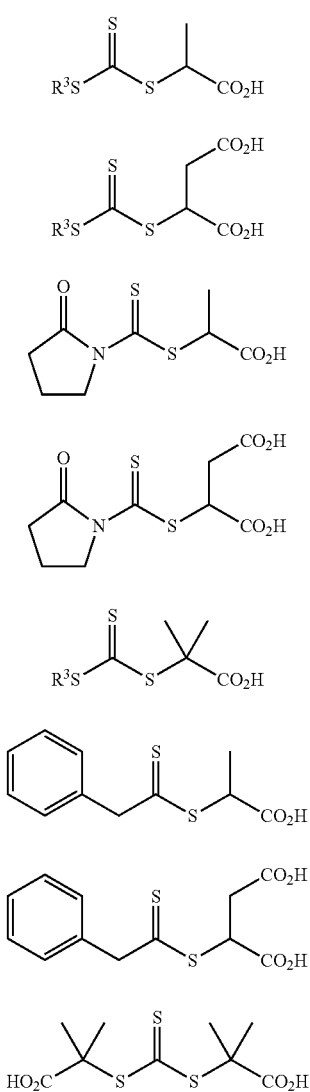

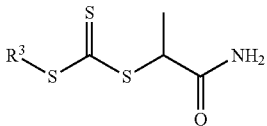

wherein $R^3$ is as previously defined.

When selecting a RAFT agent for use in aqueous environment, it is preferable that it demonstrates hydrolytic stability. Trithiocarbonyl RAFT agents are particularly preferred for use in an aqueous environment.

Where a dithiocarbonyl compound is used as a RAFT agent, it may be a dithioester, a dithiocarbonate, a trithiocarbonate, a dithiocarbamate or the like.

The invention will now be described with reference to the following examples which illustrate some preferred embodiments of the invention. However, it is to be understood that the particularity of the following description is not to supersede the generality of the preceding description of the invention.

EXAMPLES

Example 1: Encapsulation of $TiO_2$ Using poly(AA-co-BA-b-AM) Macro RAFT Agent

Part (a): Preparation of a poly{(butyl acrylate)$_m$-co-(acrylic acid)$_n$}-Block-poly(acrylamide)$_t$ Macro-RAFT Agent with Respective Degrees of Polymerization n≈3, m≈15 and t≈25 Using 2-amino-1-methyl-2-oxoethyl butyl trithiocarbonate.

A solution of 2-amino-1-methyl-2-oxoethyl butyl trithiocarbonate (0.86 g, 3.6 mmol), 4,4'-azobis(4-cyanovaleric acid) (0.11 g, 0.4 mmol), acrylamide (6.42 g, 90.3 mmol) in dioxane (39.64 g) and water (15.33 g) was prepared in a 100 mL round bottom flask. This was stirred magnetically and sparged with nitrogen for 15 minutes. The flask was then heated at 80° C. for 2 hrs. At the end of this period, butyl acrylate (6.98 g, 54.4 mmol) and acrylic acid (0.81 g, 11.2 mmol) were added to the flask. The mixture was deoxygenated and heating was continued at 80° C. for a further 3 hours. The copolymer solution had 20.5% solids.

Part (b): Poly(methyl methacrylate-co-butyl acrylate) Coating of $TiO_2$ Particles (TR92) Using the Macro-RAFT Prepared in Part (a) as a Stabiliser.

$TiO_2$ (Tioxide TR92 and supplied by HCA Colours Australia.) (10.23 g) was mixed with water (2.18 g) and the macro RAFT agent solution (2.68 g, 0.14 mmol) to form a white paste. More water (48.21 g) was mixed with the paste, giving a white dispersion, which was further thoroughly dispersed using a Vibra-Cell Ultrasonic Processor (Sonics and Materials, Inc.) standard probe at 30% amplitude for 10 minutes. During the sonication process, the dispersion was stirred magnetically and cooled in a water bath. The white dispersion was transferred to a 100 ml round flask and 4,4'-azobis(4-cyanovaleric acid) (0.028 g, 0.1 mmol) was added. The whole flask was immersed in an oil bath with temperature setting at 70° C. while a mixture of butyl acrylate (2.5 g, 19.5 mmol) and methyl methacrylate (2.5 g, 25.0 mmol) was fed into the flask at 2.5 g/hr for 2 hours. After the monomer addition, the heating was continued for another 20 hours until full polymerization was achieved. After filtering, the latex was white and stable, containing particles with sizes of about 370 nm (measured using dynamic laser light scattering —HPPS, Malvern Instruments Ltd) and having 19.7% solids.

In order to facilitate observation of the particle coating by transmission electron microscopy (TEM) the coating was crosslinked as follows:

A solution of 2,2'-azobisisobutyronitrile (0.023 g, 0.14 mmol), methylmethacylate (2.03 g, 20.2 mmol) and ethyleneglycoldimethacrylate (0.21 g, 1.1 mmol) was mixed with 44.33 g of the latex, deoxygenated and heated at 80° C. for 1 hour to crosslink the polymer coatings on $TiO_2$ particles to give a latex with 21.3% solids and an average particle size of 418 nm (measured using dynamic laser light scattering—HPPS, Malvern Instruments Ltd). Further TEM examination of the latex shows even and thick polymer coatings on the surface of the titanium dioxide particles.

Example 2: Encapsulation of $TiO_2$ Using poly(BA-b-AM) Macro RAFT Agent

Part (a): Preparation of a poly(butyl acrylate)$_m$-Block-poly(acrylamide)$_t$ Macro-RAFT Agent with Respective Degrees of Polymerization m≈20 and t≈20 using 2-amino-1-methyl-2-oxoethyl butyl trithiocarbonate.

A solution of 2-amino-1-methyl-2-oxoethyl butyl trithiocarbonate (0.85 g, 3.6 mmol), 4,4'-azobis(4-cyanovaleric acid) (0.10 g, 0.4 mmol), acrylamide (5.06 g, 71.2 mmol) in dioxane (30.01 g) and water (15.33 g) was prepared in a 100 mL round bottom flask. This was stirred magnetically and sparged with nitrogen for 15 minutes. The flask was then heated at 80° C. for 2 hours. At the end of this period, butyl acrylate (9.15 g, 71.4 mmol) was added to the flask. The mixture was deoxygenated and heating was continued at 80° C. for a further 3 hours. The copolymer solution had 26.8% solids.

Part (b): Poly(methyl methacrylate-co-butyl acrylate) Coating of $TiO_2$ Particles (TR92) Using the Macro-RAFT Prepared in Part (a) as a Stabilizer.

$TiO_2$ powder (10.05 g) was well mixed with the macro RAFT agent solution (4.69 g, 0.27 mmol), then with dioxane (0.54 g) and finally water (10.10 g) to form a white dispersion. This dispersion was further diluted with water (42.36 g) and was subjected to ultra sonication using a Vibra-Cell Ultrasonic Processor (Sonics and Materials, Inc.) standard probe at 50% amplitude for 20 minutes to achieve a white dispersion. During the sonication the vessel was cooled in an ice bath, while stirring constantly. After the sonication, the dispersed titanium dioxide was transferred to a 100 ml round bottom flask containing 4,4'-azobis(4-cyanovaleric acid) (0.028 g, 0.10 mmol), deoxygenated, sealed and immersed in an oil bath with temperature setting at 70° C. A solution of butyl acrylate (2.5 g, 19.5 mmol, deoxygenated) and methyl methacrylate (2.5 g, 25.0 mmol, deoxygenated) was then fed into the flask using a syringe pump, over 2 hours at a rate of 2.5 g/hr. After the monomer injection, the heating was continued for another 17 hours until complete polymerization. The final latex was filtered to remove coagulum to yield a white latex with 16.8% solids and an average particle size of 496 nm (measured using dynamic laser light scattering—HPPS, Malvern Instruments Ltd). To facilitate observation of the particle coating by TEM, the product was treated in a similar fashion to that described in Example 1, Part (b).

Example 3: Preparation of a Solid Polymer Matrix with Magnetic Nanoparticles Well Dispersed Therein Part (a): Preparation of Diluted Aqueous Ferrofluid.

Magnetite nanoparticles were produced following the method of Massart (*Preparation of aqueous magnetic liquids in alkaline and acidic media*. IEEE Transactions on Magnetics, 1981. MAG-17(2): p. 1247-1248). An aqueous mixture of ferric and ferrous chlorides was added to ammonia solution. The resulting precipitate was isolated by centrifugation then oxidized to maghemite by mixing with iron nitrate solution and heating. The precipitate was then washed in 2 molar nitric acid then finally peptised by water to form a dilute aqueous ferrofluid (approximately 1.8% solids). The aqueous ferrofluid thus obtained (188 g) was further diluted with water (170 g) to obtain an aqueous ferrofluid of approximately 0.8% solids.

Part (b): Preparation of a poly(acrylic Acid)-Block-polystyrene Macro-RAFT Agent with Respective Degrees of Polymerisation n=5 and n=10 Using: 2-{[(butylsulfanyl)carbonothioyl]sulfanyl} Propanoic Acid.

A solution of 2-{[(butylsulfanyl)carbonothioyl]sulfanyl} propanoic acid (2.55 g, 10.7 mmol), acrylic acid (3.86 g, 53.6 mmol) and 4,4'-azobis(4-cyanovaleric acid) (0.3 g, 1.07 mmol) in dioxane (10 g) in a 50 ml round bottomed flask was stirred with an overhead stirrer, and heated to 60° C. in a nitrogen atmosphere for 2.5 hours. At the end of this period, styrene (10.96 g, 105 mmol), 4,4'-azobis(4-cyanovaleric acid) (0.15 g, 0.54 mmol) and dioxane (16.4 g) was added to the flask and heated continuously at 80° C. for a further 16 hours. The resulting copolymer solution had approximately 40% solids.

Part (c): Preparation of a poly(acrylic Acid)-block-polystyrene Macro-RAFT Agent with Respective Degrees of Polymerisation n=5 and n=20 Using: 2-{[(butylsulfanyl)carbonothioyl]sulfanyl} Propanoic Acid.

A solution of 2-{[(butylsulfanyl)carbonothioyl]sulfanyl} propanoic acid (2.55 g, 10.7 mmol), acrylic acid (3.86 g, 53.6 mmol) and 4,4'-azobis(4-cyanovaleric acid) (0.3 g, 1.07 mmol) in dioxane (10 g) in a 50 mL round bottomed flask was stirred with an overhead stirrer and heated to 60° C. in a nitrogen atmosphere for 2.5 hours. At the end of this period, (styrene 21.69 g, 208 mmol), 4,4'-azobis(4-cyanovaleric acid) (0.15 g, 0.54 mmol) and dioxane (32.9 g) was added to the flask and heating continued at 80° C. for a further 16 hours. The resulting copolymer solution had approximately 40% solids.

Part (d): Preparation of Dry $Fe_2O_3$ Powder from the Aqueous Ferrofluid of Part (a) and the Macro-RAFT Agent of Part (b).

Aqueous ammonia solution (10%, 2.25 g), followed by distilled water (83 g) and ethanol (95%, 31 g) was added to the macro-RAFT solution from part (b) to obtain a clear solution. Diluted aqueous ferrofluid of part (a) (358 g) was then fed drop wise into the above Marco-RAFT solution over 160 min under mechanical agitation. Agitation was continued for a further period of one hour after the dropwise addition was complete. Macro-RAFT agent of part (c) (3.85 g), aqueous ammonia (10%, 2.25 g), distilled water (83 g) and ethanol (95%, 31 g) was then added to the suspension thus obtained. Approximately half of this suspension was ultrasonicated for 1 hour at 30% intensity (VCX 500, Sonics & Materials Inc). The solid particles were then centrifuged out and dried in an oven at 60° C.

Part (e): Preparation of a Styrene Based Ferrofluid from the Dry Powder of Part (d).

Powder from part (d) containing both $Fe_2O_3$ and macro-RAFT agent (2.0 g) together with styrene (5.0 g) and macro-RAFT agent solution from part (c) (0.4 g) was ground for 5 minutes using a mortar and pestle, The crude dispersion thus obtained was ultra sonicated for one hour at 30% intensity to obtain a styrene-based ferrofluid with an average particle diameter of 25 nm (Malvern HPPS). When this ferrofluid was exposed to an oscillating magnetic field of 100 kHz and 90 Oe it generated heat at a rate of 9.6 W/g of $Fe_2O_3$.

Part (f): Preparation of Polystyrene Matrix Encapsulated $Fe_2O_3$ from the Styrene-Based Ferrofluid of Part (e).

To the entire sample from part (e) was added 2,2'-azobis (2-methylpropionitrile) (0.013 g) and the reaction was held at 75° C. in a nitrogen atmosphere for 15.5 hours. The resulting solid polymer was ground to a powder which was found to contain 21.8% $Fe_2O_3$. The powder was dispersed in agar and when subjected to the same magnetic field as used in part (e) it generated 8.3 W/g of $Fe_2O_3$, indicating little flocculation of the $Fe_2O_3$ particles during polymerisation.

Example 4: Encapsulation of TiO2 Using poly(BA-co-AA) Macro-RAFT Agent

Part (a): Preparation of a poly(butyl acrylate-co-acrylic Acid) Macro-RAFT Agent Containing an Average of 15 Monomer Units Per Chain in a Mole Ratio of 1:2 Using: 2-{[(butylsulfanyl)carbonothioyl]sulfanyl}propanoic Acid A solution of 2-{[(butylsulfanyl)carbonothioyl] sulfanyl}propanoic acid (1.11 g, 4.6 mmol), 2,2'-azobisisobutyronitrile (0.07 g, 0.4 mmol), acrylic acid (3.39 g, 47.0 mmol) and butyl acrylate (3.16 g, 24.6 mmol) was prepared in dioxane (7.58 g) in a 50 mL round bottom flask. This was stirred magnetically and sparged with nitrogen for 10 minutes. The flask was then heated to, and maintained at 70° C. for 3 hrs under constant stirring. The final copolymer solution was 54.8% solids.

Part (b): Poly(methyl methacrylate-co-butyl acrylate) Coating of $TiO_2$ Pigment (TR92, Huntsman Corporation) Using Macro RAFT Agent from this Example as a Stabilizer.

A solution containing macro RAFT (0.90 g, 0.3 mmol), water (50.06 g) and sodium hydroxide (0.05 g, 1.3 mmol) was prepared in a 100 mL beaker. To this solution, $TiO_2$ pigment (10.38 g) was added, mixed and thoroughly dispersed using a Vibra-Cell Ultrasonic Processor (Sonics and Materials, Inc.) standard probe set to 30% amplitude for 10 minutes. During the sonication process, the dispersion was stirred magnetically and cooled in a water bath. At the end of the dispersion, a small sample was taken and centrifuged at 14,000 rpm for 2 minutes using a mini centrifuge (Minispin Plus, Eppendorf) leaving a white deposit and a clear but slightly yellow supernatant, which indicated the presence of surplus macro RAFT. To the pigment dispersion, a small extra amount of pigment (2.58 g) was added and again dispersed by sonication for another 10 mins. The white dispersion (58.78 g) was transferred to a 100 mL round flask containing 4,4'-azobis(4-cyanovaleric acid) (0.026 g, 0.1 mmol) and was deoxygenated by nitrogen sparging. The whole flask was immersed in an oil bath with a temperature setting of 70° C., while a deoxygenated mixture of butyl acrylate (1.39 g, 10.9 mmol) and methyl methacrylate (3.24 g, 32.4 mmol) was fed into the flask at 0.92 g/hr over 5 hours. After monomer addition was complete, the heating was continued for a further 11 hours after which time polymerization was found to be complete. After filtering, the latex was white and stable, containing particles about 365 nm in diameter (HPPS, Malvern Instruments Ltd) The latex solids was 25.3%. The encapsulating polymer layers around $TiO_2$ particles was further increased by adding another deoxygenated mixture of butyl acrylate (1.39 g, 10.9 mmol) and methyl methacrylate (3.24 g, 32.4 mmol) at 2.3 g/hr into the above latex (42.45 g) in the presence of 4,4'-azobis(4-cyanovaleric acid) (0.025 g, 0.1 mmol) at 70° C. over 2 hrs. After the monomer addition was complete the temperature was maintained for a further 1 hour to complete polymerisation. An average particle diameter of 493 nm was determined by dynamic laser light scattering (HPPS, Malvern Instruments Ltd). The latex solids was 31.7%. The polymer encapsulated $TiO_2$ prepared in this Example were analysed by TEM. A TEM image of the particles is shown in FIG. 1.

Example 5: Thermofusable Coating Containing Encapsulated $TiO_2$

Part (a): Preparation of a poly[butyl acrylate-co-N-(isobutoxymethyl)acrylamide-co-acrylic Acid] Macro-RAFT Agent Containing an Average of 16 Monomer Units Per Chain in a Mole Ratio of 2:1:5 Using: 2-{[(butylsulfanyl) carbonothioyl]sulfanyl}propanoic Acid.

A solution of 2-{[(butylsulfanyl)carbonothioyl] sulfanyl}propanoic acid (1.00 g, 4.2 mmol), 2,2'-azobisisobutyronitrile (0.04 g, 0.3 mmol), acrylic acid (3.11 g, 43.1 mmol), butyl acrylate (2.17 g, 16.9 mmol) and N-(isobutoxymethyl)acrylamide (1.34 g, 8.5 mmol) was prepared in dioxane (7.50 g) in a 50 mL round bottom flask. This was stirred magnetically and sparged with nitrogen for 10 minutes. The flask was then heated at 70° C. for 2 hours under constant stirring. The final copolymer solution was 43.8% solids.

Part (b): Poly(methyl methacrylate-co-N-(isobutoxymethyl) acrylamide-co-butyl acrylate) Coating of $TiO_2$ Pigment (TR92, Huntsman Corporation) for Thermofusable Coating Using Macro RAFT Agent Prepared in Part (a) as a Stabilizer.

A solution containing macro RAFT agent (0.96 g, 0.3 mmol), water (52.19 g) and sodium hydroxide (0.1 g, 2.5 mmol) was prepared in a 50 ml beaker. To this solution, $TiO_2$ pigment (10.80 g) was added, mixed and thoroughly dispersed using a Vibra-Cell Ultrasonic Processor (Sonics and Materials, Inc.) standard probe set to 30% amplitude for 10 minutes. During the sonication process, the dispersion was stirred magnetically and cooled in a water bath. The white dispersion (56.22 g) was transferred to a 100 ml round flask containing 4,4'-azobis(4-cyanovaleric acid) (0.028 g, 0.1 mmol) and was deoxygenated by nitrogen sparging. The flask was immersed in an oil bath set to 70° C., while a deoxygenated mixture of butyl acrylate (2.10 g, 16.4 mmol), methyl methacrylate (2.10 g, 21.0 mmol) and N-(isobutoxymethyl)acrylamide (0.42 g, 2.7 mmol) was fed into the flask at 0.92 g/hr over 5 hours. After the monomer addition was complete, the heating was continued for another 16 hours after which polymerization was found to be complete. The resulting latex was white and stable, containing particles with an average diameter of about 413 nm (HPPS, Malvern Instruments Ltd). The latex solids was 23.7%. A further amount of 4,4'-azobis(4-cyanovaleric acid) (0.025 g, 0.1 mmol) was added to the resulting latex which was then deoxygenated. A further addition of deoxygenated monomer mixture containing butyl acrylate (2.10 g, 16.4 mmol), methyl methacrylate (2.10 g, 21.0 mmol) and N-(isobutoxymethyl)acrylamide (0.42 g, 2.7 mmol) was then made at 2.3 g/hr over 2 hours while the vessel was maintained at 70° C. After the monomer addition was complete, the temperature was maintained for further hour to achieve complete polymerisation. The latex particles had an average diameter of 446 nm (HPPS, Malvern Instruments Ltd) and latex solids was 30.3%. The latex formed a white glossy film on a glass slide at room temperature. This film separated from the glass slide and disintegrated into small pieces after washing with acetone. However, when the film was baked in an oven at 140° C. for 2 hours, it did not disintegrate in acetone or tetrahydrofuran.

Example 6: Encapsulation of TiO$_2$ Using poly(BA-co-AA) Macro RAFT Agent

Part (a): Preparation a poly(butyl acrylate-co-acrylic Acid) Macro-RAFT Agent Containing an Average of 15 Monomer Units Per Chain in a Mole Ratio of 1:2 Using: 2-{[(butylsulfanyl)carbonothioyl]sulfanyl}propanoic Acid A solution of 2-{[(butylsulfanyl)carbonothioyl]sulfanyl}propanoic acid (0.74 g, 3.1 mmol) and 2,2'-azobisisobutyronitrile (0.03 g, 0.16 mmol) was prepared in dioxane (4.90 g) in a 25 mL round bottom flask. This was stirred magnetically and sparged with nitrogen for 10 minutes. The flask was then heated to and maintained at 70° C. under constant stirring. Butyl acrylate (2.18 g, 17.1 mmol) and acrylic acid (2.18 g, 30.3 mmol) was fed into the reaction at 4.36 g/hr for 1 hr. After which the reaction was left for a further hour, stirring at 70° C. The final copolymer solution was 50.0% solids.

Part (b): Poly(butyl acrylate-co-methyl methacrylate) Coating of TiO$_2$ Pigment (TR92, Huntsman Corporation) Using Macro RAFT Agent Prepared in Part (a) as Stabilizer.

A solution containing macro RAFT agent (0.89 g, 0.3 mmol), water (50.01 g) and sodium hydroxide (0.10 g, 2.5 mmol) was prepared in a 100 mL beaker. To this solution, TiO$_2$ pigment (10.01 g) was added, mixed and thoroughly dispersed using a Vibra-Cell Ultrasonic Processor (Sonics and Materials, Inc.) standard probe set to 30% amplitude for 10 minutes. During the sonication process, the dispersion was stirred magnetically. The white dispersion (51.99 g) was transferred to a 100 mL round flask containing 4,4'-azobis(4-cyanovaleric acid) (0.02 g, 0.1 mmol) and was deoxygenated by nitrogen sparging. The flask was immersed in an oil bath with temperature setting at 70° C. while a deoxygenated mixture of butyl acrylate (1.34 g, 10.5 mmol) and methyl methacrylate (3.30 g, 33.0 mmol) was fed into the flask at 0.93 g/hr over 5 hours. After the monomer addition was complete the heating was continued for further 15.5 hrs after which time polymerization was found to be complete. The resulting latex was white and stable, containing particles with an average diameter of 407.6 nm (HPPS, Malvern Instruments Ltd). The latex solids was 25.8%. A further amount of 4,4'-azobis(4-cyanovaleric acid) (0.03 g, 0.1 mmol) was added to the resulting latex, which was then deoxygenated. A further addition of deoxygenated monomer mixture containing butyl acrylate (1.48 g, 11.5 mmol) and methyl methacrylate (3.63 g, 36.3 mmol) was then made at 2.32 g/hr over 2.2 hours while the vessel was maintained at 70° C. After the second monomer addition was completed temperature was maintained for a further 1.5 hours to achieve complete polymerisation. The final latex was white and stable, containing particles with an average diameter of 407.6 nm (HPPS, Malvern Instruments Ltd). The latex particles had an average diameter of 496.6 nm (HPPS, Malvern Instruments Ltd) and latex solids was 31.9%.

Example 7: Encapsulation of TiO$_2$ Using poly(BA-co-MAA) Macro RAFT Agent

Part (a): Preparation of poly(butyl acrylate-co-methacrylic Acid) Macro-RAFT Agent Containing an Average of 15 Monomer Units Per Chain in a Mole Ratio of 1:2 Using: 2-{[(butylsulfanyl)carbonothioyl]sulfanyl}propanoic Acid.

A solution of 2-{[(butylsulfanyl)carbonothioyl]sulfanyl}propanoic acid (1.50 g, 6.3 mmol), 2,2'-azobisisobutyronitrile (0.06 g, 0.4 mmol), methacrylic acid (5.4 g, 63.1 mmol), butyl acrylate (4.36 g, 34.0 mmol) was prepared in dioxane (8.06 g) in a 50 mL round bottom flask. This was stirred magnetically and sparged with nitrogen for 15 minutes. The flask was then heated at 60° C. for 3 hours under constant stirring. The final copolymer solution was 35.9% solids.

Part (b): Poly(butyl acrylate-co-methyl methacrylate) Coating of TiO$_2$ Pigment (TR92, Huntsman Corporation) Using Macro RAFT Agent Prepared in Part (a) as Stabilizer.

A solution containing macro RAFT agent (0.85 g, 0.27 mmol), water (51.06 g) and sodium hydroxide (0.11 g, 2.7 mmol) was prepared in a 100 mL beaker. To this solution, TiO$_2$ pigment (10.06 g) was added, mixed and thoroughly dispersed using a Vibra-Cell Ultrasonic Processor (Sonics and Materials, Inc.) standard probe set to 30% amplitude for 10 minutes. During the sonication process, the dispersion was stirred magnetically. The white dispersion (64.13 g) was transferred to a 100 mL round bottom flask containing 4,4'-azobis(4-cyanovaleric acid) (0.03 g, 0.1 mmol) and was deoxygenated by nitrogen sparging. The flask was immersed in an oil bath set to 70° C. while a deoxygenated mixture of butyl acrylate (1.34 g, 10.5 mmol) and methyl methacrylate (3.30 g, 33.0 mmol) was fed into the flask at 0.93 g/hr over 5 hours. The resulting latex was white and stable, containing particles with an average diameter of 310.4 nm (HPPS, Malvern Instruments Ltd). The latex solids was 23.3%. A further amount of 4,4'-azobis(4-cyanovaleric acid) (0.02 g, 0.1 mmol) was added to the resulting latex, which was then deoxygenated. A further addition of deoxygenated monomer mixture containing butyl acrylate (1.34 g, 10.5 mmol) and methyl methacrylate (3.30 g, 33.0 mmol) was then made at 2.32 g/hr over 2 hours while the vessel was maintained at 70° C. After the second monomer addition was completed the temperature was maintained for a further hour to achieve complete polymerisation. The latex particles had an average diameter of 366.6 nm (HPPS, Malvern Instruments Ltd) and solids of 29.0%.

Example 8: Encapsulation of TiO$_2$ Using poly(BA-co-AA) Macro RAFT Agent

Part (a): Preparation of a poly(butyl acrylate-co-acrylic Acid) Macro-RAFT Agent Containing an Average of 30 Monomer Units Per Chain in a Mole Ratio of 1:2 Using: 2-{[(butylsulfanyl)carbonothioyl]sulfanyl}propanoic Acid A solution of 2-{[(butylsulfanyl)carbonothioyl]sulfanyl}propanoic acid (0.40 g, 1.6 mmol), 2,2'-azobisisobutyronitrile (0.02 g, 0.1 mmol), acrylic acid (2.44 g, 33.8 mmol) and butyl acrylate (2.17 g, 16.9 mmol) was prepared in dioxane (10.04 g) in a 50 mL round bottom flask. This was stirred magnetically and sparged with nitrogen for 10 minutes. The flask was then heated at 70° C. under constant stirring for 2.5 hours. The final copolymer solution was 34.9% solids.

Poly(butyl acrylate-co-acrylic acid) Coating of TiO$_2$ Pigment (TR92, Huntsman Corporation) Using Macro RAFT Agent from Part (a) as Stabilizer.

A solution containing macro RAFT from Part (a) (2.51 g, 0.3 mmol), water (50.94 g) and sodium hydroxide (0.06 g, 1.4 mmol) was prepared in a 100 mL beaker. To this solution, TiO$_2$ pigment (11.26 g) was added, mixed and thoroughly dispersed using a Vibra-Cell Ultrasonic Processor (Sonics and Materials, Inc.) standard probe set to 30% amplitude for 10 minutes. During the sonication process, the dispersion was stirred magnetically and cooled in a water bath. At the end of the dispersion, a small sample was taken and centrifuged at 14,000 rpm for 2 mins using a mini centrifuge (Minispin Plus, Eppendorf) revealing a white deposit and a clear but slightly yellow supernatant which indicated the presence of surplus macro RAFT. To the pigment dispersion, small extra amount of pigment (1.64 g) was added and again dispersed by sonication for another 10 mins. The white dispersion (56.72 g) was transferred to a 100 mL round bottom flask containing 4,4'-azobis(4-cyanovaleric acid) (0.029 g, 0.1 mmol) and was deoxygenated by nitrogen sparging. The whole flask was immersed in an oil bath with a temperature setting of 70° C., while a deoxygenated mixture of butyl acrylate (1.39 g, 10.9 mmol) and acrylic acid (3.24 g, 32.4 mmol) was fed into the flask at 0.92 g/hr over 5 hours. After monomer addition was complete, the temperature was maintained for a further 13.5 hours after which time polymerization was found to be complete. After filtering, the latex was white and stable, containing polymer encapsulated $TiO_2$ particles with 27.8% solids. The encapsulating polymer layers around $TiO_2$ particles was increased further by adding another deoxygenated mixture of butyl acrylate (1.39 g, 10.9 mmol) and acrylic acid (3.24 g, 32.4 mmol) at 2.3 g/hr into the above latex (48.46 g) in the presence of 4,4'-azobis(4-cyanovaleric acid) (0.028 g, 0.1 mmol) at 70° C. over 2 hours. After the monomer addition was completed, the temperature was maintained for a further hour to complete polymerisation. An average particle diameter of 441 nm was determined by dynamic laser light scattering (HPPS, Malvern Instruments Ltd). The latex solids was 29.5%.

Example 9: Encapsulation of $TiO_2$ Using poly(BA-co-AA) macro RAFT

Part (a): Preparation a poly(butyl acrylate-co-acrylic Acid) Macro-RAFT Agent Containing an Average of 20 Monomer Units Per Chain in a Mole Ratio of 1:1 Using: 2,2'-[(thioxomethylene)di(sulfanyl)]bis(propanoic acid).

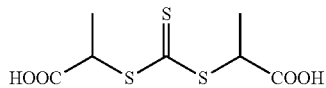

A solution of 2,2'-[(thioxomethylene)di(sulfanyl)]bis(propanoic acid) (0.86 g, 3.4 mmol), 2,2'-azobisisobutyronitrile (0.03 g, 0.2 mmol), acrylic acid (2.41 g, 33.5 mmol), butyl acrylate (4.33 g, 33.8 mmol) was prepared in dioxane (7.74 g) in a 50 mL round bottom flask. This was stirred magnetically and sparged with nitrogen for 10 minutes. The flask was then heated to and maintained at 70° C. for 2 hours under constant stirring. The final copolymer solution was 56% solids.

Part (b): Polymethyl methacrylate-co-butyl acrylate) Coating of $TiO_2$ Pigment (TR92, Huntsman Corporation) Using Macro RAFT Agent from Part (a) as Stabilizer.

A solution with pH 6 containing macro RAFT (1.25 g, 0.3 mmol), water (50.14 g) and sodium hydroxide (0.10 g, 2.4 mmol) was prepared in a 100 mL beaker. To this solution, $TiO_2$ pigment (10.09 g) was added, mixed and was further thoroughly dispersed using a Vibra-Cell Ultrasonic Processor (Sonics and Materials, Inc.) standard probe set to 30% amplitude for 10 minutes. During the sonication process, the dispersion was stirred magnetically and cooled in a water bath. The white dispersion (56.87 g) was transferred to a 100 mL round bottom flask containing 4,4'-azobis(4-cyanovaleric acid) (0.028 g, 0.1 mmol) and was deoxygenated by nitrogen sparging. The whole flask was immersed in an oil bath set to 70° C., while a deoxygenated mixture of butyl acrylate (1.39 g, 10.9 mmol) and methyl methacrylate (3.24 g, 32.4 mmol) was fed into the flask at 0.92 g/hr over 5 hrs. After the monomer addition was completed, the heating was continued for a further 11 hours 30 minutes, after which time polymerization was found to be complete. The latex was white and stable, containing particles about 372 nm in diameter (HPPS, Malvern Instruments Ltd). Latex solids was 23.8%. The encapsulating polymer layers around $TiO_2$ particles was further increased by adding another deoxygenated mixture of butyl acrylate (1.39 g, 10.9 mmol) and methyl methacrylate (3.24 g, 32.4 mmol) at 2.3 g/hr into the above latex in the presence of 4,4'-azobis(4-cyanovaleric acid) (0.029 g, 0.1 mmol) at 70° C. over 2 hours. After monomer addition was complete the temperature was maintained for a further 1 hour to effect full polymerisation. Examination by transmission electron microscopy showed individually encapsulated $TiO_2$ particles. An average particle diameter of 464 nm was determined by dynamic laser light scattering (HPPS, Malvern Instruments Ltd). The latex solids was 30.1%.

Example 10: Encapsulation of $TiO_2$ Using poly(BA-co-MAA) Macro RAFT Agent

Part (a): Preparation a poly(butyl acrylate-co-methacrylic Acid) Macro-RAFT Agent Containing an Average of 20 Monomer Units Per Chain in a Mole Ratio of 1:1 Using: 2,2'-[(thioxomethylene)di(sulfanyl)]bis(2-methylpropanoic acid).

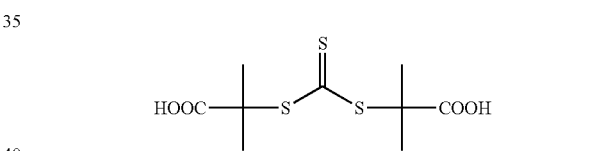

A solution of 2,2'-[(thioxomethylene)di(sulfanyl)]bis(2-methylpropanoic acid) (0.10 g, 0.3 mmol), 2,2'-azobisisobutyronitrile (0.01 g, 0.04 mmol), methacrylic acid (0.27 g, 3.1 mmol), butyl acrylate (0.44 g, 3.4 mmol) in dioxane (1.52 g) was prepared in a 5 mL round bottom flask. This was stirred magnetically and sparged with nitrogen for 10 minutes. The flask was then heated at 70° C. for 3 hours under constant stirring. The final copolymer solution was 23.8% solids.

Part (b): Poly(methyl methacrylate-co-butyl acrylate) Coating of $TiO_2$ Pigment (TR92, Huntsman Corporation) Using Macro RAFT Agent from Part (a) as Stabilizer.

A solution with pH 6.5 containing macro RAFT (1.00 g, 0.15 mmol), water (50.82 g) and sodium hydroxide (0.05 g, 1.3 mmol) was prepared in a 100 mL beaker. To this solution, $TiO_2$ pigment (4.63 g) was added, mixed and thoroughly dispersed using a Vibra-Cell Ultrasonic Processor (Sonics and Materials, Inc.) standard probe set to 30% amplitude for 10 minutes. During the sonication process, the dispersion was stirred magnetically and cooled in a water bath. The white dispersion (47.11 g) was transferred to a 100 ml round flask containing 4,4'-azobis(4-cyanovaleric acid) (0.036 g, 0.1 mmol) and was deoxygenated by nitrogen sparging. The whole flask was immersed in an oil bath set at 70° C., while a deoxygenated mixture of butyl acrylate (1.39 g, 10.9 mmol) and methyl methacrylate (3.24 g, 32.4 mmol) was fed into the flask at 0.92 g/hr over 5 hours. After the monomer addition was completed, the heating was continued for a further 11 hours, after which time polymerization was found to be complete. After filtering, the latex was white and stable, containing particles about 415 nm in diameter (HPPS, Malvern Instruments Ltd). The latex solids was 12.1%.

Example 11: Polymer Coated Bismuth Vanadate Pigment Particles and a Coating Derived Therefrom Part (a): Preparation of a poly{(butyl acrylate)$_m$-co-(2-(dimethylamino)ethyl methacrylate)$_n$}-Block-poly(acrylamide)$_t$ Macro-RAFT Agent with Respective Degrees of Polymerization n≈5, m≈10 and t≈20 Using: 2-{[(butylsulfanyl)carbonothioyl]sulfanyl}propanoic Acid A solution of 2-{[(butylsulfanyl)carbonothioyl]sulfanyl}propanoic acid (0.48 g, 2.0 mmol), 4,4'-azobis(4-cyanovaleric acid) (0.03 g, 0.1 mmol) acrylamide (2.95 g, 41.5 mmol) was prepared in dioxane (15.14 g) and water (8.08 g) in a 50 mL round bottom flask. This was stirred magnetically and sparged with nitrogen for 15 minutes. The flask was then heated to and maintained at 70° C. for 2 hours 30 minutes. At the end of this period, butyl acrylate (2.59 g, 20.2 mmol), 2-(dimethylamino)ethyl methacrylate (1.58 g, 10.1 mmol) and an additional amount of 4,4'-azobis(4-cyanovaleric acid) (0.03 g, 0.1 mmol) was added to the flask. The mixture was deoxygenated and heating was continued at 70° C. for a further 2 hours. The copolymer solution was 20.9% solids.

Part (b): Poly(methyl methacrylate-co-butyl acrylate) Coating of Yellow Bismuth Vanadate Pigment (Irgazin Yellow 2094, Ciba Specialty Chemicals) Using Macro RAFT from Part (a) as Stabilizer.

A solution containing macro RAFT (1.6 g, 0.11 mmol), water (51.10 g) was prepared in a 100 ml beaker. To this solution, yellow pigment (5.06 g) was added, mixed and was dispersed using a Vibra-Cell Ultrasonic Processor (Sonics and Materials, Inc.) standard probe at 30% amplitude for 10 minutes. During the sonication process, the dispersion was stirred magnetically and cooled in a water bath. The pH of the dispersion was then adjusted to 4.4 and redispersed by ultrasonication. The yellow dispersion was transferred to a 100 ml round bottom flask containing 4,4'-azobis(4-cyanovaleric acid) (0.0295 g, 0.1 mmol) and was deoxygenated by nitrogen sparging. The whole flask was immersed in an oil bath set of 70° C., while a deoxygenated mixture of butyl acrylate (0.70 g, 5.4 mmol) and methyl methacrylate (1.62 g, 16.2 mmol) was fed into the flask at 0.92 g/hr over 2.5 hours. After monomer addition was complete, heating was continued for further 1 hour after which time polymerization was found to be complete. After filtering, the latex was yellow and stable, containing particles about 1.27 μm in diameter (HPPS, Malvern Instruments Ltd). The latex solids was 12.4%. The polymer coated particles prepared in this example were analysed by transmission electron microscopy (TEM).

Part (c): Waterborne Coloured Base Paint Formulated Using the Encapsulated Yellow Bismuth Vanadate Pigment Dispersion from Part (b).

Encapsulated yellow bismuth vanadate pigment dispersion from part (b) was formulated into a yellow base paint according to the following method:

Conventional acrylic latex (ex Rohm and Haas) (79.729 g), Propylene Glycol (2.141 g), Antifoam (0.589 g) and AMP-95 (0.321 g) were added to a high speed mixer with stirring. Biocide (0.086 g) was then added, followed by a pre-mix of Propylene Glycol (1.070 g) and Teric N40LP (0.214 g). Texanol (1.788 g) was then added in a pencil stream, and the mixture stirred for 20 minutes. The following were then added to the reactor: Zinc Oxide (0.268 g) and the encapsulated yellow bismuth vanadate pigment dispersion (11.494 g). Natrosol Plus 330 (0.16 g) and propylene glycol (1.070 g) were pre-mixed before adding to the reactor. The mixture was then stirred for 20 minutes prior to the addition of Acrysol RM-2020 (1.070 g). Stirring was continued for 30 minutes. pH and viscosity were adjusted as required.

| Paint Physical Properties: | |
| --- | --- |
| Weight Solids: | 40.54 |
| Volume Solids: | 37.03 |
| WPL : | 1.062 |
| WPL Solids: | 1.162 |
| PVC: | 0.52 |
| P:B Ratio: | 3:100 |

Part (d): Comparative Paint Example Showing the Impact of Encapsulation on Base Paint Characteristics.

A conventional yellow base paint was prepared for comparative purposes, according to the following method:

Conventional acrylic latex (ex Rohm and Haas) (79.729 g), Propylene Glycol (2.141 g), antifoam (0.589 g) and AMP-95 (0.321 g) were added to a high speed mixer with stirring. Proxel GXL (0.086 g) was then added, followed by a pre-mix of Propylene Glycol (1.070 g) and Teric N40LP (0.214 g). Texanol (1.788 g) was then added in a pencil stream, and the mixture stirred for 20 minutes. The following were then added to the reactor: Zinc Oxide (0.268 g) and Conventional Yellow dispersion based on Irgazin yellow 2094 ex Ciba Specialty Chemicals (11.494 g). Natrosol Plus 330 (0.16 g) and propylene glycol (1.070 g) were pre-mixed before adding to the reactor. The mixture was then stirred for 20 minutes prior to the addition of Acrysol RM-2020 (1.070 g). Stirring was continued for 30 minutes. pH and viscosity were adjusted as required.

| Paint Physical Properties: | |
| --- | --- |
| Weight Solids: | 39.54 |
| Volume Solids: | 35.90 |
| WPL: | 1.061 |
| WPL Solids: | 1.168 |
| PVC: | 0.73 |
| P:B Ratio: | 4:100 |

Results:

Films of the paint from Example 11(c) and the comparative example from part (d) were cast onto Leneta white charts with a drawdown blade having a 175 um gap and after drying for 24 hours were measured for gloss with a Dr Lange gloss meter. They were also evaluated visually for film appearance:

| | Example 11 (c) | Comparative Example |
| --- | --- | --- |
| Film Appearance | Superior brilliance and depth of colour | Control |
| Gloss (°) | | |
| 20 | 38.4 | 18 |
| 60 | 67.9 | 64.9 |
| 85 | 93.2 | 90 |

Optimisation of pigment particle size during paint manufacture normally requires reduction of particle agglomerates to smaller particle sizes that are more efficient at light scattering. Pigment particle size strongly influences the tint strength or the depth of colour that can be achieved from a given quantity of pigment. The inclusion of pigment agglomerates or flocculates acts to reduce the colour strength and brightness of finished coatings. Some colour pigment types are notoriously difficult to break down in terms of reducing agglomeration—inorganic yellows such as included in the present example being one such type.

The colour strength of the paint from Example 11(c) and the comparative example was investigated. The paints from Example 11(c) and the comparative example 11(d) were applied over a black and white substrate until the pattern was completely obliterated. The colour difference between the panels was then measured with a Macbeth 7000A spectrophotometer and the colour difference coordinates calculated using the CIE1976 colour system. A total colour difference value of DE=1.97 was obtained, with the film of the example showing enhanced yellowness (+1.62) and red tone (+1.09). An overall colour strength increase of 6% was observed.

No rub off of yellow pigment was seen herein when compared to the comparative conventional example, which did experience light to medium rub off of pigment, even at the low PVCs of formulation used.

Example 12: Preparation of a Solid Polyvinyl Acetate Matrix with Magnetic Nanoparticles Well Dispersed Therein Part (a): Preparation of Diluted Aqueous Ferrofluid with pH of 5.30.

Aqueous ferrofluid (~3.7% solids) obtained as described in Example 3, Part (a) (53 g) was diluted with water (100 g) to obtain an aqueous ferrofluid of approximately 1.3% solids. To this diluted ferrofluid, NaOH solution (0.3 wt %) of 54 g was added over 7-10 minutes under a mechanical agitation of 800 rpm, adjusting the pH of the ferrofluid from 1.86 to 5.30, after which 90 g of ethanol as added. A clear diluted aqueous ferrofluid with pH 5.30 was obtained.

Part (b): Preparation of a poly (acrylic Acid)-Block-poly (vinyl acetate) Macro-Xanthate Agent with Respective Degrees of Polymerisation n=10 and n=25 Using 2-[(ethoxycarbonothioyl)sulfanyl]succinic Acid.

A solution of 2-[(ethoxycarbonothioyl)sulfanyl]succinic acid (1.45 g, 6.09 mmol), acrylic acid (4.39 g, 60.9 mmol) and 2,2'-azobisisobutyronitrile (AIBN, 0.11 g, 0.609 mmol) in dioxane (8.9 g) in a 100 mL round bottomed flask was stirred with an magnetic stirrer and heated to 65° C. in a nitrogen atmosphere for 3 hours. At the end of this period, vinyl acetate 12.93 g, 150 mmol), AIBN (0.05 g, 0.3 mmol) and dioxane (19.46 g) was added to the flask and heating continued at 80° C. for a further 16 hours. The resulting copolymer solution was approximately 46% solids.

Part (c): Preparation of Dry $Fe_2O_3$ Powder from the Aqueous Ferrofluid of Example 12, Part (a) and the Macro-Xanthate Agent of Example 12, Part (b).

Aqueous sodium hydroxide solution (0.3%, 15.6 g), followed by distilled water (3.8 g) and ethanol (95%, 8.9 g) was added to 2.72 g the macro-xanthate solution from Example 12, Part (b) to obtain a clear solution. Diluted aqueous ferrofluid (pH=5.3) of Example 12, Part (a) (297 g) was then fed quickly into the above Marco-RAFT solution within one min under mechanical agitation of 800 rpm. Agitation was continued for a further period of one hour. The suspension thus obtained was ultrasonicated for 10 minutes at 30% intensity (VCX 500, Sonics & Materials Inc). Another 15 g NaOH (0.3%) was added to adjust to pH to 6.24, followed by 10 min. of sonication, addition of HCl (16 wt %, 0.08 g) to adjust the pH to 6.24, another 40 min. of sonication, and again addition of HCl (16 wt %, 0.48 g) to adjust the pH to 2.4. Finally the supernate water of the above mixture was removed, NaOH (0.3%, 3.22 g) was added to the sediment to increase the pH back to 5.15. The final sediment was then dried in an oven at 60° C., and 2.14 g of dry powder was obtained.

Part (d): Preparation of a Styrene Based Ferrofluid from the Dry Powder of Example 12, Part (c).

Powder from Example 12, Part (c) containing both $Fe_2O_3$ and macro-xanthate agent (2.14 g) together with vinyl acetate (6.0 g) and macro-xanthate agent solution from Example 1b (0.63 g) was mixed together. The crude dispersion thus obtained was ultra sonicated for two hours at 30% intensity to obtain a vinyl acetate-based ferrofluid. This ferrofluid was found to contain 28.5% of $Fe_2O_3$, and when exposed to an oscillating magnetic field of 100 kHz and 90 Oe it generated heat at a rate of 10.7 W/g of $Fe_2O_3$, which is 57.2% of the original aqueous ferrofluids.

Part (e): Preparation of poly (vinyl acetate) Matrix Encapsulated $Fe_2O_3$ from the Vinyl Acetate-Based Ferrofluid of Example 12, Part (d).

To the 4.9 g of the sample from Example 12, Part (d) was added the AIBN (0.0267 g). The above mixture was then mixed on a vortex mixer 2 min. The bulk polymerization was then carried out in a silicane oil bath of 75° C. for 14 hours. The final solid polymer was obtained. And it was found to contain 35.1% $Fe_2O_3$. When the powder was dispersed in agar and subjected to the same magnetic field as used in Example 12, Part (d) it generated 8.4 W/g of $Fe_2O_3$.

Example 13: Polymer Coated Phthalocyanine Blue Pigment Particles and a Coating Derived Therefrom Part (a): Preparation of a poly(butyl acrylate-co-acrylic Acid) Macro-RAFT Agent Containing an Average of 10 Monomer Units Per Chain in a Mole Ratio of 1:1 Using: 2-{[(butylsulfanyl)carbonothioyl]sulfanyl}propanoic Acid A solution of 2-{[(butylsulfanyl)carbonothioyl]sulfanyl}propanoic acid (1.44 g, 6.0 mmol), 2,2'-azobisisobutyronitrile (0.06 g, 0.4 mmol), acrylic acid (2.26 g, 31.4 mmol), butyl acrylate (3.93 g, 30.7 mmol) was prepared in dioxane (7.78 g) in a 50 mL round bottom flask. This was stirred magnetically and sparged with nitrogen for 10 minutes. The flask was then heated at 70° C. for 2 hours 30 minutes under constant stirring. The final copolymer solution was 50.9% solids.

Part (b) Poly(methyl methacrylate-co-butyl acrylate) Coating of Phthalocyanine Blue Pigment (Heliogen Blue L6900, BASF) Using Macro RAFT from Part (a) as a Stabilizer.

Figure 2:
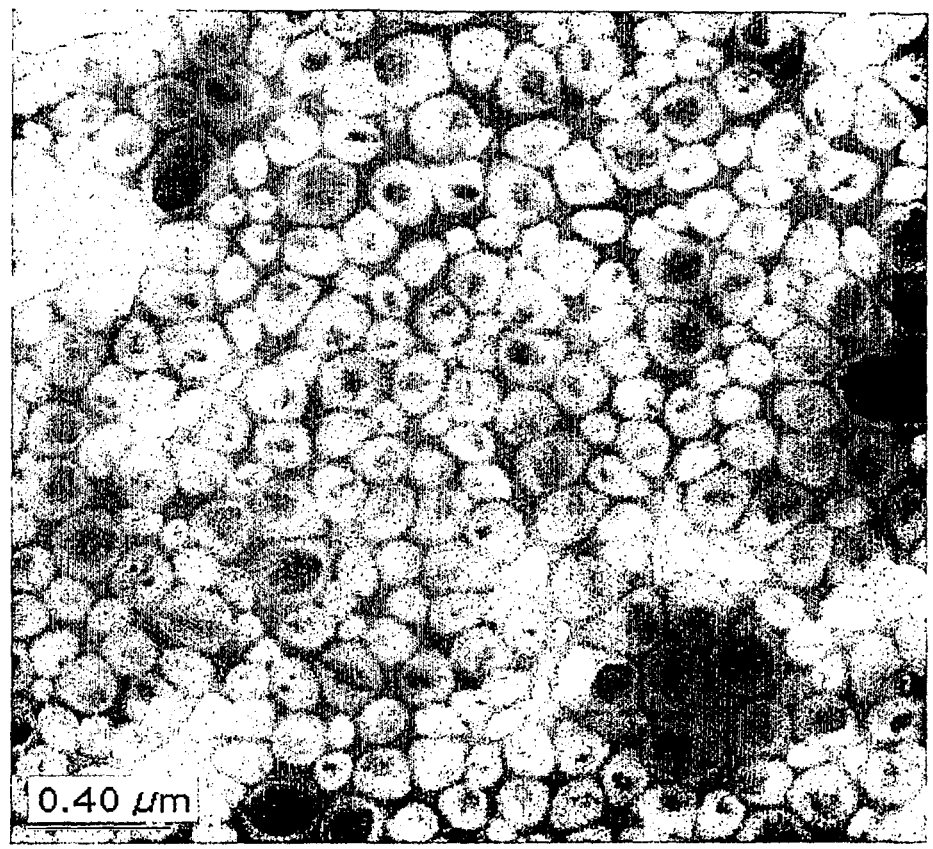
FIGS. 2 and 3 illustrate polymer encapsulated phthalocyanine blue pigment prepared in accordance with the invention.
Figure 3:
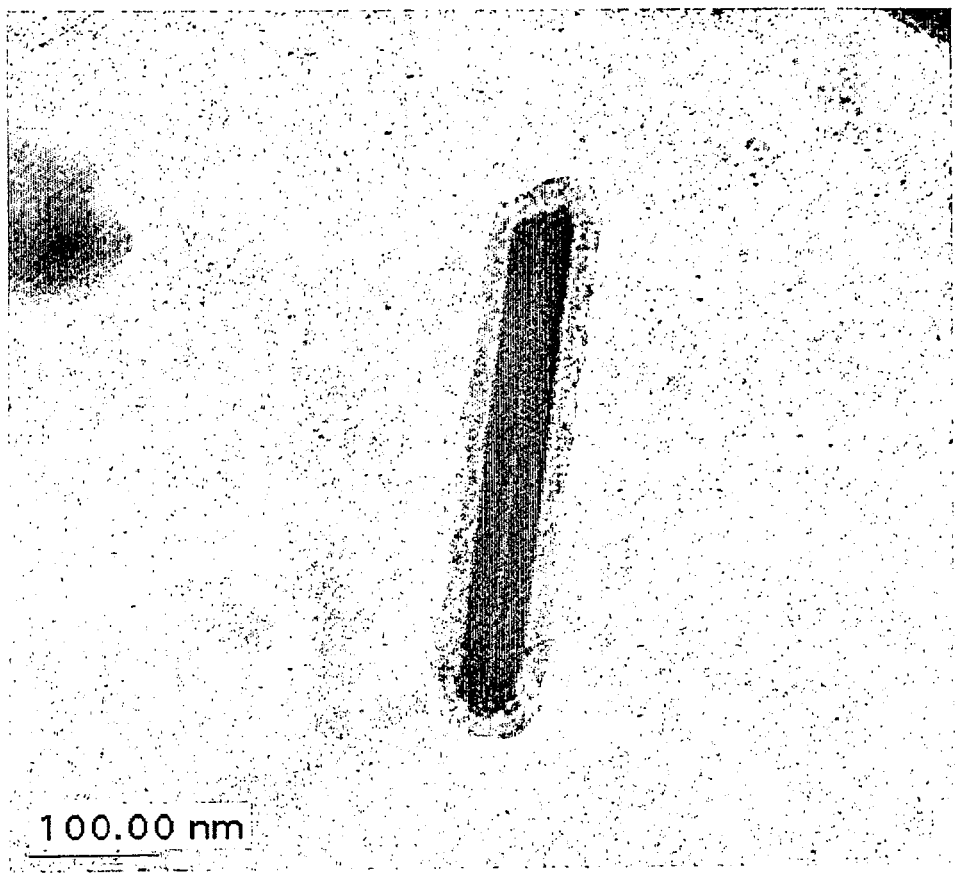

A solution containing macro RAFT (0.73 g, 0.3 mmol), ethylene glycol (19.08 g) and methanol (3.10 g) was prepared in a 50 mL beaker. To this solution, water (10.49 g) and then sodium hydroxide (0.06 g, 1.48 mmol) was added, mixed and sonicated in a sonic bath for 2 minutes. The solution was transferred to a water-jacketed milling vessel (Dispermat™ AE 3C laboratory dissolver fitted with an APS 250 milling system, VMA-Getzmann) containing phthalocyanine blue pigment (5.01 g) and 1 mm in diameter glass beads (101 g). The bath jacket temperature was maintained at 20° C. The milling was initially at 1000 rpm for 60 minutes to produce a viscous blue dispersion. Then, more water (20.00 g) and glass beads (50 g) were added into the milling vessel and the milling speed was raised to 6000 rpm for 60 minutes. At the end of the milling, another portion of water (70.17 g) was mixed with the pigment dispersion. Foam and glass beads were then separated from the dispersion using a plastic mesh while large pigment particles were removed by centrifugation at 2000 rpm for 5 minutes (MSE MK2 centrifuge, Thomas Optical & Scientific Co Pty Ltd). The pigment dispersion (50.64 g) was transferred into a 100 mL round bottom flask containing 4,4'-azobis(4-cyanovaleric acid) (0.025 g, 0.1 mmol). The flask was sealed, sparged with nitrogen for 15 minutes, placed in an oil bath maintained at 70° C. and stirred magnetically. A deoxygenated solution of butyl acrylate (1.39 g, 10.9 mmol) and methyl methacrylate (3.24 g, 32.4 mmol) was injected into the flask at a rate of 1 ml/hour for 5 hours Addition commenced 10 minutes after completion of the initial sparge. Bath temperature was maintained at 70° C. for a further 11 hours after monomer injection was complete to achieve full polymerization. After filtering, a stable blue latex was obtained with a solids content of 9.2%. The latex had an average particle diameter of 181 nm as measured using dynamic laser light scattering (HPPS, Malvern Instruments Ltd). Transmission electron microscopy showed that the latex contained individually encapsulated blue pigment particles (see FIG. 2). The ability of the method of the invention to form polymer at the surface of high aspect ratio small particles is shown in FIG. 3. In this Figure, the polymer encapsulated phthalocyanine blue pigment having a needle shape was prepared in a similar manner to the current Example.

Part (c) Poly(methyl methacrylate-co-butyl acrylate) Coating of Phthalocyanine Blue Pigment (Heliogen Blue L7081D, BASF) Using Macro RAFT from Part (a) as a Stabilizer.

Generally the same method was applied as for dispersion and encapsulation of Heliogen Blue L 6900 in part (b) apart from a slight variation in the milling step. As Heliogen Blue 7081D is more readily dispersed than Heliogen Blue L 6900, the millbase was mixed at 2000 rpms for 30 minutes and then after the addition of the 20 g of let down water, mixed a further 30 minutes at 4500 rpms.

Part (d): Waterborne Coloured Base Paint Formulated Using the Encapsulated Phthalocyanine Blue Pigment (Heliogen Blue L7081D, BASF) Dispersion from Part (c).

Encapsulated pthalocyanine blue pigment dispersion from part (c) was formulated into a blue base paint according to the following method:

Conventional acrylic latex (ex Rohm and Haas) (73.388 g), antifoam (0.482 g) and conventional titanium dioxide dispersion (using Tiona RCL 595 ex Millenium Inorganics) (6.490 g) were added to a high speed mixer with stirring. These were followed by addition of water (10.019 g) and biocide (0.083 g). A pre-mix of Propylene Glycol (2.255 g), Teric 164 (0.159 g) and Teric N40LP (0.148 g) was subsequently added with stirring. Texanol (1.854 g) was then added in a pencil stream, and the mixture stirred for 30 minutes. Natrosol Plus 330 (0.352 g) and propylene glycol (1.131 g) were pre-mixed before adding to the reactor. Acrysol RM-2020 (2.195 g) was then added as stirring continued. The dispersion of Example 11(c) (1.444 g) was added to the mixture and stirring continued for 60 minutes.

| Paint Physical Properties: | |
|---|---|
| Weight Solids: | 41.80 |
| Volume Solids: | 38.56 |
| WPL: | 1.069 |
| WPL Solids: | 1.159 |
| PVC: | 0.96 |
| P:B Ratio: | 3:100 |

Part (e): Comparative Paint Example Showing the Impact of Encapsulation on Base Paint Characteristics.

A conventional blue base paint was prepared for comparative purposes, according to the method given above, however Heliogen blue L7081D dispersed by conventional means (Luconyl dispersion ex BASF: contains 30% pigment, 0.167 g) and water (1.277 g) replaced the amount of dispersion from Example 13(c) added. This ensured an equivalent amount of colour pigment (g/L) was included in each formulation.

| Paint Physical Properties: | |
|---|---|
| Weight Solids: | 41.72 |
| Volume Solids: | 38.44 |
| WPL: | 1.068 |
| WPL Solids: | 1.159 |
| PVC: | 0.97 |
| P:B Ratio: | 3:100 |

Results:

Sufficient coats of each of the exemplified and conventional base paints to give black and white coverage, were applied to Leneta 5DX cards. The colour difference between the cards was measured using a Macbeth 7000A spectrophotometer and the colour difference evaluated using the CIE1976 L* a* b* colour space.

Films cast from the aqueous dispersion of polymer encapsulated pthalocyanine blue particles exhibited enhanced colour strength, approximately 67% (K/S) higher, showing a lightness difference of 5.25 (darker, deeper blue film) and a total colour difference of 6.13 (CIE) when compared to the comparative example from part (e). The enhanced blueness of the film is displayed numerically in the table below. Values of colour difference for the exemplified paint are quoted against the comparative example from part (e) taken as standard.

| | Colour Strength (K/S) % increase) | DL (+L −D) | DA (+R −G) | DB (+Y −B) | DE (CIE) |
|---|---|---|---|---|---|
| Example 13(e) | 67.5 | −5.25 | 1.48 | −2.74 | 6.13 |

Visual observation of the dried films of the coatings of the invention as described above, showed apparent gloss, brilliance, clarity as well as depth of colour to be vastly superior to the equivalent comparative example. Measured values of gloss matched the results arrived at by eye. Films of the paint from Example 13 (d) and the comparative example 13 (e) were cast onto Leneta white charts with a drawdown blade having a 175 um gap and after drying for 24 hours were measured for gloss with a Dr Lange gloss meter. The results for 20° gloss as measured indicate the depth of gloss observed.

| Gloss (°) | Example 13 (d) | Comparative Example 13(e) |
|---|---|---|
| 20 | 43.0 | 27.3 |
| 60 | 80.7 | 76.6 |
| 85 | 95.7 | 92.4 |

Figure 4:
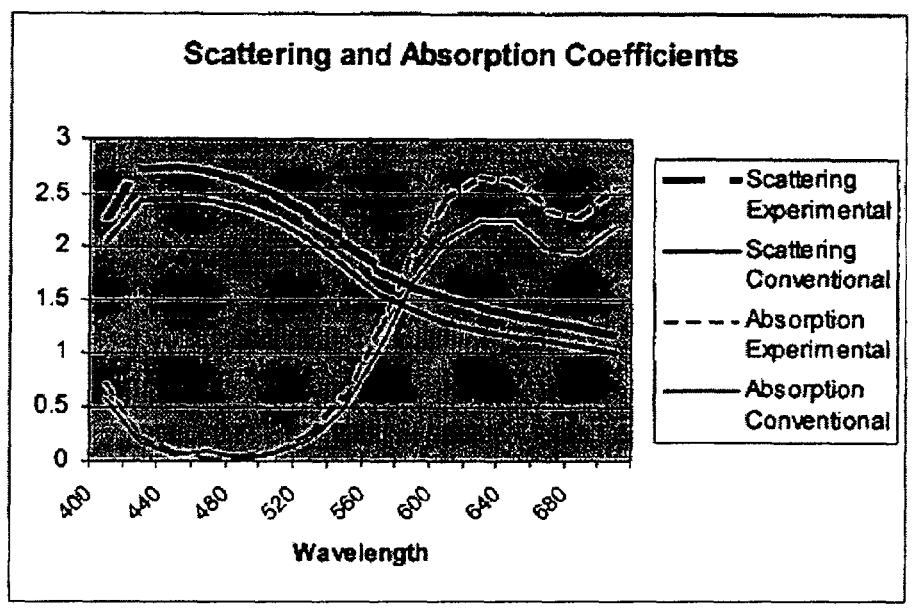
FIG. 4 shows scattering and absorption coefficients over a range of wavelengths in the visible region as described in Example 13.

As shown in FIG. 4, scattering and absorption coefficients over a range of wavelengths in the visible region were measured as another means to enable changes in efficiency of the pigment, when treated by the method of the invention, to be displayed.

When evaluated over Leneta cards the films, as described, possessed excellent colour strength. Through further formulation, it was discovered that the colour strength achieved from aqueous dispersions of polymer encapsulated pthalocyanine blue particles in a blue base formulation, could only be matched in a comparative conventional system if the loading of pthalocyanine blue pigment was increased by approximately 160% in the latter ie 2.6 times more pigment needed to be included in the conventional comparative example (as included in the paint derived in part (d)) to achieve the same colour strength as achieved through use of dispersions formulated via the method of the present invention. More efficient utilisation of the coloured pigment of around 60-70% has thus been evidenced in this example.

As discussed under example 11, rub off of coloured pigment from the surface of dried paint films is a problem frequently encountered in the coatings industry. No rub off of blue pigment was seen here when compared to the conventional examples which both experienced observed rub off of pigment, even at such relatively low PVCs of formulation. This is an advantageous finding and is expected to follow for base coatings formulated to any PVC.

Part (f): Exemplification of the Use of Encapsulated Pigment Dispersions as Tinters of Conventional Paint Systems.

It has been found that latexes formed from the method of the invention may also be employed as tinters of conventional waterborne coating systems.

A dispersion of pthalocyanine blue as described in part (c) was used to tint a conventional white paint of PVC 15 (comparative example 1 from Example 20). Through experimentation it was discovered that only half as much of the encapsulated pthalocyanine blue pigment dispersion needed to be added to give colour strength equivalent to that of the conventional pthalocyanine blue pigment dispersion when added as a tinter. To get approximately equivalent colour strength, 25.16 g of the dispersion from part (c) (contains 11.52% solids, 3.5% pigment) or 25.16 g of the conventional dispersion (diluted to 11.5% solids, contains 7.2% pigment) was added to 250 ml of the conventional white paint (comparative example 1 from Example 20).

The dispersion of part (c) was also used in tinting a waterborne low PVC paint formulated using the encapsulated $TiO_2$ dispersion of the present invention (as from Example 20 (c)). The improvement in colour strength achieved was even greater therein.

Films of the tinted paints from this example were cast onto Leneta white charts with a drawdown blade having a 175 um gap and after drying for 24 hours were measured for gloss with a Dr Lange gloss meter:

| Gloss (°) | Conventional paint tinted using dispersion from Part (c) | Conventional paint tinted using conventional pigment dispersion | Paint from encapsulated $TiO_2$ (Example 20(c) tinted using dispersion from Part (c) |
|---|---|---|---|
| 20 | 20.6 | 16.4 | 38.4 |
| 60 | 61.5 | 61.3 | 67.9 |
| 85 | 88.9 | 88.2 | 93.2 |

Example 14: Themofusable Powder Coating

Part (a): Preparation of a poly(butyl acrylate-co-acrylic Acid) Macro-RAFT Agent Containing an Average of 20 Monomer Units Per Chain in a Mole Ratio of 3:1 Using 2-{[(butylsulfanyl)carbonothioyl]sulfanyl}propanoic Acid.

A solution of 2-{[(butylsulfanyl)carbonothioyl]sulfanyl}propanoic acid (0.71 g, 3.0 mmol), 2,2'-azobisisobutyronitrile (0.04 g, 0.2 mmol), acrylic acid (1.10 g, 15.2 mmol), butyl acrylate (5.73 g, 44.7 mmol) was prepared in dioxane (9.13 g) in a 50 mL round bottom flask. This was stirred magnetically and sparged with nitrogen for 10 minutes. The flask was then heated at 70° C. for 2 hours 30 minutes under constant stirring. The final copolymer solution was 41.7% solids.

Part (b): Preparation of Thermofusable Powder Coating Particles Using Macro RAFT Agent Prepared in Part (a).

Titanium dioxide (20.1 g) was dispersed in a solution of butyl acrylate (14.1 g, 0.11 moles), methyl methacrylate (26.2 g, 0.26 moles), macro RAFT agent (3.1 g, 0.5 mmol), 2-{[(butylsulfanyl)carbonothioyl]sulfanyl}propanoic acid (0.40 g, 1.7 mmol) by mixing. To this dispersion, Resiflow PL200A (0.82 g) and hydrogenated castor oil (HCO, 0.87 g) was added and the dispersion was further dispersed using a Vibra-Cell Ultrasonic Processor (Sonics and Materials, Inc.) standard probe at 30% amplitude for 5 minutes. After sonication, the white dispersion was transferred to a 100 mL round bottom flask containing 2,2'-azobisisobutyronitrile (0.1 g, 0.6 mmol) and was then deoxygenated by nitrogen sparging for 10 minutes. The flask was immersed in a temperature controlled oil bath for 1 hour at 70° C. to receive a slightly viscous white dispersion which contained 54% solids. To this dispersion, a solution of butyl acrylate (7.61 g, 59.4 mmol), methyl methacrylate (14.14 g, 0.14 moles) was added. The diluted dispersion (30.87 g) was mixed with 2,2'-azobisisobutyronitrile (0.19 g, 1.2 mmol) in a 100 mL beaker and was then redispersed in a polyvinyl alcohol solution (49.98 g, 2.5%, 80000-100000 g/mole, 88% hydrolysed) by a overhead mixer spinning at 1200 rpm over 5 mins. The suspension was quickly transferred to a 100 mL round bottom flask containing sodium nitrite (0.0064 g, 0.1 mmol) which was in turn sealed and deoxygenated by nitrogen sparging for 10 minutes. The polymerisation was carried out in a temperature controlled oil bath for 16 hours at 70° C. while was constantly magnetically stirred. At the end of the polymerisation, the latex was filtered to remove coagulations and was centrifuged and washed four times with distilled water to receive a wet powder which contained spherical particles with an estimated average particle size of 25 microns (Carl Zeiss optical microscope). A solution of Primid XLS52 crosslinker (0.29 g) and water (4.04 g) was mixed with the wet powder and the whole sample was let to be air dried overnight forming a dry cake which was in turn broken up by grinding using a mortar and a pestle and was sieved using a 125 micron sieve. The final product formed a hard glossy white film on a glass slide after baking at 200° C. for 10 minutes.

Example 15: Thermofusable Powder Coating

Part (a): Preparation of Thermofusable Powder Coating Particles Using Macro RAFT Agent Prepared in Example 14, Part (a) and Dodecyl Thiol as Chain Transfer Agent.

Titanium dioxide (20.34 g) was dispersed in a solution of butyl acrylate (10.32 g, 0.08 moles), methyl methacrylate (30.95 g, 0.31 moles) and macro RAFT agent from Example 14, Part (a) (3.47 g, 0.6 mmol) by mixing. To this dispersion, Resiflow PL200A (0.81 g) was added and the dispersion was further dispersed using a Vibra-Cell Ultrasonic Processor (Sonics and Materials, Inc.) standard probe at 30% amplitude for 5 minutes.

After sonication, the white dispersion was transferred to a 100 mL round bottom flask containing 2,2'-azobisisobutyronitrile (0.10 g, 0.6 mmol), dodecyl thiol (0.55 g, 2.7 mmol) and hydrogenated castor oil (HCO, 0.86 g) and was sealed then deoxygenated by nitrogen sparging for 10 minutes. The flask was immersed in a temperature controlled oil bath for 1 hour at 70° C. to receive a slightly viscous white dispersion which contained 55.5% solids. To this dispersion, a solution of butyl acrylate (5.11 g, 39.8 mmol), methyl methacrylate (15.32 g, 0.15 moles) was added. The diluted dispersion (28.35 g) was preheated to 70° C., then mixed with 2,2'-azobisisobutyronitrile (0.20 g, 1.2 mmol) in a 100 mL beaker and was then redispersed in a preheated (90° C.) polyvinyl alcohol solution (64.23 g, 2.5%, 80000-100000 g/mole, 88% hydrolysed) by a overhead mixer spinning at 1500 rpm over 5 minutes. The suspension was quickly transferred to a 100 mL round bottom flask containing sodium nitrite (0.0062 g, 0.1 mmol), which was in turn sealed and deoxygenated by nitrogen sparging for 10 minutes. The polymerisation was carried out in a temperature controlled oil bath for 4 hours at 90° C., while was constantly stirred magnetically. At the end of the polymerisation, the latex was filtered to remove coagulations and was centrifuged and washed six times with distilled water to receive a wet powder which contained spherical particles with an estimated average particle size of 25 microns (Carl Zeiss optical microscope). A solution of Primid XLS52 crosslinker (0.51 g) and water (2.07 g) was mixed with the wet powder and the whole sample was let to be air dried overnight forming a dry cake which was in turn broken up by grinding using a mortar and a pestle and was sieved using a 125 micron sieve. The final product formed a hard and glossy white film on a glass slide at 200° C. after 10 minutes.

Example 16: Thermofusable Powder Coating Based on: 2-{[(dodecylsulfanyl)carbonothioyl]sulfanyl}propanoic Acid Part (a): Preparation of a poly(butyl acrylate-co-acrylic Acid) Macro-RAFT Agent Containing an Average of 20 Monomer Units Per Chain in a Mole Ratio of 3:1 Using: 2-{[(dodecylsulfanyl)carbonothioyl]sulfanyl}propanoic Acid.

A solution of 2-{[(dodecylsulfanyl)carbonothioyl]sulfanyl}propanoic acid (0.99 g, 2.8 mmol), 2,2'-azobisisobutyronitrile (0.07 g, 0.4 mmol), acrylic acid (1.03 g, 14.3 mmol), butyl acrylate (5.74 g, 44.8 mmol) was prepared in dioxane (10.51 g) in a 50 mL round bottom flask. This was stirred magnetically and sparged with nitrogen for 10 minutes. The flask was then heated at 70° C. for 5 hrs under constant stirring. The final copolymer solution was 42.7% solids.

Part (b): Preparation of Thermofusable Powder Coating Particles Using Macro RAFT Agent Prepared in Part (a) as Pigment Stabiliser.

Titanium dioxide (19.98 g) was dispersed in a solution of butyl acrylate (10.19 g, 0.08 mole), methyl methacrylate (29.99 g, 0.30 mole), macro RAFT agent (3.86 g, 0.6 mmol), by mixing. To this dispersion, Resiflow PL200A (0.81 g) was added and the dispersion was further dispersed using a Vibra-Cell Ultrasonic Processor (Sonics and Materials, Inc.) standard probe set to 30% amplitude for 5 minutes. After sonication, the white dispersion was transferred to a 100 mL round bottom flask containing 2,2'-azobisisobutyronitrile (0.10 g, 0.6 mmol), dodecyl thiol (0.56 g, 2.8 mmol) and hydrogenated castor oil (HCO, 0.82 g) and was sealed then deoxygenated by nitrogen sparging for 10 minutes. The flask was immersed in a temperature controlled oil bath for 1 hour at 70° C., to receive a slightly viscous white dispersion, which contained 55.1% solids. To this dispersion, a solution of butyl acrylate (5.18 g, 40.4 mmol), methyl methacrylate (15.53 g, 0.16 moles) was added. The diluted dispersion (27.00 g) was preheated to 70° C., then mixed with 2,2'-azobisisobutyronitrile (0.18 g, 1.1 mmol) in a 100 mL beaker and was then redispersed in a preheated (90° C.) polyvinyl alcohol solution (55.20 g, 2.5%, 80,000-100,000 g/mole, 88% hydrolysed) by a overhead mixer spinning at 1250 rpm over 5 minutes. The suspension was quickly transferred to a 100 mL round bottom flask containing sodium nitrite (0.0062 g, 0.1 mmol) which was in turn sealed and deoxygenated by nitrogen sparging for 10 minutes. The polymerisation was carried out in a temperature controlled oil bath for 7 hours at 70° C., while constantly stirred magnetically. At the end of the polymerisation, the latex was filtered to remove coagulations and was centrifuged and washed six times with distilled water to receive a wet powder containing particles with an estimated average size of 25 microns (Carl Zeiss optical light microscope). A solution of Primid XLS52 crosslinker (0.56 g) and water (2.09 g) was mixed with the wet powder and the whole sample was let to be air dried overnight forming a dry cake which was in turn broken up by grinding using a mortar and a pestle and was sieved using a 125 micron sieve. The final product formed a hard, white film on a glass slide at 200° C. after 10 minutes.

Example 17: Polymer Coated Bismuth Vanadate Particles Using Macro RAFT Copolymers Part (a): Preparation of a poly(butyl acrylate-co-acrylic Acid) Macro-RAFT Agent Containing an Average of 100 Monomer Units Per Chain in a Mole Ratio of 1:1 Using: 2-{[(butylsulfanyl)carbonothioyl]sulfanyl}propanoic Acid A solution of 2-{[(butylsulfanyl)carbonothioyl]sulfanyl}propanoic acid (0.23 g, 1 mmol), 2,2'-azobisisobutyronitrile (0.07 g, 0.4 mmol), acrylic acid (3.54 g, 49.2 mmol), butyl acrylate (6.28 g, 49.0 mmol) was prepared in dioxane (20.02 g) in a 50 mL round bottom flask. This was stirred magnetically and sparged with nitrogen for 10 minutes. The flask was then heated at 70° C. for 3 hours under constant stirring. The final copolymer solution was 39.1% solids.

Part (b): Poly(methyl methacrylate-co-butyl acrylate) Coating of Yellow Bismuth Vanadate Pigment (Irgazin Yellow 2094, Ciba Specialty Chemicals) Using Macro RAFT from Part (a) as a Stabilizer.

Yellow pigment (5.28 g) was thoroughly mixed with macro RAFT from Part (a) (5.12 g, 0.17 mmol) to achieve a viscous yellow paste. To this paste, water (50.73 g) was added and mixed while an ammonium hydroxide solution (28%) was added drop wise until the pH of the dispersion reached 5. The dispersion was further dispersed using a Vibra-Cell Ultrasonic Processor (Sonics and Materials, Inc.) standard probe at 30% amplitude for 10 minutes. During the sonication process, the dispersion was stirred magnetically and cooled in a water bath. It was then transferred to a 100 mL round bottom flask containing 4,4'-azobis(4-cyanovaleric acid) (0.0267 g, 0.1 mmol) and was deoxygenated by nitrogen sparging. The whole flask was immersed in an oil bath with a temperature setting of 70° C., while a deoxygenated mixture of butyl acrylate (1.16 g, 9.1 mmol) and methyl methacrylate (3.49 g, 34.8 mmol) was fed into the flask at 0.94 g/hr over 5 hours. After monomer addition was complete, the heating was continued for another 13 hours after which time polymerization was found to be complete. The final latex was yellow and stable, containing particles about 699 nm in diameter (HPPS, Malvern Instrument Ltd) and 17.5% solids. Transmission electron microscopy showed that the latex contained individually encapsulated bismuth vanadate particles.

Example 18: High Solid Content Encapsulated $TiO_2$

Part (a): Poly(methyl methacrylate-co-butyl acrylate) Coating of $TiO_2$ Pigment (CR828, Kerr-McGee Pigments Ltd) Using Macro RAFT from Example 4, Part (a) (C4-(5 butyl acrylate-co-10 acrylic acid)) as a Stabilizer at 55% Solids.

Macro RAFT from Example 4, Part (a): (1.85 g, 0.6 mmol) was mixed with water (17.20 g) in a 100 mL beaker and was dissolved by adjusting the pH to 7 using ammonium hydroxide (28%). To this solution, $TiO_2$ pigment (19.91 g) was added, mixed and was further thoroughly dispersed using a Vibra-Cell Ultrasonic Processor (Sonics and Materials, Inc.) standard probe at 30% amplitude for 10 minutes. During the sonication process, the dispersion was stirred magnetically and cooled in a water bath. The white dispersion (34.60 g) was transferred to a 100 mL round bottom flask containing 4,4'-azobis(4-cyanovaleric acid) (0.027 g, 0.1 mmol) and was deoxygenated by nitrogen sparging. The whole flask was immersed in an oil bath with a temperature setting of 70° C., while a deoxygenated mixture of butyl acrylate (1.39 g, 10.9 mmol) and methyl methacrylate (3.24 g, 32.4 mmol) was fed into the flask at 0.92 g/hr over 5 hours. After monomer addition was complete, the heating was continued for another 16 hours after which time polymerization was found to be complete. The latex was white and stable, containing particles about 389 nm in diameter (HPPS, Malvern Instruments Ltd) and 54.8% solids. Transmission electron microscopy showed that the latex contained individually encapsulated $TiO_2$ particles.

Example 19: Polymer coated $TiO_2$

Part (a) Preparation of 2-[(Ethoxycarbonothioyl)sulfanyl]succinic Acid.

Potassium O-ethylxanthate (Aldrich, 32.00 g, 200 mmol) was added all at once to a stirred solution of maleic acid (76.56 g, 660 mmol) in water (153 mL) in an Erlenmeyer flask, followed by more water (10 mL) to wash down the addition funnel. After an initial endotherm to produce a cloudy yellow solution, the reaction began to exotherm and formed a cream precipitate. The reaction was stirred for 5 hours at ambient temperature, and then acidified with 10 M hydrochloric acid (10 mL). The mixture was then heated and stirred on a hotplate until a clear yellow solution was obtained, which was then was filtered through a plug of cotton wool and allowed to cool to 6° C. The product was collected by vacuum filtration, washed with a little cold water and dried. Recrystallization from water (65 mL) gave pale cream granules, 23.73 g, 50%, mp 147.9-149.0°.

Part (b) Preparation of poly(butyl acrylate-co-acrylic Acid) Macro-RAFT Agent, in Dioxane, Containing an Average of 15 Monomer Units Per Chain in a Mole Ratio of 1:2 Using: 2-[(Ethoxycarbonothioyl)sulfanyl]succinic Acid A solution of 2-[(Ethoxycarbonothioyl)sulfanyl]succinic acid (0.3 g, 1.3 mmol), 2,2'-azobisisobutyronitrile (0.01 g, 0.1 mmol), acrylic acid (0.9 g, 12.6 mmol), butyl acrylate (0.8 g, 6.3 mmol) was prepared in dioxane (2.6 g) in a 5 mL round bottom flask. The solution was sparged with nitrogen for 1 minute while being stirred magnetically. The flask was then heated to and maintained at 70° C. for 2.5 hrs under constant stirring. The final copolymer solution was 43.4% solids.

Part (c): Poly(methyl methacrylate-co-butyl acrylate) Coating of $TiO_2$ Pigment (TR92, Huntsman Corporation) Using Macro RAFT from Part (b) as Stabilizer.

A solution containing macro RAFT agent (0.50 g, 0.14 mmol), water (27.2 g) and ammonium hydroxide, 28-30% (0.01 g, 0.11 mmol) was prepared in a 50 mL beaker. The solution was dispersed using a Vibra-Cell Ultrasonic Processor (Sonics and Materials, Inc.) standard probe at 30% amplitude for 1 minute. The pH measured to be 7.0. To this solution, $TiO_2$ pigment (4.99 g) was added, mixed and again thoroughly dispersed using the Vibra-Cell Ultrasonic Processor (Sonics and Materials, Inc.) standard probe at 30% amplitude for 10 minutes. During the sonication process, the dispersion was stirred magnetically. The white dispersion was transferred to a 50 mL round flask containing 4,4'-azobis(4-cyanovaleric acid) (0.01 g, 0.04 mmol) and was deoxygenated by nitrogen sparging. The flask was immersed in an oil bath with temperature setting at 70° C. while a deoxygenated mixture of butyl acrylate (0.67 g, 5.23 mmol) and methyl methacrylate (1.65 g, 16.48 mmol) was fed into the flask at 0.93 g/hr over one hour then decreased to 0.467 g/hr for 1.5 hrs. The resulting latex contained particles with an average diameter of 320.4 nm (HPPS, Malvern Instruments Ltd). The latex solids was 29.4%. The final latex was examined by transmission electro microscopy and found to contain individually encapsulated $TiO_2$ particles.

Example 20: Aqueous Decorative Paint Containing $TiO_2$ Encapsulated within a poly(methyl methacrylate-co-butyl acrylate) Coating Part (a): Preparation of a poly(butyl acrylate-co-acrylic acid) Macro-RAFT Agent Containing an Average of 15 Monomer Units Per Chain in a Mole Ratio of 1:2 Using: 2-{[(butylsulfanyl)carbonothioyl]sulfanyl}propanoic Acid A solution of 2-{[(butylsulfanyl)carbonothioyl]sulfanyl}propanoic acid (4.77 g, 20.0 mmol), 2,2'-azobisisobutyronitrile (0.164 g, 0.999 mmol), acrylic acid (14.47 g, 0.201 mol) and butyl acrylate (12.93 g, 0.101 mol) was prepared in dioxane (32.32 g) in a 50 mL round bottom flask. The acrylic acid and butyl acrylate samples were used as supplied. No effort was made to remove inhibitor. This was stirred magnetically and sparged with nitrogen for 10 minutes. The flask was then heated to, and maintained at 70° C. for 2.5 hrs under constant stirring. The preparation was repeated and the final samples combined to provide sufficient material for subsequent stages of this example. The final copolymer solution was 48.8% solids.

Part (b): Poly(methyl methacrylate-co-butyl acrylate) Coating of $TiO_2$ Pigment (TR92, Huntsman Corporation) Using Macro RAFT Agent from this Example as a Stabilizer.

A solution containing macro RAFT (4.262 g, 2.66 mmol), water (116.67 g) and 25% ammonium hydroxide (0.453 g, 12.9 mmol) was prepared in a 100 mL beaker. To this solution, $TiO_2$ pigment (48.62 g) was added, mixed and thoroughly dispersed using a Branson Sonifier 450 with a 2 cm probe set to 15% amplitude for 5 minutes followed by 10 minutes at 20% amplitude. During the sonication process, the dispersion was stirred magnetically. The above preparation was repeated four times to obtain sufficient material and the final samples were combined. The particle size of the individual millbase preparations were measured using a Malvern Zetasizer:

| | Particle Size nm (Z Average) |
|---|---|
| Sample 1 | 303.5 |
| Sample 2 | 308.1 |
| Sample 3 | 311.4 |
| Sample 4 | 316.5 |

The combined samples (629.10 g) were transferred to a 1000 mL three-necked flask equipped with condenser, temperature probe and mechanical agitator, containing 4,4'-azobis(4-cyanopentanoic acid) (0.545 g, 1.72 mmol) and were deoxygenated by nitrogen sparging. The sample was adjusted to pH 6-6.5 with 25% ammonium hydroxide solution. The whole flask was immersed in an oil bath with a temperature setting of 70° C., while a deoxygenated mixture of butyl acrylate (20.59 g, 0.161 mol) and methyl methacrylate (28.42 g, 0.284 mol) was fed into the flask over 4 hours. At the end of this feed, 4,4'-azobis(4-cyanopentanoic acid) (0.545 g, 1.72 mmol) was added to the reaction vessel. The solution was then heated to 80° C. and a further deoxygenated mixture of butyl acrylate (92.52 g, 0.722 mol) and methyl methacrylate (127.75 g, 1.276 mol) fed into the flask over 2 hours. During this feed (½ way through) a further sample of 4,4'-azobis(4-cyanopentanoic acid) (0.545 g, 1.72 mmol) was added. After monomer addition was complete, the heating was continued for a further 1 hour after which time polymerization was found to be complete. After filtering, the latex was white and stable, containing particles about 625.9 nm in diameter (Z average). The latex solids were 50.5%. The final Pigment Volume Concentration was 15.4%.

In process samples were collected during the polymerization stage and characterized using the Malvern Zetasizer. As expected, the polydispersity index PDI shows a clear narrowing as the polymer forms around the pigment and the resulting particles become more spherical.

| Sample 1 | Z-average = 298.8 nm; PDI = 0.143 |
| Sample 2 | Z-average = 422.2 nm; PDI = 0.151 |
| Sample 3 | Z-average = 542.1 nm; PDI = 0.110 |
| Final dispersion | Z-average = 625.9 nm; PDI = 0.080 |

Part (c): Waterborne Low PVC Paint Formulated Using the Encapsulated $TiO_2$ Dispersion from Part (b).

A gloss paint was formulated from the aqueous polymer dispersion of part (b):

The following were added in order into a mixer, followed by stirring for 5 minutes: Encapsulated TiO2 Dispersion from part (b) (pH adjusted to 8.0, 800.00 g), Foamaster III (0.90 g), Propylene glycol (12.79 g), Proxel GXL (0.72 g), Teric G9A6 (2.265 g). Texanol (17.502 g) and Coasol (7.729 g) were then added separately in a pencil stream whilst stirring. Stirring then continued for 10 minutes. After being premixed in a separate pot, propylene glycol (26.83 g) and Natrosol 250 HR (2.43 g) were added to the above mixture and stirring continued for another 60 minutes. The pH of the mixture was adjusted to 9.0 with a mixture of Ammonium Hydroxide −25% (0.010 g) and water (0.50 g). Final paint properties were as follows:

| Paint Physical Properties: | |
|---|---|
| Weight Solids: | 47.02 |
| Volume Solids: | 36.05 |
| WPL: | 1.208 |
| WPL Solids: | 1.575 |

Part (d): Preparation of a Comparative Conventional Polymer Dispersion

Several Control Paints were Prepared for Comparative Purposes. In Order to Prepare the Control Paints, an Acrylic Polymer Dispersion with the Same Polymer Composition as that of the Encapsulated Dispersion was Prepared.

The control comparative dispersion is an anionically stabilised latex with the composition MMA/BA/AA=56.03/42.27/1.70:

De-ionised water (1277.07 g) and Alkanate WH60 (23.00 g of a 60% solution) were charged to a reactor fitted with mechanical agitator, temperature probe and condenser. The reactor was heated to 80° C. and sodium carbonate (1.75 g), de-ionised water (32.00 g) and ammonium persulfate (1.50 g) were then added. The reactor was held at temperature for 10 minutes. The monomer emulsion was pre-prepared comprising de-ionised water (674.95 g), Alkanate WH60 (36.00 g of a 60% solution), MMA (1285.79 g, 12.84 mol), AA (39.02 g, 0.54 mol) and BA (970.20 g, 7.57 mol). The monomer emulsion was prepared by adding the water and surfactant to a vessel fitted with a stirrer. Monomers were added in order and the completed mixture stirred rapidly to complete the emulsion. On completion of the 10 minute hold, the initiator solution comprising de-ionised water (475.83 g), ammonium persulfate (9.50 g) and sodium carbonate (2.00 g) together with the monomer emulsion were fed to the reactor over a four hour period.

Once all feeds were finished, the reactor was held at reaction temperature for 15 minutes.

Tert-butyl perbenzoate (4.95 g) was charged to the reactor and after a 10 minute hold, followed by a feed of a mixture containing de-ionised water (50.00 g), sodium erythorbate (2.45 g) and Alkanate WH60 (0.050 g of a 60% solution) over 45 minutes.

At the end of this feed an ammonia adjustment (25% ammonium hydroxide, 20.00 g) was added and cooling started. When the temperature was less than 40° C., de-ionised water (20.00 g), defoamer (0.50 g) and biocide (10.00 g) were added. Once cool the latex was filtered through 90 μm silk.

The final latex had the following characteristics:
Solids 46.4%
pH=7.3
Minimum Film Forming Temperature=20° C.
Part (e): Comparative Waterborne Low PVC Paints Formulated Using the Control Polymer Dispersion from Part (d).

Comparative paints were formulated so as to enable clear identification of any benefits derived from encapsulation of the Titanium Dioxide pigment. Both comparative and experimental paints were specifically formulated to low PVC (ie gloss paints) with no extender pigments added. Comparative Paint 1 was formulated to achieve the same pigment volume concentration, g/L, of titanium dioxide included and approximately the same volume solids as the paint including encapsulated pigment. Further comparative paints (2, 3 and 4) were formulated to include increasingly higher proportions of titanium dioxide (decreased polymer: pigment ratio) to allow comparison of resultant hiding power of the paints. Comparative paints were prepared using the following formulae. The pigment used in the controls was dispersed in a conventional manner in preparation of these paints.

Comparative Paint Preparation:

| | | Comparative Example 1 (wt %) | Comparative Example 2 (wt %) | Comparative Example 3 (wt %) | Comparative Example 4 (wt %) |
|---|---|---|---|---|---|
| A | Water | 3.299 | 3.444 | 3.572 | 3.698 |
| A | Calgon T | 0.091 | 0.095 | 0.098 | 0.101 |
| B | Propylene glycol | 1.472 | 1.537 | 1.594 | 1.650 |
| B | Orotan 731A | 0.703 | 0.734 | 0.761 | 0.788 |
| B | Teric G9A6 | 0.144 | 0.150 | 0.156 | 0.162 |
| B | Foamaster III | 0.645 | 0.670 | 0.698 | 0.723 |
| B | Ammonium hydroxide - 25% | 0.072 | 0.074 | 0.076 | 0.080 |
| C | Tioxide TR92 | 18.170 | 18.965 | 19.667 | 20.362 |
| D | Water | 1.071 | 1.121 | 1.159 | 1.199 |
| E | Water | 4.696 | 4.057 | 3.492 | 2.934 |
| E | Control Polymer Dispersion - part (d) | 60.785 | 60.363 | 59.990 | 59.621 |
| E | Teric N8 | 0.424 | 0.421 | 0.419 | 0.416 |
| E | Proxel GXL | 0.083 | 0.082 | 0.082 | 0.081 |
| F | Water | 2.076 | 2.061 | 2.049 | 2.036 |
| G | Texanol | 2.014 | 2.000 | 1.987 | 1.975 |
| G | Coasol | 0.889 | 0.883 | 0.878 | 0.872 |
| H | Propylene glycol | 3.087 | 3.066 | 3.047 | 3.028 |
| H | Natrosol 250 HR | 0.279 | 0.277 | 0.275 | 0.274 |

Method:
A. Load water to mixer. Turn on mixer. Sprinkle Calgon T in slowly and run for 5 minutes
B. Add in order to high speed mixer whilst stirring. Run for 5 minutes.
C. Add under high speed mixing.
D. Wash down sides and shaft. Run at high speed for 20 minutes.
E. Add water and emulsion to mixer with stirrer off. Add other items then stir for 15 minutes.
F. Add millbase to mixer with stirring. Washout millbase container.
G. Add Texanol and Coasol in a pencil stream whilst stirring.
H. Premix in a separate pot. Add with stirring then stir for 60 minutes. Adjust viscosity and pH.

Paint Physical Properties:

| | Comparative Example 1 | Comparative Example 2 | Comparative Example 3 | Comparative Example 4 |
|---|---|---|---|---|
| g/L TiO$_2$ | 218 | 230 | 240 | 250 |
| P:B ratio | 64 | 67.5 | 70.5 | 73 |
| PVC | 15.4 | 16 | 16.6 | 17.2 |
| Weight Solids | 48.27 | 48.91 | 49.48 | 50.04 |
| Volume Solids | 37.36 | 37.70 | 38.01 | 38.31 |
| WPL | 1.204 | 1.213 | 1.220 | 1.228 |

Paint Physical Properties:

| | Comparative Example 1 | Comparative Example 2 | Comparative Example 3 | Comparative Example 4 |
|---|---|---|---|---|
| WPL Solids | 1.556 | 1.573 | 1.589 | 1.603 |

Results:

Films of the paints from Example 20(c) and Comparative Example 1 (equivalent mass of titanium dioxide per liter of paint) were cast onto Leneta black and white charts with a drawdown blade having a 175 um gap and after drying for 24 hours were measured for gloss with a Dr Lange gloss meter. They were also evaluated for film appearance and visual opacity:

| | Example 20 (c) | Comparative Example 1 |
|---|---|---|
| Film Appearance | Excellent Flow Very Good DOI | Average Flow Poor DOI |
| Gloss | | |
| 20 | 36 | 10 |
| 60 | 66.5 | 49.9 |
| 85 | 93.1 | 85.7 |
| Visual Opacity (wet) 1-6 (poor-best) | 3 | 2 |
| Visual Opacity (dry) 1-6 (poor-best) | 3 | 2 |

From the values above, it can be seen that the measured gloss of the film from paint example 20(c) at all three angles is significantly higher. The film of this paint showed greater brilliance and distinction of images reflected from the surface, than the comparative example.

The films were also evaluated for opacity by applying exemplified and comparative paints at equivalent final film builds to Leneta 5DX black and white opacity charts by means of a #032 wire-wound drawdown bar. The reflectance of each of the films could then be measured over the black and white substrates using a Macbeth 7000A spectrophotometer. The reflectance data was then used to calculate opacity in terms of Contrast Ratio, film build to produce a nominated colour difference and the scattering coefficient.

The method used aligns to that of ASTM D2805 "Hiding Power of Paints by Reflectometry" which is designed for testing the hiding power of pigments. The reflectance measurements over the black and white substrate regions of the panels are used to calculate the Y-tristimulus value (or the daylight luminous reflectance factor) for each of the substrates. The measured contrast ratio (Yb/Yw) for films of equal thickness can then be used as a measure of hiding power of the films and in the case of equal pigment loading, a measure of the hiding efficiency of the pigments.

| Example 20(c) (218 g/L) | Comparative Example 1 (218 g/L) | Comparative Example 2 (230 g/L) | Comparative Example 3 (240 g/L) | Comparative Example 4 (250 g/L) |
|---|---|---|---|---|
| 0.98 | 0.97 | 0.98 | 0.99 | 0.99 |

The higher the figure, the greater the hiding power of the paint.

When evaluated visually, the film of Example 20(c) possessed excellent hiding power—the exemplified paint, at 218 g/L, displays hiding power between that of comparative examples 2 and 3 at 230-240 g/L.

The dry film build opacity was also determined using an instrumental method.

An even film of paint was applied to a black and white Leneta chart using a #032 wire wound drawdown bar to a film build approaching dry hiding. Reflectance was measured over alternately black and white substrates and film build measured. Using the Kubelka-Munk equations (see D Judd and G Wyszecki "Color in Business, Sacience and Industry" p 427) the film thickness required to produce a nominated colour difference can be calculated. For this test, a colour difference of DE=0.4 was used and the film build calculated for each paint to achieve this value.

|  | Film Build required to achieve a DE of 0.40 |
|---|---|
| Example 20 (c) (218 g/L) | 101 |
| Comparative Example 1 (218 g/L) | 152 |
| Comparative Example 2 (230 g/L) | 122 |
| Comparative Example 3 (240 g/L) | 98 |
| Comparative Example 4 (250 g/L) | 79 |

The lower the film build required, the greater the hiding power of the paint. For comparison at constant pigment concentrations, the comparative paint Example 1 requires 50% more film build than Example 20(C) to produce the same colour difference. For comparison at constant film build, comparative Example 3 has approximately the same film build but 240 g/L of pigment to match the reference Example 20(C) at only 218 g/L.

Scattering coefficients were measured separately by an instrumental method. This function is a measure of the amount of light scattered at the pigment/vehicle interfaces within the paint film. The scattering coefficient is calculated via the Kubelka-Munk theory using the same reflectance measurements as contrast ratio. The values of Rb, Rw, the measured reflectance over White and Black substrates, W, the reflectance of the white substrate and T the film build, are inserted in the following equations:

$$S(mm^{-1}) = \frac{1000}{b*T} * \coth^{-1}\left(\frac{1 - a*R_b}{b*R_b}\right)$$

where:

$$a = 0.5 * \left[R_w + \frac{R_b + W - R_w}{R_b * W}\right]$$

$$b = \sqrt{(a^2 - 1)}$$

$$\coth^{-1} x = \frac{1}{2} * \ln\left[\frac{x+1}{x-1}\right]$$

For a white pigment, the S value is largely independent of wavelength over most of the visible spectrum, so the measurements at a wavelength of 560 nm are used here.

| Variant | Relative scattering |
|---|---|
| Example 20 (c) (218 g/L) | 111 |
| Comparative Example 1 (218 g/L) | 100 |
| Comparative Example 2 (230 g/L) | 100 |
| Comparative Example 3 (240 g/L) | 106 |
| Comparative Example 4 (250 g/L) | 111 |

For Examples at equal pigment loading of 218 g/L, the scattering of Example 20(c) is 11% greater than Comparative Example 1. For samples at equal scatter, the Comparative Example 4 has a 15% greater pigment loading than Example 20(c).

Further confirmation of the increased efficiency of pigment utilisation though encapsulation of titanium dioxide by the disclosed method, was gained through the examination of the tinting strength of the paint Example 20(c) against Comparative Example 1. In this analytical method, a standardised black tinter is blended with the white base paint at a specified concentration. The paints are applied to Leneta 5DX cards using a #040 wire wound drawdown bar to achieve equivalent film build. The colour of the panel prepared from this mixture is then instrumentally compared to that of a standard.

| Initial Tint Strength | Example 20 (c) (218 g/L) | Comparative Example 1 (218 g/L) |
|---|---|---|
| DL | 1.31 | 0.21 |
| Rub-Up | 0.67 | 0.20 |

Paint Example 20 (c) and Comparative Example 1 were also evaluated for hydrophilic and hydrophobic stain resistance and scrub resistance.

Stain resistance test:

1. Samples of the paints of interest are drawn down on a cardboard panel (Leneta black and white chart) in vertical strips using a 50 micron draw down bar. Also included as a reference is comparative paint example 1. The panels are allowed to dry for 24 hours.

2. A variety of stains are spread horizontally across the panel. These include 'hydrophilic' stains such as red wine, coffee and waterborne drawing markers, and 'hydrophobic' stains such as crayon, pastel, lipstick and a black grease similar to hand grease.

3. The stains are left in place for one hour and then a commercial cleaning solution is used with a rag to remove as much of the stain as possible.

The residual hydrophilic and hydrophobic staining is individually rated from 0 to 3 (0=no stain, 3=severe staining) and a total of all stains recorded. A low final value is best.

Scrub Test:

The paint of interest is drawn down on a Leneta black plastic scrub panel using a 175 micron doctor blade. Individual panels are used for each paint, and the panels are allowed to dry for two days, followed by 16 hours at 50 degrees. The panel is installed in a scrub machine (Gardner heavy duty wear tester) and mechanically scrubbed in two places with a brush in the presence of an abrasive solution. The number of scrub cycles required to fully remove the paint film is recorded for both brushes, and the average taken. This number is then converted to a rating as detailed below:

Scrub resistance is recorded as the number of cycles for the scrub machine to break through the paint film. This is then converted to a rating as detailed below:

| Number of scrubs | Rating |
|---|---|
| 1-200 | 1 |
| 201-300 | 2 |
| 301-400 | 3 |
| 401-500 | 4 |
| 500+ | 5 |

| Results: | | |
|---|---|---|
| | Example 20 (c) | Comparative Example 1 |
| Stain resistance | 5 | 11 |
| | Good | Average |
| Scrub Resistance | 5 | 5 |

Stain Results

| | Red wine | Coffee | Red Marker | Blue Marker | Green Marker | Purple Marker | Gel Pen | Lipstick | Grease | Total Score |
|---|---|---|---|---|---|---|---|---|---|---|
| Example 20 (c) | 0 | 0 | 2 | 0 | 0 | 1 | 1 | 1 | 0 | 5 |
| Comparative Example 1 | 0 | 0 | 2 | 2 | 0 | 3 | 2 | 2 | 0 | 11 |

Stain Rating:
0 - No stain,
1 - Slightly stained,
2 - Badly stained,
3 - Severe

The exemplified paint is more resistant to stains than the conventional comparison.

Films of both this paint example and comparative example 1, were applied to metal panels and exposed to radiation in a QUV cabinet for more than 1,500 hours (QUV/sec model, made by Q-Panel Co., USA, UVA 340 tube, with a cycle of 4 hrs UV @ 60° C./4 hrs condensation @ 50° C.). Gloss of the films was measured at regular intervals to gain an appreciate of the rate of gloss loss on exposure.

| QUV Exposure results for Comparative Example 1: | | | | | | | | | | |
|---|---|---|---|---|---|---|---|---|---|---|
| Total time (hrs)/ Gloss | 0 | 162 | 382 | 496 | 595 | 760 | 925 | 1,092 | 1,262 | 1,448 | 1,589 |
| 20° | 10 | 5.9 | 5.7 | 5.4 | 4.2 | 4.8 | 5.0 | 5.1 | 6.4 | 7.1 | 6.9 |
| 60° | 49.9 | 35.3 | 35.9 | 38.1 | 35 | 32.1 | 32.1 | 29.7 | 41.3 | 45 | 43.3 |
| 85° | 85.7 | 66.3 | 73.1 | 75.5 | 75.3 | 74.7 | 73.1 | 73.1 | 75.7 | 80.1 | 77.6 |

| QUV Exposure results for Example 20 (c): | | | | | | | | | | |
|---|---|---|---|---|---|---|---|---|---|---|
| Total time (hrs)/ Gloss | 0 | 162 | 382 | 496 | 595 | 760 | 925 | 1,092 | 1,262 | 1,448 | 1,589 |
| 20° | 36 | 29.9 | 23.2 | 24.2 | 16.1 | 15.8 | 15.9 | 16.4 | 20.9 | 24 | 21.8 |
| 60° | 66.5 | 66.9 | 62.4 | 64.7 | 56.9 | 56.5 | 57.8 | 57.5 | 61.4 | 58.5 | 62.6 |
| 85° | 93.1 | 91.5 | 90.8 | 93 | 89.6 | 88.9 | 90.3 | 90.7 | 92.9 | 90.4 | 92.8 |

Example 21: High PVC Aqueous Decorative Paint Containing $TiO_2$ Encapsulated within a poly(methyl methacrylate-co-butyl acrylate) Coating Part (a): Preparation of a poly(butyl acrylate-co-acrylic acid) Macro-RAFT Agent Containing an Average of 15 Monomer Units Per Chain in a Mole Ratio of 1:2 Using: 2-{[(butylsulfanyl)carbonothioyl]sulfanyl}propanoic Acid A solution of 2-{[(butylsulfanyl)carbonothioyl]sulfanyl}propanoic acid (4.77 g, 20 mmol), 2,2'-azobisisobutyronitrile (0.164 g, 0.999 mmol), acrylic acid (14.47 g, 0.201 mol) and butyl acrylate (12.93 g, 0.101 mol) was prepared in dioxane (32.32 g) in a 50 mL round bottom flask. The acrylic acid and butyl acrylate samples were used as supplied. No effort was made to remove inhibitor. This was stirred magnetically and sparged with nitrogen for 10 minutes. The flask was then heated to, and maintained at 70° C. for 2.5 hrs under constant stirring. The preparation was repeated and the final samples combined to provide sufficient material for subsequent stages of this example. The final copolymer solution was 48.8% solids.

Part (b): Poly(methyl methacrylate-co-butyl acrylate) Coating of $TiO_2$ Pigment (TR92, Huntsman Corporation) Using Macro RAFT Agent from this Example as a Stabilizer.

A solution containing macro RAFT (2.4894 g, 1.55 mmol), water (28.81 g) and 25% ammonium hydroxide (0.2650 g) was prepared in a 100 mL beaker. To this solution, $TiO_2$ pigment (28.44 g) was added, mixed and thoroughly dispersed using a Branson Sonifier 450 with a 2 cm probe set to 15% amplitude for 5 minutes followed by 10 minutes at 20% amplitude. During the sonication process, the dispersion was stirred magnetically and cooled in a water bath. The ultrasonification process was repeated, as stated twice, until adequate pigment dispersion was achieved. The final copolymer solution was 50.50% solids.

The sample (48.25 g) was transferred to a 1000 mL three-necked flask equipped with condenser, temperature probe and mechanical agitator, containing 4,4'-azobis(4-cyanopentanoic acid) (0.069 g, 0.218 mmol) and were deoxygenated by nitrogen sparging.

The sample was adjusted to pH 7.5 with 25% ammonium hydroxide solution. The whole flask was immersed in an oil bath with a temperature setting of 70° C., while a deoxygenated mixture of butyl acrylate (0.61 g, 4.76 mmol) and methyl methacrylate (0.93 g, 9.29 mmol) was fed into the flask at 0.30 ml/hour over 5 hours. After monomer addition was complete, the heating was continued for a further 1 hour after which time polymerization was found to be complete. After filtering, the latex was white and stable, containing particles about 332.9 nm in diameter (Z average). The latex solids were 59.34%. The final Pigment Volume Concentration was 74.50%.

Part (c): Waterborne Low PVC Paint Formulated Using the Encapsulated TiO$_2$ Dispersion from Part (b).

A high PVC paint was formulated from the aqueous polymer dispersion of part (b):

Encapsulated TiO$_2$ Dispersion from part (b) (100.00 g), was added to a mixer, with stirring. Texanol (0.680 g) and Coasol (0.160 g) were then added separately in a pencil stream whilst stirring. Stirring then continued for 10 minutes. The pH of the mixture was adjusted to 9.0 with a mixture of ammonium hydroxide −25% (0.010 g) and water (0.50 g). Final paint properties were as follows:

| Paint Physical Properties: | |
|---|---|
| Weight Solids: | 54.74 |
| Volume Solids: | 27.20 |
| WPL: | 1.594 |
| WPL Solids: | 3.209 |
| PVC: | 74.46 |

Part (d): Preparation of a Comparative Conventional Polymer Dispersion

The control comparative dispersion is an anionically stabilised latex with the composition MMA/BA/AA=56.03/42.27/1.70:

De-ionised water (1277.07 g) and Alkanate WH60 (23.00 g of a 60% solution) were charged to a reactor fitted with mechanical agitator, temperature probe and condenser. The reactor was heated to 80° C. and sodium carbonate (1.75 g), de-ionised water (32.00 g) and ammonium persulfate (1.50 g) were then added. The reactor was held at temperature for 10 minutes. The monomer emulsion was pre-prepared comprising de-ionised water (674.95 g), Alkanate WH60 (36.00 g of a 60% solution), MMA (1285.79 g, 12.84 mol), AA (39.02 g, 0.54 mol) and BA (970.20 g, 7.57 mol). The monomer emulsion was prepared by adding the water and surfactant to a vessel fitted with a stirrer. Monomers were added in order and the completed mixture stirred rapidly to complete the emulsion. On completion of the 10 minute hold, the initiator solution comprising de-ionised water (475.83 g), ammonium persulfate (9.50 g) and sodium carbonate (2.00 g) together with the monomer emulsion were fed to the reactor over a four hour period.

At the end of this feed an ammonia adjustment (25% ammonium hydroxide, 20.00 g) was added and cooling started. When the temperature was less than 40° C., de-ionised water (20.00 g), defoamer (0.50 g) and biocide (10.00 g) were added. Once cool the latex was filtered through 90 µm silk.

The final latex had the following characteristics:

Solids 46.4% pH=7.3

Minimum Film Forming Temperature=20° C.

Part (e): Comparative Waterborne High PVC Paint Formulated Using the Control Polymer Dispersion from Part (d).

A High PVC Paint was Formulated from the Aqueous Polymer Dispersion of Part (d).

A comparative paint was formulated so as to enable clear identification of any benefits derived from encapsulation of the titanium dioxide pigment. The pigment used in the control comparison was dispersed in a conventional manner in preparation of the paint.

| Stage | Material | Parts by weight |
|---|---|---|
| A | Deionised water | 142.66 |
| | Propylene glycol | 63.631 |
| | Antifoam | 27.888 |
| | Ammonium hydroxide - 25% | 3.095 |
| | Orotan 731A | 30.402 |
| | Teric G9A6 | 6.253 |
| B | Tioxide TR-92 | 785.57 |
| C | Deionised water | 100.00 |
| D | Deionised water | 235.856 |
| | Latex from part (d) of this example | 187.310 |
| E | Texanol | 14.66 |
| | Coasol | 2.35 |

Stage A ingredients were added in order with stirring to a suitably sized vessel. Stage B ingredients were added and then dispersed at high speed for 20 min. The combined A and B stages were added to a separate vessel using the Stage C to wash out the dispersion vessel. Stage D ingredients were pre-mixed and added to the combined A-C with stirring, and the combination stirred for a further 20 minutes. Stage E was pre-mixed and added as a pencil stream. Final paint properties were as follows:

| Paint Physical Properties: | |
|---|---|
| Weight Solids: | 57.18 |
| Volume Solids: | 31.51 |
| WPL: | 1.600 |
| WPL Solids: | 2.903 |
| PVC: | 71.85 |

Results:

Films of the paints from Example 21(c) and the comparative example 1 were cast onto Leneta black and white charts with a drawdown blade having a 175 um gap and after drying for 24 hours were measured for gloss with a Dr Lange gloss meter.

| | Example 21 (c) | Comparative Example 21(e) |
|---|---|---|
| 20 | 39.0 | 1.5 |
| 60 | 91.4 | 5.1 |
| 85 | 97.1 | 22.0 |

| Stain | Example 21 (c) | Comparative Example 21(e) |
| --- | --- | --- |
| Wine | 1 | 1 |
| Texta (green) | 3 | 2 |
| Lipstick (red) | 3 | 1 |
| Grease | 3 | 3 |

Stain Rating: 0 - No stain, 1 - Slightly stained, 2 - Badly stained, 3 - Severe

Example 22: Aqueous Decorative Paint Containing TiO$_2$ Encapsulated within a Styrene-Acrylic Polymer Coating Part (a): Preparation of a poly(butyl acrylate-co-acrylic acid) Macro-RAFT Agent Containing an Average of 15 Monomer Units Per Chain in a Mole Ratio of 1:2 Using: 2-{[(butyl-sulfanyl)carbonothioyl]sulfanyl}propanoic Acid A solution of 2-{[(butylsulfanyl)carbonothioyl]sulfanyl}propanoic acid (4.77 g, 20 mmol), 2,2'-azobisisobutyronitrile (0.164 g, 0.999 mmol), acrylic acid (14.47 g, 0.201 mol) and butyl acrylate (12.93 g, 0.101 mol) was prepared in dioxane (32.32 g) in a 50 mL round bottom flask. The acrylic acid and butyl acrylate samples were used as supplied. No effort was made to remove inhibitor. This was stirred magnetically and sparged with nitrogen for 10 minutes. The flask was then heated to, and maintained at 70° C. for 2.5 hrs under constant stirring. The final copolymer solution was 48.8% solids.

Part (b): Poly(methyl methacrylate-co-butyl acrylate-co-styrene-co-acrylic acid-co-PLEX) Coating of TiO$_2$ Pigment (TR92, Huntsman Corporation) Using Macro RAFT Agent from this Example as a Stabilizer.

A solution containing macro RAFT (4.1421 g, 2.56 mmol), water (118.16 g) and 25% ammonium hydroxide (0.4404 g) was prepared in a 100 mL beaker. To this solution, TiO$_2$ pigment (47.26 g) was added, mixed and thoroughly dispersed using a Branson Sonifier 450 with a 2 cm probe set to 15% amplitude for 5 minutes followed by 10 minutes at 20% amplitude. During the sonication process, the dispersion was stirred magnetically. The above preparation was repeated to obtain sufficient material and the final samples were combined.

The combined samples (644.49 g) were transferred to a 1000 mL three-necked flask equipped with condenser, temperature probe and mechanical agitator, containing 4,4'-azobis(4-cyanopentanoic acid) (0.543 g, 1.72 mmol) and were deoxygenated by nitrogen sparging. The sample was adjusted to pH 6-6.5 with 25% ammonium hydroxide solution. The whole flask was immersed in an oil bath with a temperature setting of 70° C., while a deoxygenated mixture of butyl acrylate (10.70 g, 83.48 mmol) and methyl methacrylate (17.67 g, 0.176 mol) was fed into the flask over 2 hours. At the end of this feed, 4,4'-azobis(4-cyanopentanoic acid) (0.543 g, 1.72 mmol) was added to the reaction vessel. The solution was then heated to 80° C. and a further deoxygenated mixture of butyl acrylate (94.88 g, 0.740 mol), methyl methacrylate (102.43 g, 1.023 mol), Styrene (47.05 g, 0.452 mol), PLEX 6844-0 (8.71 g) and AA (2.22 g, 30.81 mmol) fed into the flask over 3 hours. During this feed (½ way through) a further sample of 4,4'-azobis(4-cyanopentanoic acid) (0.543 g, 1.72 mmol) was added. After monomer addition was complete, the heating was continued for a further 1 hour after which time polymerization was found to be complete. After filtering, the latex was white and stable, containing particles about 654.3 nm in diameter (Z average). The latex solids were 49.39%. The final Pigment Volume Concentration was 14.64%.

Part (c): Waterborne Paint Formulated Using the Encapsulated TiO$_2$ Dispersion from Part (b).

A gloss paint was formulated from the aqueous polymer dispersion of part (b):

The following were added in order to a mixer, followed by stirring for 5 minutes: Encapsulated TiO2 Dispersion from part (b) (88.858 g), Foamaster III (0.015 g), Propylene glycol (1.340 g), Proxel GXL (0.081 g), Teric N40LP (0.200 g). Texanol (6.015 g) was then added separately in a pencil stream whilst stirring. Stirring then continued for 10 minutes. After being premixed in a separate pot, Propylene glycol (2.980 g), Acrysol SCT-275 (0.181 g) and Natrosol 250 HR (0.330 g) were added to the above mixture and stirring continued for another 60 minutes. The pH of the mixture was adjusted to 9.0 with a mixture of Ammonium Hydroxide −25% and water. Final paint properties were as follows:

| Paint Physical Properties: | |
| --- | --- |
| Weight Solids: | 44.42 |
| Volume Solids: | 33.83 |
| WPL: | 1.187 |
| WPL Solids: | 1.559 |
| PVC: | 14.65 |

Part (d): Preparation of a Comparative Conventional Polymer Dispersion.

The control comparative dispersion is an anionically stabilised latex with the composition MMA/BA/STY/AA/PLEX=41.4/37.5/16.2/1.95/3

| Stage | Material | Weight % |
| --- | --- | --- |
| A | DI water | 20.235 |
| A | Alkanate WC60(Huntsman) | 0.367 |
| B | DI water | 0.097 |
| B | Ammonium persulphate | 0.014 |
| B | Sodium carbonate | 0.018 |
| C | DI water | 11.55 |
| C | Ammonium persulphate | 0.197 |
| C | Sodium carbonate | 0.034 |
| D | DI water | 17.625 |
| D | AlkanateWC60 (Huntsman) | 0.735 |
| D | Methyl methacrylate | 18.371 |
| D | Butyl acrylate | 16.61 |
| D | Styrene | 7.188 |
| D | Acrylic acid | 0.865 |
| D | PLEX 6844-0 (Rohm) | 1.331 |
| E | DI water | 1.399 |
| F | TBPB * | 0.033 |
| F | DI water | 0.033 |
| G | Sodium erythorbate | 0.049 |
| G | DI water | 1.435 |
| H | TBPB * | 0.033 |
| H | DI water | 0.033 |
| I | TBPB* | 0.033 |
| I | DI water | 0.033 |
| J | Ammonium hydroxide (25%) | 0.42 |
| J | DI water | 0.42 |
| K | Sodium erythorbate | 0.061 |
| K | DI water | 0.321 |
| L | Bevaloid 4226 (antifoam) | 0.01 |
| M | DI water | 0.15 |
| M | Proxel GXL (biocide) | 0.1 |
| M | Acticide MBS (biocide) | 0.2 |
| | TOTAL | 100 |

TBPB = Tertiary butyl peroxy benzoate

Method:

Load stage A to the reactor. Start N2. Heat to 80 C. During heat up, prepare premixed stages B, C &D. Stage D preparation: In a 3 L plastic beaker using 7.5 cm cowles blade, stir at 1200 rpm for 10 minutes. At 80° C., add stage B. Hold it for 10 minutes. At the end of 10 minutes hold, stop nitrogen and start feeding stage C and D. Feed stage C & D over 4 hr at 79-81° C. At the end of the feed, wash the line with stage E. Hold for 15 minutes. Add pre mixed stage F. Simultaneously, start feeding stage G. Feed over 45 minutes. Add pre mixed stages H and I at 15 minutes interval during stage G feed. Start cooling. Add pre mixed stage J. Continue cooling. Cool to 50° C. Add stage K. Add stage L at temperature <40° C. Discharge and filter through 90 micron silk.

The final latex had the following characteristics:
Solids 45.5%
pH=7.3
Minimum Film Forming Temperature=22° C.
Part (e): Comparative Waterborne Paint Formulated Using the Control Polymer Dispersion from Part (d).

A comparative paint was prepared using the following formula. The pigment used in the control comparison was dispersed in a conventional manner in preparation of the paints.

| Stage | Material | Weight % |
|---|---|---|
| A | Water | 2.998 |
|   | CalgonT | 0.083 |
| B | Propylene glycol | 1.337 |
|   | Antifoam | 0.586 |
|   | Ammonium hydroxide - 25% | 0.065 |
|   | Orotan 731A | 0.639 |
|   | Teric N40LP | 0.131 |
| C | Tioxide TR-92 | 16.509 |
| D | Water | 3.363 |
| E | Water | 1.834 |
|   | Latex from part (d) of this example | 59.959 |
|   | Teric N8 | 0.409 |
|   | Biocide | 0.082 |
| F | Water | 2.522 |
| G | Texanol | 6.002 |
| H | Propylene glycol | 2.973 |
|   | Natrosol 250 HR | 0.329 |
|   | Acrysol SCT-275 | 0.180 |

Stage A ingredients were added in order with stirring order to a suitably sized vessel. Stage B ingredients were then added with stirring. Stage C was added and then the mixture dispersed at high speed for 20 minutes. The combined A, B and C stages were added to a separate vessel using the Stage D and Stage F to wash out the dispersion vessel. Stage E ingredients were pre-mixed and added to the combined A-C with stirring, and the combination stirred for a further 15 minutes. Stage G was added as a pencil stream. Stage H was pre-mixed and added with stirring. Stirring was continued for a further 60 minutes. Final paint properties were as follows:

| Paint Physical Properties: | |
|---|---|
| Weight Solids: | 45.50% |
| Volume Solids: | 35.20% |
| WPL: | 1.190 |
| WPL Solids: | 1.538 |
| PVC: | 14.65 |

Results:
Films of the paints from Example 22(c) and the comparative example 1 were cast onto Leneta black and white charts with a drawdown blade having a 175 um gap and after drying for 24 hours were measured for gloss with a Dr Lange gloss meter. They were also evaluated for film appearance:

| Property | Example 22 (c) | Comparative Example |
|---|---|---|
| Film Appearance | Excellent Flow | Average Flow |
| Gloss | | |
| 20 | 56 | 37 |
| 60 | 80 | 75 |
| 85 | 97 | 94 |

Example 23: Reconstituted Decorative Paint Produced from Dried Pigmented Latex

Part (a): Preparation of a poly(butyl acrylate-co-acrylic acid) Macro-RAFT Agent Containing an Average of 30 Monomer Units Per Chain in a Mole Ratio of 1:2 Using 2-{[(butylsulfanyl)carbonothioyl]sulfanyl}propanoic Acid A solution of 2-{[(butylsulfanyl)carbonothioyl]sulfanyl}propanoic acid (4.77 g, 20.01 mmol), 2,2'-azobisisobutyronitrile (0.164 g, 1.0 mmol), acrylic acid (14.47 g, 199.13 mmol), butyl acrylate (12.93 g, 100.023 mmol) in dioxane (32.32 g) was prepared in a 50 mL round bottom flask. This was stirred magnetically and sparged with nitrogen for 10 minutes. The flask was then heated at 70° C. for 3 hrs under constant stirring. The final copolymer solution has 49.76% solids.

Part (b): Preparation of a Reconstitutable White Decorative Paint Based on a poly(methyl methacrylate-co-butyl acrylate), Tg=52° C., Coating of TiO$_2$ Particles (TR92) Using the Macro-RAFT Prepared in this Example as a Stabilizer.

The macro-RAFT reagent (4.09 g, 2.54 mmol), de-ionised water (118.71 g) and a 25% solution of ammonium hydroxide in water (0.43 g) were added to a 250 ml beaker. The pH of the mixture was adjusted into the range 5.5-6.0 with a small amount of additional ammonium hydroxide solution. The mixture was subjected to ultra sonication with magnetic stirring using a Branson 450 Sonifier for 1 minute at 15% power to disperse the macro-RAFT agent. TiO2 powder (46.75 g) was then added to the mixture and further ultra sonication was carried out for 5 minutes at a power setting of 15% and for 10 minutes at a power setting of 20%. The quality of pigment dispersion was checked by measurement of average particle size using a Malvern Zetasizer. The pigment dispersion was repeated four times and the products combined to give sufficient material for the polymerisation stage. The particle size of the four pigment dispersions were individually characterised using a Malvern Zetasizer.

| Pigment dispersion | Z Average nm | Polydispersity Index |
|---|---|---|
| 1 | 310.6 | 0.132 |
| 2 | 317.2 | 0.122 |
| 3 | 310.6 | 0.132 |
| 4 | 306.6 | 0.132 |

The four pigment dispersions (650 g) were combined in a reaction vessel containing: 4,4'-azobis(4-cyanopentanoic acid) (0.542 g, 1.71 mmole) and the headspace of the reaction vessel was then purged with nitrogen for 10 minutes whilst raised the temperature to 70° C. The initiator 4,4'-azobis(4-cyanopentanoic acid) (0.542 g, 1.71 mmole) was added was added to the reaction vessel and it was held for 5 minutes. A deoxygenated solution of butyl acrylate (9.60 g, 74.91 mmole) and methyl methacrylate (35.48 g, 354.35 mmole) was fed into the reaction vessel using a syringe pump over 4 hours. After the feed was complete, further 4,4'-azobis(4-cyanopentanoic acid) (0.542 g, 1.71 mmole) was added and the temperature of the reaction vessel was raised to 80° C. Once the temperature was reached a deoxygenated solution of butyl acrylate (43.15 g, 336.69 mmole) and methyl methacrylate (159.45 g, 1592.62 mmole) was fed to the reaction vessel using a syringe pump over a 2 hour period. At a point one hour into the feed, the feed was stopped, a further portion of 4,4'-azobis(4-cyanopentanoic acid) (0.542 g, 1.71 mmole) added and the feed recommenced for the final hour. At the end of the feed the reaction vessel was held at temperature for an additional 1 hour to complete the polymerisation followed by cooling and adjustment of the pH into the range 7.5-8.5 with 25% ammonium hydroxide and finally filtration through 40 μm silk.

The final latex had a solids content of 48.01% and a pigment volume concentration of 16.2% and a final particle size of 618.2 nm and polydispersity index of 0.076 as measured by a Malvern Zetasizer.

Part (c): Preparation of a Reconstituted Decorative Paint Based on the Pigmented Latex of this Example, Tg=52° C., PVC=16.2%

A portion of the pigmented latex prepared in this example was first concentrated by centrifuging the latex at 7500 rpm for 10 minutes using a Beckman LB-BOM Ultracentrifuge. The clear supernatant solution was decanted and the solid concentrate was dried overnight at room temperature. The concentrated solid material was then sufficiently dry to be easily broken up and finely divided by light mechanical agitation and was then further dried overnight at room temperature.

The white powder produced was free flowing and had a measured solids content of 92%.

White paints were produced from wet pigmented latex (48.01% solids) and also from the dried powder (92% solids) according to the following procedure.

Reconstituted Paint

The dried white powder (92% solids), (181.46 g) was added to a mixer and the water (168.53 g) and sodium hydroxide (0.25 g) added with stirring for 20 minutes Propylene glycol (16.0 g) was added followed by 10 minutes stirring. Tego Foamex 825 (antifoam) (0.22 g) followed by 10 minutes stirring and a mixture of commercial coalescencing solvents, Coasol (4.99 g) and Texanol (14.98 g). The final paint was thickened with a mixture of thickeners based on Acrysol DR1 (3.1 g) and Acrysol RM-2020 NPR (3.1 g) and stirred for 1 hour to complete the paint make-up.

Control Paint:

A control paint was produced to the above procedure except for the initial stage where the non dried pigmented latex (40.01% solids) (350 g) was added to the mixer and sodium hydroxide (0.25 g) added and stirred for 20 minutes. The remaining raw materials were then added at the level and in a manner as for the reconstituted paint.

Paint Comparison:

The comparison of the two paints showed that the characteristics of the pigmented latex were unaffected by the centrifuging and drying steps and gave paints of equivalent characteristics.

Particle size measurements using the Malvern Zetasizer showed that the reconstituted dry powder was easily dispersed and gave particle size equivalent to that of the undried pigmented latex.

|  | Z Average nm |
|---|---|
| Pigmented latex (48.01% solids): | 618.2 |
| Dry powder (92% solids, reconstituted to 48% solids during paint make-up): | 639.9 |

The paints were applied to standard opacity panels using a drawdown bar and the films airdried overnight. The films showed excellent gloss and film appearance.

|  | Control Paint | Reconstituted Paint |
|---|---|---|
| Viscosity Brookfield (Spindle 2) | 20,000 | 14,940 |
| Cone & Plate(cp) | 0.75 | 0.78 |
| Gloss (20°/60°/85°) | 6.6/33.5/86.6 | 4.6/32.0/84.5 |

The claims defining the invention are as follows:

1. A method of polymerising one or more ethylenically unsaturated monomers to form polymer at the surface of solid particulate material selected from inorganic pigments, organic pigments, magnetic material, waxes, bioactive agents, and combinations thereof, said method comprising:
    (a) providing a dispersion of said solid particulate material stabilised in a continuous liquid phase, wherein the dispersion is substantially absent of said one or more ethylenically unsaturated monomers, and wherein a RAFT agent is adsorbed onto the outermost surface of the particulate material and functions as a stabiliser for said solid particulate material;
    (b) thereafter adding to the dispersion said one or more ethylenically unsaturated monomers to be polymerised; and
    (c) polymerising said one or more ethylenically unsaturated monomers under the control of said RAFT agent to thereby form polymer at the surface of said solid particulate material.

2. The method according to claim 1, wherein the continuous liquid phase is an aqueous phase.

3. A method of polymerising one or more ethylenically unsaturated monomers to prepare a liquid dispersion of polymer encapsulated solid particulate material, the solid particulate material being selected from inorganic pigments, organic pigments, magnetic material, waxes, bioactive agents, and combinations thereof in a continuous liquid phase, said method comprising:
    (a) providing a dispersion of said solid particulate stabilised in a continuous liquid phase, wherein the dispersion is substantially absent of said one or more ethylenically unsaturated monomers, and wherein a RAFT agent is adsorbed onto the outermost surface of the particulate material and functions as a stabiliser for said solid particulate material;
    (b) thereafter adding to the dispersion said one or more ethylenically unsaturated monomers to be polymerised; and
    (c) polymerising said one or more ethylenically unsaturated monomers under the control of said RAFT agent to form encapsulating polymer at the surface of said solid particulate material, thereby providing said liquid dispersion of polymer encapsulated solid particulate material.

4. The method according to claim 3, wherein the continuous liquid phase is an aqueous phase and the method provides an aqueous dispersion of polymer encapsulated solid particulate material.

5. A method of preparing a paint, thermofusable powder paint, filler, adhesive, toner, liquid ink, primer, sealant, diagnostic product or therapeutic product, the method comprising combining with one or more formulation components polymer encapsulated solid particulate material prepared according to claim 3.

6. The method according to claim 1, 3, or 5, wherein the largest dimension of the solid particulate material is no greater than 10 microns.

7. The method according to claim 6, wherein the largest dimension of the solid particulate material is no greater than 1 micron.

8. The method according to claim 1 or 3, wherein the inorganic and organic pigments are selected from the group consisting of titanium dioxide, zinc oxide, calcium carbonate, iron oxide, silicone dioxide, barium sulfate, carbon black, phthalocyanine blue, phthalocyanine green, quinacridone, dibromananthrone, and combinations thereof.

9. The method according to claim 1, 3, or 5, wherein the RAFT agent is an amphipathic RAFT agent.

10. The method according to claim 1, 3, or 5, wherein the RAFT agent is of general formula (4):

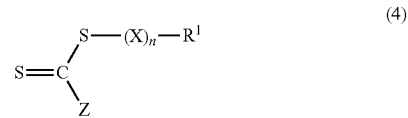

(4)

where each X is independently a polymerised residue of an ethylenically unsaturated monomer, n is an integer ranging from 0 to 100, $R^1$ is an organic group optionally substituted with one or more hydrophilic groups, and Z is optionally substituted alkoxy, optionally substituted aryloxy, optionally substituted alkyl, optionally substituted aryl, optionally substituted heterocyclyl, optionally substituted arylalkyl, optionally substituted alkylthio, optionally substituted arylalkylthio, dialkoxy- or diaryloxy-phosphinyl [—P(=O)OR$^2_2$], dialkyl- or diaryl-phosphinyl [—P(=O)R$^2_2$], optionally substituted acylamino, optionally substituted acylimino, optionally substituted amino, $R^1$—(X)$_n$—S— or a polymer chain formed by any mechanism and alkyl end capped derivatives thereof, where $R^1$, X and n are as defined above and $R^2$ is optionally substituted $C_1$-$C_{18}$ alkyl, optionally substituted $C_2$-$C_{18}$ alkenyl, optionally substituted aryl, optionally substituted heterocyclyl, optionally substituted aralkyl, and optionally substituted alkaryl.

* * * * *